US011297530B2

(12) United States Patent
Dao et al.

(10) Patent No.: US 11,297,530 B2
(45) Date of Patent: Apr. 5, 2022

(54) METHOD AND SYSTEM FOR USING POLICY TO HANDLE PACKETS

(71) Applicants: Ngoc Dung Dao, Ottawa (CA); Xu Li, Nepean (CA)

(72) Inventors: Ngoc Dung Dao, Ottawa (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 302 days.

(21) Appl. No.: 16/403,362

(22) Filed: May 3, 2019

(65) Prior Publication Data
US 2020/0145876 A1 May 7, 2020

Related U.S. Application Data

(60) Provisional application No. 62/755,101, filed on Nov. 2, 2018.

(51) Int. Cl.
H04W 28/06 (2009.01)
H04W 28/02 (2009.01)
H04L 12/14 (2006.01)
H04W 8/08 (2009.01)
H04W 80/10 (2009.01)

(52) U.S. Cl.
CPC ......... H04W 28/06 (2013.01); H04L 12/1407 (2013.01); H04W 8/08 (2013.01); H04W 28/0268 (2013.01); H04W 80/10 (2013.01)

(58) Field of Classification Search
CPC ... H04W 8/08; H04W 28/0268; H04W 80/10; H04W 28/06; H04L 12/1407

USPC ........................................................ 370/235
See application file for complete search history.

(56) References Cited

U.S. PATENT DOCUMENTS

| 2005/0008019 A1* | 1/2005 | Berger ................... H04L 47/50 370/395.1 |
| 2007/0041324 A1* | 2/2007 | Shenoi ...................... G06F 5/14 370/235 |
| 2014/0286256 A1* | 9/2014 | Chowdhury ...... H04W 28/0231 370/329 |
| 2018/0014222 A1 | 1/2018 | Song et al. |
| 2019/0116631 A1* | 4/2019 | Talebi Fard .......... H04W 68/02 |
| 2019/0335002 A1* | 10/2019 | Bogineni .............. H04W 48/16 |

FOREIGN PATENT DOCUMENTS

| CN | 103685058 A | 3/2014 |
| CN | 106411943 A | 2/2017 |

(Continued)

OTHER PUBLICATIONS

"System Architecture for the 5G System; Stage 2"; 3GPP TA 23.501 V15.2.0 (Jun. 2018).

(Continued)

Primary Examiner — Rownak Islam

(57) ABSTRACT

An aspect of the disclosure provides a method for handling delayed packets in a mobile wireless network performed by a PCF. The method includes receiving information pertaining to packet handling policy (PHP) parameters for a PDU session; and sending the PHP to other network functions for instructing devices in the user plane of the mobile wireless network how to handle delayed packets.

20 Claims, 16 Drawing Sheets

(56) References Cited

FOREIGN PATENT DOCUMENTS

CN     107396401 A    11/2017
WO     2017211289 A1  12/2017

OTHER PUBLICATIONS

"System Architecture for the 5G System; Stage 2"; 3GPP TA 23.501 V16.0.2 (Apr. 2019).
"Procedures for the 5G System; Stage 2"; 3GPP TS 23.502 V15.2.0 (Jun. 2018).
"Procedures for the 5G System; Stage 2"; 3GPP TS 23.502 V16.0.2 (Apr. 2019).
"Policy and Charging Control Framework for the 5G System; Stage 2"; 3GPP TS 23.503 V16.0.0 (Mar. 2019).
SA WG2 Meeting #119,S2-170803:"[23.501] QoS parameters and characteristics needed in 5G Systems",Ericsson,Feb. 13-17, 2017 Dubrovnik, Croatia,total 10 pages.

* cited by examiner

METHOD AND SYSTEM FOR USING POLICY TO HANDLE PACKETS

CROSS-REFERENCE TO RELATED APPLICATIONS

This application claims the benefit of prior to U.S. provisional Patent Application No. 62/755,101 filed on Nov. 2, 2018, entitled "METHOD AND SYSTEM FOR USING POLICY TO HANDLE DELAYED PACKETS", the contents of which are incorporated herein by reference in their entirety.

FIELD OF THE INVENTION

The present invention generally pertains to the field of Communications Networks, and particular embodiments or aspects relate to a policy to handle packets for Ultra-Reliable Low Latency Communications (URLLC) applications.

BACKGROUND

Ultra-Reliable Low Latency Communications (URLLC) applications, such as industrial automation control and automated driving vehicles, for example, require ultra-reliable packet delivery. The URLLC applications require that URLLC packets are delivered in an ultra-low latency or reliable manner, or both. However, the mobile wireless network may not be able satisfy one hundred percent of the packet delay requirements.

The Third Generation Partnership Project (3GPP) has specified a new quality of service (QoS) model, called delay critical Guaranteed Bit Rate (GBR) QoS flow, for URLLC application in Release 15, for 5G and 4G systems. In the delay critical GBR QoS flow model, each network segment, for example the Core Network (CN) segment, the (Radio) Access Network ((R)AN) segment, or the transmission between two user plane entities, such as a (R)AN node and user plane function (UPF) of the CN, has a specific delay budget.

In 3GPP Technical specification (TS) 23.501, version 15.2.0, Release 15 (TS 23.501), clause 5.7.3.4 Packet Delay Budget (PDB), states that "for GBR QoS Flows with GBR resource type, the PDB may be interpreted as a maximum delay with a confidence level of 98 percent if the QoS flow is not exceeding the Guaranteed Flow Bit Rate (GFBR). Non-GBR QoS Flows should be prepared to experience congestion-related packet drops and delays. In uncongested scenarios, 98 percent of the packets should not experience a delay exceeding the 5G QoS Identifier's (5QI) PDB. The PDB for Non-GBR and GBR resource types denotes a "soft upper bound" in the sense that an "expired" packet, e.g. a link layer Service Data Unit (SDU) that has exceeded the PDB, does not need to be discarded and is not added to the packet error rate (PER). However, for a Delay critical GBR resource type, packets delayed more than the PDB are added to the PER and can be discarded or delivered depending on local decision."

In the above specification, the packets of Delay critical GBR flows, if delayed more than the PDB, can be discarded or delivered depending on the local decision of the node or the network function receiving the packet for forwarding. Accordingly if there are multiple RAN and/or CN vendors, each RAN vendor or each CN vendor may have different designs that can drop or deliver packets. So if a User Equipment (UE) having URLLC applications moves across different network segments of the same Public Land Mobile Network (PLMN), the UE may experience inconsistent network behavior that could cause malfunction in the application layer of URLLC applications. Even in the same radio node (or cell), depending on the load, the radio node may either discard or deliver delayed packets. For example, in real-time video communications remote driving, the late video packets are not useful and should be dropped; but the packet scheduler in the network function, such as (R)AN node, may still deliver the late packets. Delivering the late packets when they should be dropped is waste of radio resources. But in some other applications, such as video or image analysis, the delayed packets are still required to be sent to the receiver so that the video decoder on the receiver side can fully recover the video or image to have a more accurate video or image analysis. In general, User Plane (UP) entities, such as the RAN, and/or UE, and/or User Plane Function (UPF), may not have the application information to decide whether the delayed packets of a QoS flow or a Protocol Data Unit (PDU) session should be discarded or delivered.

Accordingly, there may be a need for a system and method to handle packets for URLLC applications that is not subject to one or more limitations of the prior art.

This background information is intended to provide information that may be of possible relevance to understanding problems solved by the present invention. No admission is necessarily intended, nor should be construed, that any of the preceding information constitutes prior art against the present invention.

SUMMARY

It is an object of the present invention to obviate or mitigate at least one disadvantage of the prior art.

An aspect of the disclosure provides a method for handling packets in a mobile wireless network. Such a method includes receiving a packet handling policy (PHP), sent from a first control plane function, by a second control plane function. Such a method further includes sending the PHP, by the second control plane function, to other network functions for instructing devices in the user plane of the mobile wireless network how to handle packets for a QoS flow of a PDU session. In some embodiments, the devices in the user plane include user plane functions, radio access network nodes, and mobile devices.

A further aspect of the disclosure provides a method for handling packets in a mobile wireless network performed by a PCF. The method includes receiving information pertaining to packet handling policy (PHP) parameters for a PDU session; and sending the PHP to other network functions for instructing devices in the user plane of the mobile wireless network how to handle packets.

Some aspects and embodiments of the present invention may provide a solution in which the Application Function (AF), which represents the control function of the application server, sends an AF request to instruct the wireless network how to handle the packets. Alternatively, the MNO and Application Service Provider can agree on how to handle packets. The MNO can use OAM (Operation, Administration, and Maintenance) system to configure the CN function, such as the PCF, to create a packet handling policy for the QoS flows, such as delay critical GBR QoS flows, GBR QoS flows, or non-GBR QoS flows.

Other aspects of the disclosure provides for devices for carrying out the methods described herein, including CP functions (e.g, Session Management Function (SMF), Policy Control Function (PCF), UEs, UPFs and the AF. For example, an aspect of the disclosure provides a PCF including a processor, and a non-transitory computer readable storage medium including software instructions configured to control the processor to implement steps of: receiving information pertaining to packet handling policy (PHP) parameters for a PDU session; and sending the PHP to other network functions for instructing devices in the user plane of the mobile wireless network how to handle packets.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 5 is a block diagram schematically illustrating a representative format of the N3/N9 Encapsulation header of FIG. 4, in accordance with representative embodiments of the present invention;

It will be noted that throughout the appended drawings, like features are identified by like reference numerals.

DETAILED DESCRIPTION

In the following description, features of the present invention are described by way of example embodiments. For convenience of description, these embodiments make use of features and terminology known from communication system specifications, such as 4G and 5G networks, as defined by the Third Generation Partnership Project (3GPP). However, it may be understood that the present invention is not limited to such networks.

Figure 1:
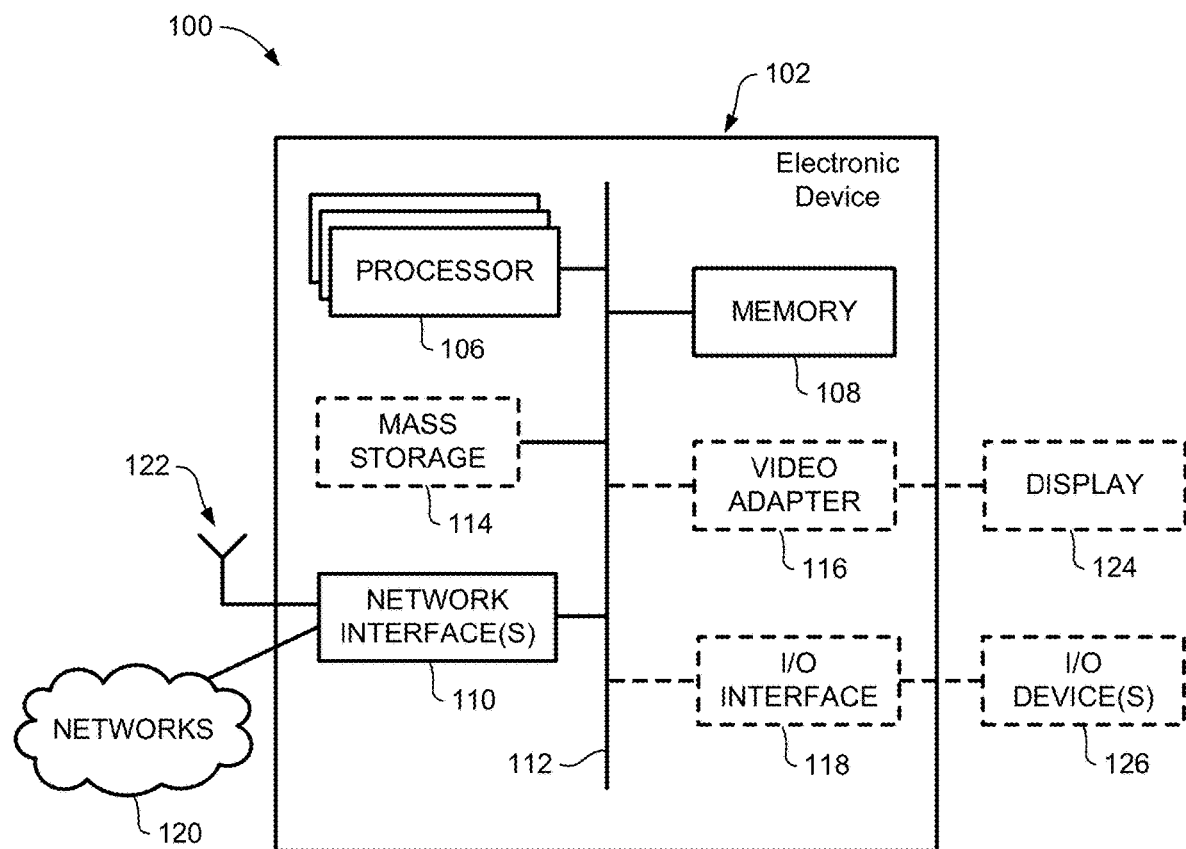
FIG. 1 is a block diagram of an electronic device within a computing and communications environment that may be used for implementing devices and methods in accordance with representative embodiments of the present invention.

FIG. 1 is a block diagram of an electronic device (ED) 102 illustrated within a computing and communications environment 100 that may be used for implementing the devices and methods disclosed herein. In some embodiments, the electronic device 102 may be an element of communications network infrastructure, such as a base station (for example a NodeB, an enhanced Node B (eNodeB), a next generation NodeB (sometimes referred to as a gNodeB or gNB)), a home subscriber server (HSS), a gateway (GW) such as a packet gateway (PGW) or a serving gateway (SGW) or various other nodes or functions within an evolved packet core (EPC) network or a next generation network, including control plane and user plane functions. In other embodiments, the electronic device 102 may be a device that connects to network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (m2m) device), or another such device that may be categorized as a UE despite not providing a direct service to a user. In some references, an ED 102 may also be referred to as a mobile device (MD), a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 106, such as a Central Processing Unit (CPU), and may further include specialized processors such as a Graphics Processing Unit (GPU) or other such processor, a memory 108, a network interface 110 and a bus 112 to connect the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random-access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs. The bus 112 may be one or more of any type of several bus architectures including a memory bus or memory controller, a peripheral bus, or a video bus.

The electronic device 102 may also include one or more network interfaces 110, which may include at least one of a wired network interface and a wireless network interface. As illustrated in FIG. 1, network interface 110 may include a wired network interface to connect to a network 120, and also may include a radio access network interface 122 for connecting to other devices over a radio link. When ED 102 is network infrastructure, the radio access network interface 122 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 122 may be present and it may be supplemented by other wireless interfaces such as WiFi network interfaces. The network interfaces 110 allow the electronic device 102 to communicate with remote entities such as those connected to network 120.

The mass storage 114 may comprise any type of non-transitory storage device configured to store data, programs, and other information and to make the data, programs, and other information accessible via the bus 112. The mass storage 114 may comprise, for example, one or more of a solid-state drive, hard disk drive, a magnetic disk drive, or an optical disk drive. In some embodiments, mass storage 114 may be remote to the electronic device 102 and accessible through use of a network interface such as interface 110. In the illustrated embodiment, mass storage 114 is distinct from memory 108 where it is included, and may generally perform storage tasks compatible with higher latency, but may generally provide lesser or no volatility. In some embodiments, mass storage 114 may be integrated with a memory 108 to form an heterogeneous memory.

The optional video adapter 116 and the I/O interface 118 (shown in dashed lines) provide interfaces to couple the electronic device 102 to external input and output devices. Examples of input and output devices include a display 124 coupled to the video adapter 116 and an I/O device 126 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and Video Adapter 116 may be virtualized and provided through network interface 110.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2:
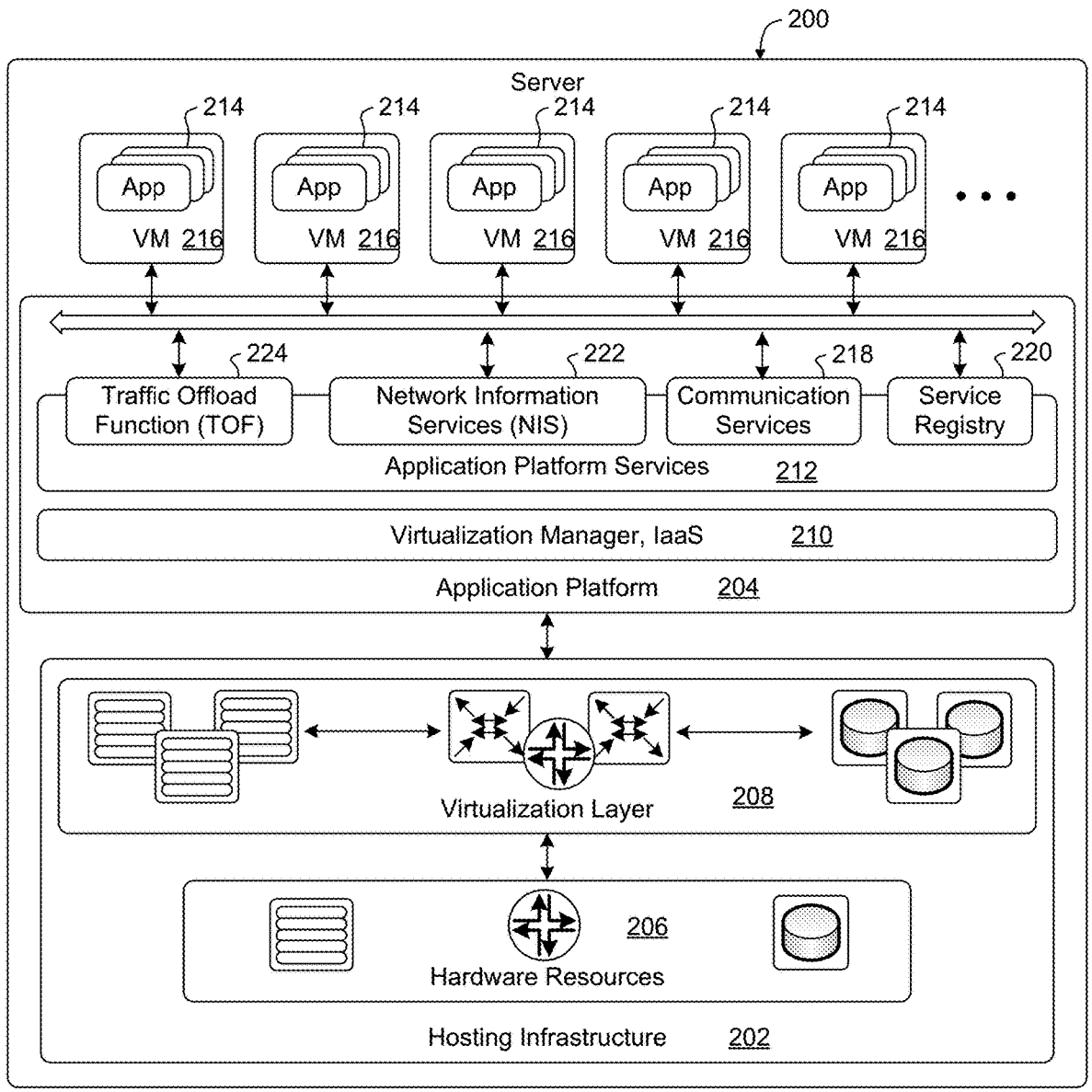
FIG. 2 is a block diagram illustrating a logical platform under which an Electronic Device can provide virtualization services.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 2 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP). The virtualization layer 208 and the application platform 204 may be collectively referred to as a Hypervisor.

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) 216 that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed within a respective Virtual Machine 216. For example, MANagement and Orchestration (MANO) functions and Service Oriented Network Auto-Creation (SONAC) functions (or any of Software Defined Networking (SDN), Software Defined Topology (SDT), Software Defined Protocol (SDP) and Software Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside virtualized mobile network elements in data centers that are used for supporting the processing requirements of the Cloud-Radio Access Network (C-RAN). For example, eNodeB or gNB nodes may be virtualized as applications 214 executing in a VM 216. Network Information Services (NIS) 222 may provide applications 214 with low-level network information. For example, the information provided by NIS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 214 in various ways, including: A Pass-through mode where (either or both of uplink (UL) and downlink (DL)) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

As may be appreciated, the server architecture of FIG. 2 is an example of Platform Virtualization, in which each Virtual Machine 216 emulates a physical computer with its own operating system, and (virtualized) hardware resources of its host system. Software applications 214 executed on a virtual machine 216 are separated from the underlying hardware resources 206 (for example by the virtualization layer 208 and Application Platform 204). In general terms, a Virtual Machine 216 is instantiated as a client of a hypervisor (such as the virtualization layer 208 and application-platform 204) which presents an abstraction of the hardware resources 206 to the Virtual Machine 216.

Other virtualization technologies are known or may be developed in the future that may use a different functional architecture of the server 200. For example, Operating-System-Level virtualization is a virtualization technology in which the kernel of an operating system allows the existence of multiple isolated user-space instances, instead of just one. Such instances, which are sometimes called containers, virtualization engines (VEs) or jails (such as a "FreeBSD jail" or "chroot jail"), may emulate physical computers from the point of view of applications running in them. However, unlike virtual machines, each user space instance may directly access the hardware resources 206 of the host system, using the host systems kernel. In this arrangement, at least the virtualization layer 208 of FIG. 2 would not be needed by a user space instance. More broadly, it will be recognised that the functional architecture of a server 200 may vary depending on the choice of virtualisation technology and possibly different vendors of a specific virtualisation technology.

Figure 3:
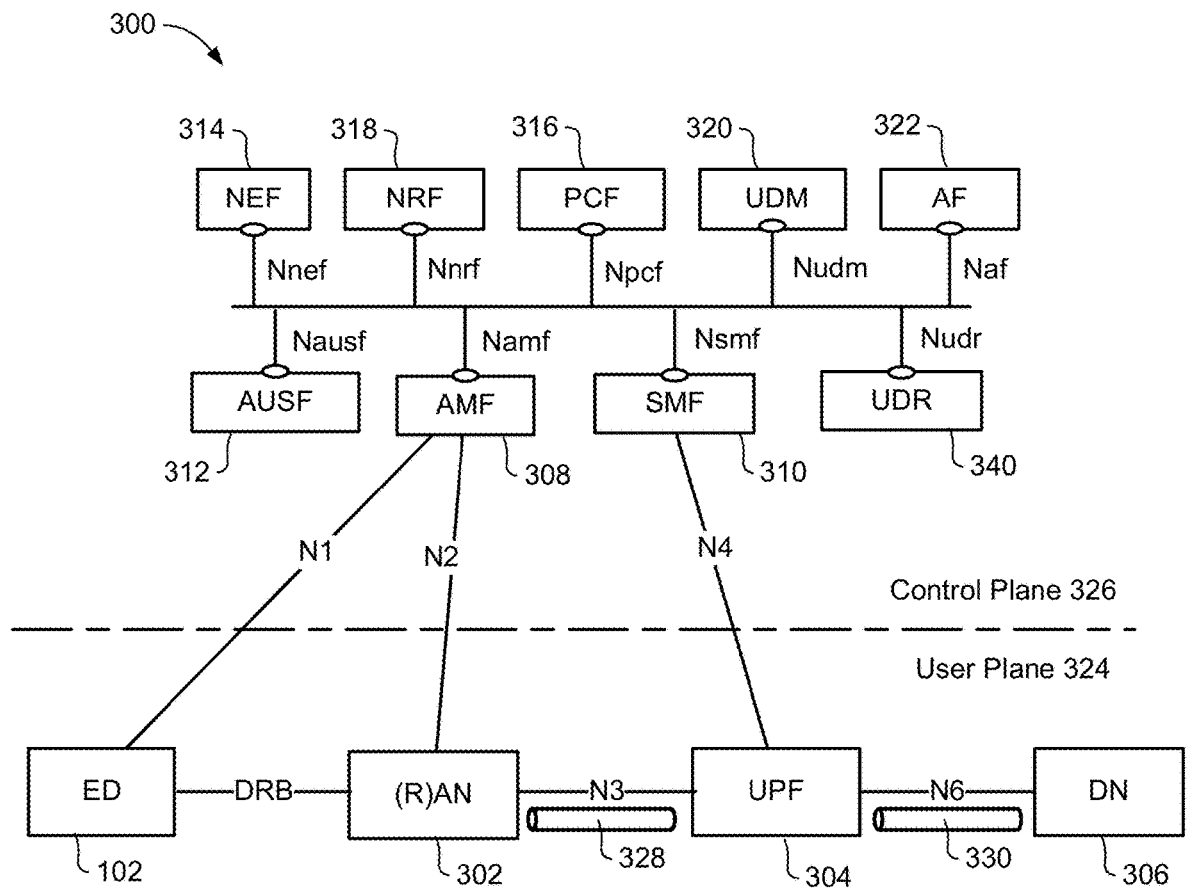
FIG. 3 is a block diagram illustrating a service-based view of a system architecture of a 5G Core Network.

FIG. 3 illustrates a service-based architecture 300 for a 5G or Next Generation Core Network (5GCN/NGCN/NCN). This illustration depicts logical connections between nodes and functions, and its illustrated connections should not be interpreted as direct physical connections. ED 102 forms a radio access network connection with a (Radio) Access Network ((R)AN) node 302 (which may, for example, be an gNodeB (gNB), and New Radio (NR) node), which is connected to a User Plane (UP) Function (UPF) 304 such as a UP Gateway over a network interface providing a defined interface such as an N3 interface. UPF 304 provides a logical connection to a Data Network (DN) 306 over a network interface such as an N6 interface. The radio access network connection between the ED 102 and the (R)AN node 302 may be referred to as a Data Radio Bearer (DRB).

DN 306 may be a data network used to provide an operator service, or it may be outside the scope of the standardization of the Third Generation Partnership Project (3GPP), such as the Internet, a network used to provide third party service, and in some embodiments DN 306 may represent an Edge Computing network or resource, such as a Mobile Edge Computing (MEC) network.

ED 102 also connects to the Access and Mobility Management Function (AMF) 308 through a logical N1 connection (although the physical path of the connection is not direct). The AMF 308 is responsible for authentication and authorization of access requests, as well as mobility management functions. The AMF 308 may perform other roles and functions as defined by the 3GPP Technical Specification (TS) 23.501. In a service based view, AMF 308 can communicate with other core network control plane functions through a service based interface denoted as Namf.

The Session Management Function (SMF) 310 is a network function that is responsible for the allocation and management of Internet Protocol (IP) addresses that are assigned to a UE as well as the selection of a UPF 304 (or a particular instance of a UPF 304) for traffic associated with a particular session of ED 102. The SMF 310 can communicate with other core network functions, in a service based view, through a service based interface denoted as Nsmf. The SMF 310 may also connect to a UPF 304 through a logical interface such as network interface N4.

The Authentication Server Function (AUSF) 312 provides authentication services to other network functions over a service based Nausf interface.

A Network Exposure Function (NEF) 314 can be deployed in the network to allow servers, functions and other entities such as those outside a trusted domain to have exposure to services and capabilities within the network. In one such example, an NEF 314 can act much like a proxy between an application server outside the illustrated network and network functions such as the Policy Control Function (PCF) 316, the SMF 310, the UDM 320, and the AMF 308, so that the external application server can provide information that may be of use in the setup of the parameters associated with a data session. The NEF 314 can communicate with other network functions through a service based Nnef network interface. The NEF 314 may also have an interface to non-3GPP functions.

A Network Repository Function (NRF) 318, provides network service discovery functionality. The NRF 318 may be specific to the Public Land Mobility Network (PLMN) or network operator, with which it is associated. The service discovery functionality can allow network functions and UEs connected to the network to determine where and how to access existing network functions, and may present the service based interface Nnrf.

PCF 316 communicates with other network functions over a service based Npcf interface, and can be used to provide Policy and Charging Control (PCC) functionality to other network functions, including those within the control plane. The PCC functionality may include: policy and control rule management, enforcement of policy and control rules, and event reporting. Implementation of PCC functionality is not necessarily the responsibility of the PCF 316, but rather is typically the responsibility of network functions to which the PCF 316 transmits applicable PCC rules. In one such example the PCF 316 may transmit a PCC rule (associated with a policy) associated with session management to the SMF 310, which may use the received PCC rule to implement the associated policy. This arrangement may be used to enable a unified policy framework within which network behavior can be governed.

A Unified Data Management Function (UDM) 320 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 320 may employ an interface Nudr to connect to a User Data Repository (UDR). The PCF 316 may be associated with the UDM 320 because it may be involved with requesting and providing subscription policy information to the UDR, but it should be understood that typically the PCF 316 and the UDM 320 are independent functions.

The PCF 316 may have a direct interface to the UDR. The UDM 320 can receive requests to retrieve content stored in the UDR 340, or requests to store content in the UDR 340. The UDM 320 is typically responsible for functionality such as the processing of credentials, location management and subscription management. The UDR 340 may also support any or all of Authentication Credential Processing, User Identification handling, Access Authorization, Registration/Mobility management, subscription management, and Short Message Service (SMS) management. The UDR is typically responsible for storing data provided by the UDM 320. The stored data is typically associated with policy profile information (which may be provided by PCF 316) that governs the access rights to the stored data. In some embodiments, the UDR may store policy data, as well as user subscription data which may include any or all of subscription identifiers, security credentials, access and mobility related subscription data and session related data.

Application Function (AF) 322 represents the non-data plane (also referred to as the non-user plane) functionality of an application deployed within a network operator domain and within a 3GPP compliant network. The AF 322 interacts with other core network functions through a service based Naf interface, and may access network capability exposure information, as well as provide application information for use in decisions such as traffic routing. The AF 322 can also interact with functions such as the PCF 316 to provide application specific input into policy and policy enforcement decisions. It should be understood that in many situations the AF 322 does not provide network services to other NFs, and instead is often viewed as a consumer or user of services provided by other NFs. An application outside the 3GPP network, can perform many of the same functions as AF 322 through the use of NEF 314.

ED 102 communicates with network functions that are in the User Plane (UP) 324, and the Control Plane (CP) 326. The UPF 304 is a part of the CN UP 324 (DN 306 being outside the 5GCN). (R)AN node 302 may be considered as a part of a User Plane, but because it is not strictly a part of the CN, it is not considered to be a part of the CN UP 324. AMF 308, SMF 310, AUSF 312, NEF 314, NRF 318, PCF 316, and UDM 320 are functions that reside within the CN CP 326, and are often referred to as Control Plane Functions. AF 322 may communicate with other functions within CN CP 326 (either directly or indirectly through the NEF 314), but is typically not considered to be a part of the CN CP 326. However, as stated, the (R)AN node 302 may be considered as a part of a User Plane. Accordingly, in this specification, while not part of the CN user plane, both the (R)AN node 302 and the ED 102 can be considered part of the user plane path.

Those skilled in the art will appreciate that there may be a plurality of UPFs connected in series between the (R)AN node 302 and the DN 306, and multiple data sessions to different DNs can be accommodated through the use of multiple UPFs in parallel.

User Plane (UP) packets flows to and from a particular ED 102. UP packets are normally routed between the (R)AN node 302 connected to the ED 102, and the DN 306 using General Packet Radio Service (GPRS) Tunneling Protocol for user plane (GTP-U) tunnels 328 and possibly IP-based tunnel 330 established through the N3 and N6 interfaces, respectively. In some examples, connections between (R)AN node 302 and a UPF 304 would make use of GTP-U tunnel 328. Connections between the illustrated UPF 304 and other unillustrated UPFs would also make use of a GTP-U tunnel. Upon leaving the CN UP, a packet may make use of an IP-based connection between the UPF 304 and the DN 306 instead of a GTP-U tunnel 328, especially if DN 306 is outside the domain of the operator. Typically, a GTP-U tunnel 328 is established between the (R)AN node 302 and the UPF 304 for each Radio Bearer between the ED 102 and the (R)AN node 302. This allows for a one-to-one relationship between Radio Bearers and GTP-U tunnels. Where there is a second UPF, there would usually be a corresponding GTP-U tunnel between the UPFs for each GTP-U tunnel between the (R)AN node 302 and the UPF 304. This results in each radio bearer being associated with a set of GTP-U tunnels forming a path through the CN UP. Each GTP-U tunnel may support multiple PDU sessions, and packet flows with multiple different QoS requirements. Packet flows within a GTP-U tunnel, such as tunnel 328, having the same QoS requirements may be grouped together as a QoS Flow, which may be identified by a given QFI. The QFI can therefore be used for queuing and prioritization of packet forwarding through the GTP-U tunnels 328 and 330.

Figure 4:
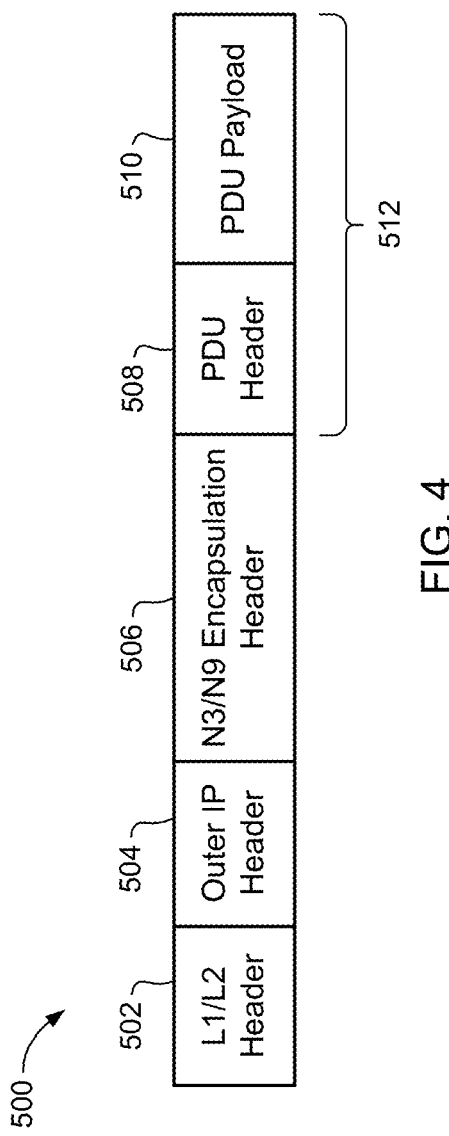
FIG. 4 is a block diagram schematically illustrating a representative format of packets sent in N3 and N9 interfaces, which may be used in embodiments of the present invention.

FIG. 4 is a block diagram illustrating a method 500 used to transport User-Plane traffic through a tunnel in the core network. In some embodiments, the tunnel may be a GTP-U tunnel such as tunnel 328 or tunnel 330 described above with reference to FIG. 3. In general terms, the Protocol Data Unit (PDU) 512 may include a Payload header 508 and a PDU Payload 510. Transport network layers add other header information, for example an L1/L2 header 502, an outer IP header 504, an N3/N9 Encapsulation Header (also referred to as an L4 tunnel encapsulation header) 506.

The L1/L2 header 502 is used to route traffic on specific media, such as optical cable or wireless link. Those skilled in the art will appreciate that from the perspective of an L1/L2 entity, the Outer IP header 504, N3/N9 encapsulation header 506 and the payload 512 may all appear to be a payload.

The Outer IP header 504 typically contains IP addresses and User Datagram Protocol (UDP) port numbers of the packet source and destination, which will normally be the UPF 304 and the (R)AN node 302. From the perspective of an L3 entity, the N3/N9 encapsulation header 506 and the payload 512 may all appear to be a part of payload.

The N3/N9 encapsulation header 506 will typically include tunnel specific information such as a Tunnel Endpoint Identifier (TEID) identifying the tunnel 328 (or tunnel 330), as well as Quality of Service (QoS) Flow Identifier (QFI) and Reflective QoS Indicator (RQI) information of packet flows within the tunnel 328 (or tunnel 330). Where a non-GTP-U tunnel is employed, other tunnel identifying information may be employed in place of the GTP-U TED.

The Payload header 508 and Payload 510 comprise the application-layer Protocol Data Unit (PDU) 512 that is sent and received by an application executing on the ED 102. Typically, the QoS requirement of the application-layer PDU 512 is determined by the application executed in the ED 102, and will normally be indicated by one or more QoS parameters inserted in the Payload header 508.

In some embodiments, the timestamp field may be provided as a new field added to the GTP-U protocol (not shown in FIG. 4). Alternatively, the timestamp field may be placed in an Extension Header of the GTP-U protocol.

FIG. 5 illustrates an example embodiment in which the conventional sub-fields 602 of the N3/N9 encapsulation header 506 are supplemented by a timestamp field 604 which may contain one or more timestamps 606.

In some embodiments, the UPF may perform packet delay measurement by adding a measurement indication in the N3 or N9 tunnel header, or in the packet header or in the packet payload of a downlink PDU. The UPF may record the time the packet is sent to the (R)AN, and the packet sequence. The (R)AN may receive the measurement packets. The (R)AN may remove the measurement indication and send the PDU to the UE. If the UE receives the packet successfully, the UE may send acknowledgement to the (R)AN node. The (R)AN node may calculate the time period between the time to send the PDU from the (R)AN to the UE and the time the (R)AN receives the acknowledgement from the UE. This is the round trip time (RTT) delay in the air interface. The (R)AN may send an acknowledgement packet to the UPF for the measurement packet. The (R)AN may include the RTT delay in the air interface, and/or downlink packet delay (from the (R)AN node to the UE), and/or the uplink packet delay (from the UE to the (R)AN node), in the acknowledgment packet. In some embodiments, the (R)AN may include sequence number of the measurement packet that was sent from the UPF to the (R)AN. In which case the UPF may receive the acknowledgement packet from the (R)AN. The UPF check the time recorded when the UPF sent the downlink measurement PDU and the time the UPF receives the acknowledgment message for the measurement packet. The time difference is the total RTT delay for the measurement packet to send from the UPF to the UE and from the UE to the UPF. The UPF may subtract the RTT delay in the air interface from the total RTT delay and to obtain the RTT delay to send the measurement PDU from the UPF to the (R)AN and from the (R)AN to the UPF, which is called CN RTT delay. If the time to send a PDU from the UPF to the (R)AN is the same as the time to send a PDU from the (R)AN to the UPF, then the one-way CN packet delay can be considered half of the CN RTT delay. The one-way CN packet delay is either the CN downlink packet delay to send a downlink PDU from the UPF to the (R)AN or the CN uplink packet delay to send a packet from the (R)AN to the UPF.

There can be one or more intermediate UPF (I-UPF) between the UPF that is connected to the DN and the (R)AN node. The UPF that is connected to the DN may be called PDU Session Anchor (PSA). In one embodiment of the present invention, the PSA may perform packet delay measurement. In another embodiment of the present invention, each intermediate UPF may also perform packet delay measurement in a similar manner. For example, the I-UPF may record the time it receives the measurement PDU and sequence number of the measurement PDU. The I-UPF then may receive the acknowledgement packet from the (R)AN and calculate the RTT between the I-UPF and the UE, the RTT between the I-UPF and the (R)AN. The PSA and I-UPF may calculate the average packet delay between the PSA or I-UPF and the (R)AN. The PSA and/or I-UPF may send messages to the SMF to report RTT between the UPF and UE, between the UPF and (R)AN, the downlink and/or uplink packet delay (between UPF and (R)AN0, and/or between (R)AN and UE for downlink and uplink, for each measurement packet or average value of RTT and/or average downlink packet delay.

Figure 6:
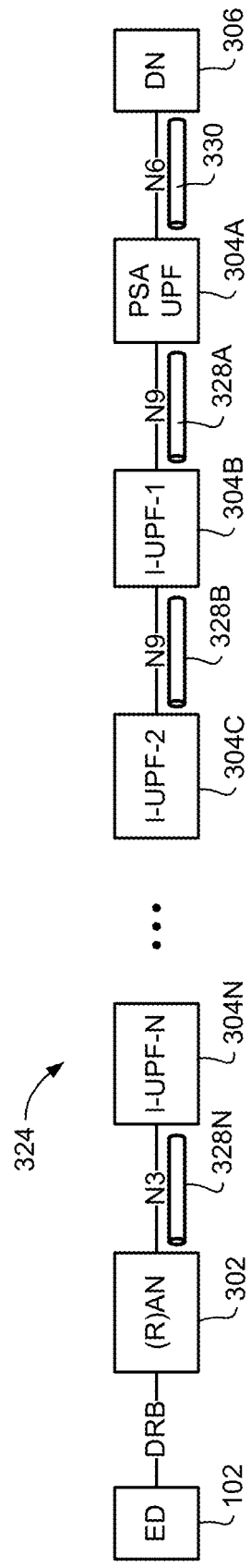
FIG. 6 is a block diagram schematically illustrating an example network User Plane, which may be used in embodiments of the present invention.

FIG. 6 illustrates an example network User Plane 324 comprising a plurality of UPFs implemented in series between the RAN 302 and the DN 306.

When a DownLink (DL) packet destined for a particular UE is received in a PDU Session Anchor (PSA) UPF 304A, e.g. in a buffer of an ingress port, the PSA UPF encapsulates the packet for transport through the core network and may include a first timestamp, namely Timestamp-1, which indicates the time that the packet was received by the PSA UPF.

When the packet is sent out from the PSA UPF, a specific function (e.g. packet delay monitoring function) may check Timestamp-1 of the PDU header. The specific packet delay monitoring function measures the duration in which the packet stayed in the PSA UPF. Each network function (e.g, UPF or RAN node) can include a packet delay monitoring function.

The PSA UPF may forward the packet to an Intermediate UPF (I-UPF-1) 304B over a tunnel, such as N9 tunnel. A specific function (e.g. packet delay monitoring function) may add another timestamp, namely Timestamp-2. The packet delay monitoring function of I-UPF-1 may then check the duration between Timestamp-1 and Timestamp-2.

Similarly, when the packet is sent out of I-UPF-1, a specific packet delay monitoring function of I-UPF-1 checks the duration that the PDU stayed in I-UPF-1.

The I-UPF-1 may forward the PDU to another Intermediate UPF (I-UPF-2) 304C. The I-UPF-2 may monitor the packet delay using similar procedures as in I-UPF-1.

When the last UPF, UPF-N 304N, of the CN sends the PDU to a (R)AN node 302 over the N3 interface, the (R)AN node 302 may monitor the packet delay in a similar way as the UPFs monitor packet delay described above. Specifically, the (R)AN node 302 may check Timestamp-1 when receiving the N3 PDU. Similarly, the (R)AN node may check the total duration the packet stayed in the (R)AN node. If this duration is larger than the AN-PDB, the (R)AN node may report this QoS violated event to the SMF.

The (R)AN node may also check the end-to-end delay, between the time the packet is successfully sent out of (R)AN or the time the (R)AN received an acknowledgement from the UE for the packet, and the Timestamp-1.

In the above description, each UPF may add a timestamp to the N3/N9 encapsulation header when the UPF receives the PDU.

In the above description, the timestamp(s) is/are added to DL PDUs by the first PSA UPF, and I-UPF(s), and (R)AN. Similarly, in the UL, the (R)AN, I-UPF(s) and PSA UPF may add timestamp to the UL PDUs.

In another embodiment, only the PSA UPF adds the timestamp when it receives the DL PDU. The UPF (either I-UPF or PSA UPF) that is connected to the (R)AN by N3 tunnel will check the PDU delay in the CN, before sending the PDU to the (R)AN. Similarly, in the UL, the UPF (either I-UPF or PSA UPF) that is connected to the (R)AN adds the timestamp to the UL PDU when it receives the UL PDU. The PSA UPF will check the packet delay before sending the PDU to DN.

In another embodiment, only the (R)AN adds timestamp to the UL PDU. The PSA UPF will check the end-to-end PDU delay. The timestamp may include the air-interface packet delay in the air interface. The air-interface packet delay may be estimated: for example, the (R)AN may record the time, T1, when the (R)AN receives a request from the UE to assign radio resources for an uplink data radio bearer (DRB); the (R)AN may record the time, T2, when the (R)AN receives the packet sent on the DRB; the difference in time, T2-T1, is the air-interface packet delay.

The timestamp of UL packets can be calculated as follows: (R)AN Timestamp=(T2-T1)+T3+T4, where T3 is the packet processing delay in (R)AN, and T4 is the time the (R)AN sends the uplink packet to the UPF. This type of (R)AN timestamp carries the estimated time the packet took to arrive at the UE.

Alternatively, the (R)AN may use the time T4 only for (R)AN timestamp, where T4 is the time the packet is sent out of (R)AN node to the UPF.

Figure 7:
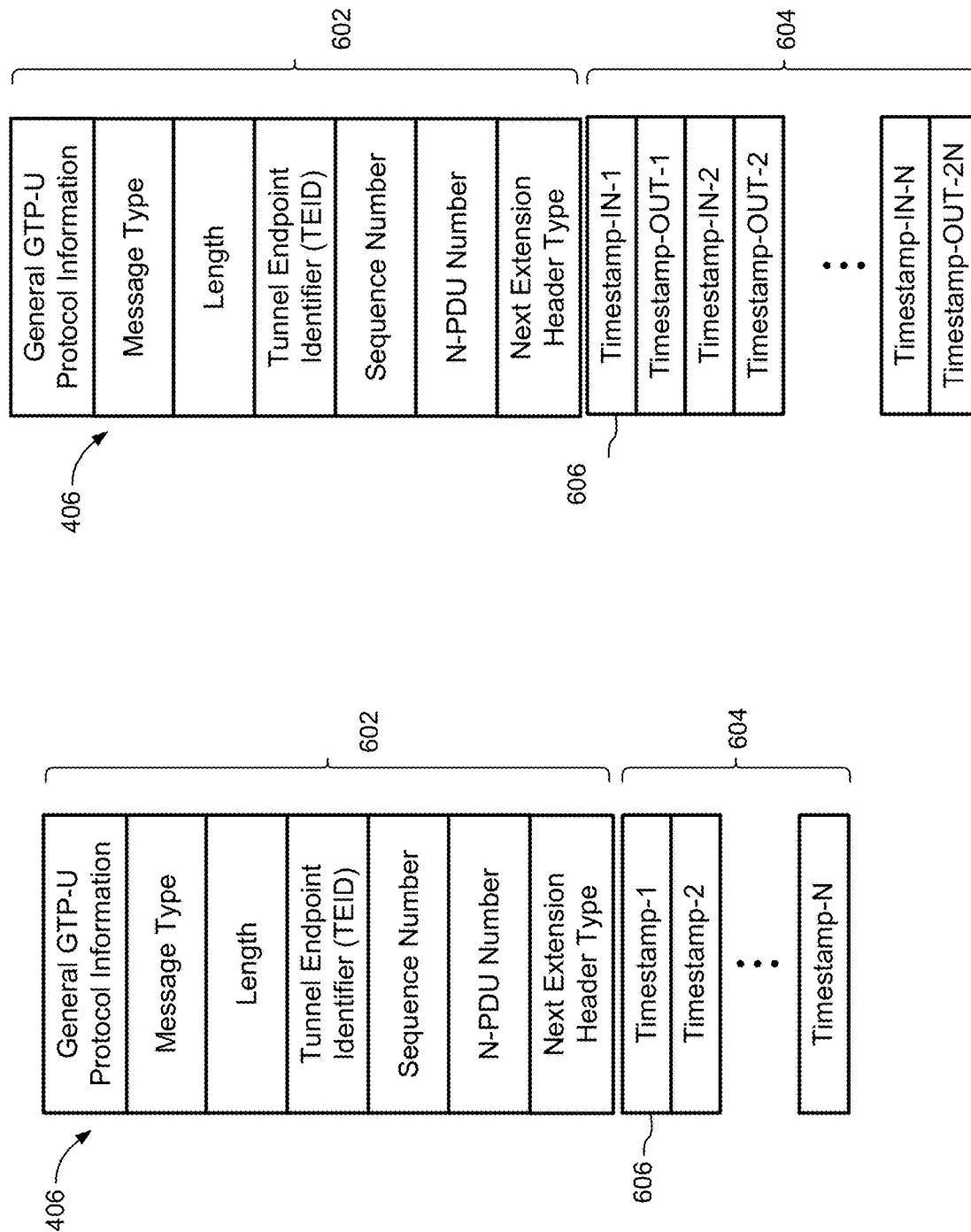
FIG. 7 is a block diagram schematically illustrating another representative format of the N3/N9 Encapsulation header of FIG. 4, which may be used in embodiments of the present invention.

FIG. 7 illustrates another method to add timestamps to the N3/N9 encapsulation header. In the embodiment of FIG. 7, each UPF adds a Timestamp-IN when it receives the PDU, and then adds a Timestamp-OUT when it sends out the PDU. Each next UPF or (R)AN node may check the accumulated timestamps.

The above description is for the DL PDU, in which the PDU is first sent from DN to the PSA UPF. In the UpLink (UL), timestamps can be added to the N3 or N9 encapsulation header and used in a similar manner.

The Timestamp can be carried by adding a new field to the current GTP-U protocol defined in 3GPP TS 29.281, published in Dec. 21, 2017. Alternatively, the timestamp can be carried by using an Extension Header field of GTP-U protocol, where the Next Extension Header Type indicates a new type to carry timestamp, e.g., timestamp type, the Extension Header field carries the timestamp. In another embodiment, the timestamp can be carried in one of Extension Header fields of other Next Extension Header Types.

The SMF may send to the (R)AN node and UPF a request to add a Timestamp to the PDU, when the PDU arrives at the NF, the PDU leaves the NF, or when PDU arrives and leaves the PDU Session. Alternatively, by default, the timestamp may be added to the N3/N9 tunnel header when the QoS violated event report is requested in the PCC rule.

According to an embodiment of the present invention, the Application Function (AF), which represents the control function of the application server, sends an AF request to instruct the wireless network how to handle the packets. Alternatively, the MNO and Application Service Provider can agree on how to handle packets. The MNO can use OAM (Operation, Administration, and Maintenance) system to configure the CN function, such as the PCF, to create a packet handling policy for the delay critical GBR QoS flow.

The Packet Handling Policy (PHP) may comprise at least of one of the following packet handling parameters (also called PHP parameters), discussed in the following paragraphs.

The Packet Handling Policy (PHP) may comprise of an end-to-end packet delay budget (E2E PDB) parameter, which is the packet delay budget for sending packets (or Protocol Data Unit (PDU)) of QoS flows, for example the delay critical (i.e. URLLC) GBR QoS flows, in the mobile wireless networks, such as 5G and 4G networks.

The PHP may comprise of a segment packet delay budget (S-PDB) parameter, which is the packet delay budget for sending packets (or Protocol Data Unit (PDU)) of QoS flows, for example the delay critical (or in other words URLLC) GBR QoS flows, in a network segment (such as (R)AN segment or CN segment, or the N3 interface and/or N9 interface segment between the CN and (R)AN) of the mobile wireless networks, such as 5G and 4G. The (R)AN packet delay budget may comprise of packet delay budget of packet processing in (R)AN node ((R)AN PDB) and packet delay budget in the air interface between the (R)AN node and the UE. The CN PDB may comprise of PDB of packet processing delay in UPF (UPF PDB) and PDB of N3 and/or N9 interfaces. The segment packet delay budget can be assigned for each segment of the network. The total segment PDB of all segments is equal to the E2E PDB.

The PHP may comprise of a NF packet delay budget (NF-PDB) parameter, which is the PDB for the NF between the time the NF receives the PDU and the time the NF sends out the PDU. The NF may be a (R)AN node or a UPF. The NF may also be a CP function, such as SMF and AMF, when the packet is sent in the CP in case the network is designed to carry packets in CP. For example, small and infrequent IoT packets may be sent between the (R)AN and AMF, and between AMF and SMF.

The PHP may comprise of a first indication, which may be called a Drop-Delayed-Packet (or PHP Rule) parameter, to indicate whether the network drops or delivers the packets when the packet delay exceeds the segment or E2E PDB. This parameter may be used for GBR, non-GBR, delay critical GBR QoS flows, or any types of traffic type.

The PHP may comprise of an end-to-end Maximum PDB (E2E MPDB) parameter, which is the maximum packet delay budget for sending packets (or Protocol Data Unit (PDU)) of a QoS flow, for example the delay critical (or in other words URLLC) GBR QoS flows, in the mobile wireless networks, such as 5G and 4G networks. The E2E MPDB could be larger than the E2E PDB.

The PHP may comprise of a segment MPDB (S-MPDB), which is the maximum packet delay budget for sending packets (or Protocol Data Unit (PDU)) of a QoS flow, for example the delay critical (or in other words URLLC) GBR QoS flows, in a segment, such as (R)AN or CN, of the mobile wireless networks, such as 5G and 4G networks. The segment MPDB could be larger than the segment PDB. Each network segment may be assigned a segment MPDB. The total segment MPDB of all network segments is equal to the E2E MPDB.

The PHP may comprise of A NF-MPDB, which is the MPDB between the time a NF receives a PDU and the time the NF sends out the PDU. Each NF may be assigned a NF-MPDB. The sum of NF-MPDB of all NFs is less than or equal to the E2E MPDB.

The PHP may comprise of a second indication, which may be called a Drop-Maximum-Delayed-Packet parameter, to indicate whether the network drops or delivers the packets when the packet delay exceeds a segment or E2E MPDB.

The PHP may comprise of a first packet priority parameter, which may be called normal-packet-scheduling-priority. This parameter indicates a scheduling priority of a packet for a packet scheduler of a NF to schedule the transmission of the packet when the packet delay is less than a Packet Delay Threshold (PDT). The PDT may be set equal to the NF-PDB, NF-MPDB, segment PDB, segment MPDB, E2E PBD, or E2E MPDB. The normal-packet-scheduling-priority may be set equal to the Priority Level of the QoS flow, in an enhancement to the Technical Specification (TS) 23.501, clause 5.7.3.3 "Priority Level". This is a technical enhancement to allow the external application function providing QoS requirements to the mobile network.

The PHP may comprise of a second packet priority parameter, which may be called delayed-packet-scheduling-priority. This parameter indicates a scheduling priority of a packet for a packet scheduler of a NF to schedule the transmission of the packet when the packet delay is larger than the PDT. The delayed-packet-scheduling-priority may be set equal to, smaller than, or larger than the normal-packet-scheduling-priority. The smaller value of the normal-packet-scheduling-priority and the delayed-packet-scheduling-priority may mean higher packet scheduling priority.

According to an embodiment of the present invention, a first control plane function, such as the PCF, may create a Packet Handling Policy (PHP), which includes one or more of the above Packet Handling parameters, and send the PHP to a second control plane function, such as the SMF. The SMF may distribute the PHP parameters to other network functions, such as (R)AN and UPF. In case the packets are delivered over the control plane such as IoT packets, the SMF may distribute the PHP parameters to CP functions, such as the AMF and the NEF.

The NF that receives PHP may create a PDT based on the provided PHP parameters in the PHP. For example, if the PHP includes S-PDB, the PDT may be set equal to S-PDB or S-PDB minus X; where X could be a real positive time number, for example 0, 0.5 millisecond (ms), or 1 ms, and X less than or equal to S-PDB. If the PHP includes NF-PDB, the PDT may be set equal to NF-PDB or NF-PDB minus Y; where Y could be a real positive time number, for example 0, 0.5 ms, or 1 ms, and Y is less than or equal to NF-PDB. If the PHP includes E2E-PDB, the PDT may be set equal to E2E-PDB, or E2E-PDB minus Z; where Z could be a real positive time number, for example 0, 0.5 ms, or 1 ms, and Z is less than or equal E2E-PDB.

The NF that receives the PHP may create a maximum packet delay threshold (MPDT) based on the provided PHP parameters in the PHP. For example, if the PHP includes S-MPDB, the MPDT may be set equal to S-MPDB, or S-MPDB minus A, where A could be a real positive time number, for example 0 ms, 0.5 ms, or 1 ms, and A is less than or equal to S-MPDB. If the PHP includes NF-MPDB, the MPDT may be set equal to NF-MPDB, or NF-MPDB minus B, where B could be a real positive time number, for example 0 ms, 0.5 ms, or 1 ms, and B is less than or equal to NF-MPDB. If the PHP includes E2E-MPDB, the MPDT may be set equal to E2E-MPDB, or E2E-MPDB minus C, where C could be a real positive time number, for example 0, 0.5 ms, or 1 ms, and C is less than or equal to E2E-MPDB.

If the PCF creates an E2E-PDB parameter in the PHP, the PCF may also include a parameter that indicates the timestamp that may be added to the packet header or the tunnel header of the packet. The SMF may use the timestamp indication parameter to request from the UPF that receives the downlink packets from a data network (DN) over the N6 interface (which may also be the PDU Session Anchor (PSA) UPF) to add a timestamp to the packet header of the N3 or the N9 tunnel header that carries the packet. The timestamp indicates the time that the UPF receives the DL packet at the N6 interface. The SMF may use the timestamp indication from the PCF to request the (R)AN to add a timestamp to the uplink packets; the timestamp indicates the time the (R)AN receives the UL packet and also includes a packet delay time for the air interface. The SMF may use the timestamp indication from the PCF to request the UE to add a timestamp to the UL packet; the timestamp may be added to the packet header or as part of the packet payload. If the timestamp is part of the packet payload, the timestamp could be placed before the payload with a predefined length so that the (R)AN and/or UPF can read the timestamp and remove it.

The Drop-Delayed-Packet parameter may have two values, for example TRUE or FALSE. If the Drop-Delayed-Packet parameter is TRUE, in an embodiment, the network function drops packets if the packet delay is larger than the PDT. Otherwise, if the Drop-Delayed-Packet parameter is FALSE, in an embodiment, the wireless system delivers packets if the packet delay is larger than the PDT.

The Drop-Maximum-Delayed-Packet parameter may have two values, for example TRUE, FALSE. If the Drop-Maximum-Delayed-Packet parameter is TRUE, in an embodiment, the wireless system drops packets if the packet delay is larger than the MPDT. If the Drop-Maximum-Delayed-Packet parameter is FALSE, in an embodiment, the wireless system delivers packets if the packet delay is larger than the MPDT.

Table 1 describes the possible settings of system behavior where the system uses the Drop-Delayed-Packet parameter.

TABLE 1

Possible settings for the Drop-Delayed-Packet parameter.

| Drop-Delayed-Packet | NF behavior |
|---|---|
| TRUE | The NF always tries to deliver packets within the PDT. The NF may use a normal-packet-scheduling-priority to schedule the packet transmission. In case the system cannot deliver the packets within the PDT, the NF drops packets having delay longer than the PDT. |
| FALSE | The NF always tries to deliver packets within the PDT. The NF may use a normal-packet-scheduling-priority to schedule the packet transmission. In case the system cannot deliver the packets within the PDT, the system does not drop packets having packet delay greater than the PDT. The NF may then use a delayed-packet-scheduling-priority to schedule the packet transmission. |

Table 2 describes the possible settings of system behavior where the system uses the Drop-Delayed-Packet and the Drop-Maximum-Delayed-Packet parameters.

TABLE 2

Possible settings for the Drop-Delayed-Packet and the Drop-Maximum-Delayed-Packet parameters.

| Drop-Delayed-Packet | Drop-Maximum-Delayed-Packet | NF behavior |
|---|---|---|
| TRUE | TRUE FALSE | The NF always tries to deliver packets within the PDT. The NF may use a normal-packet-scheduling-priority to schedule the packet transmission. The system drops packets having delay longer than the PDT. |
| FALSE | TRUE | The NF always tries to deliver packets within the PDT. The NF may use a normal-packet-scheduling-priority to schedule packet transmission. In case the NF cannot deliver the packets within the PDT, the system tries to deliver packets within the MPDT. The NF may use a normal-packet-scheduling-priority to schedule the packet transmission. Alternatively, the NF may use a delayed-packet-scheduling-priority to schedule the packet transmission. The NF does not drop packets having packet delay less than or equal to the MPDT. The NF drops packets that are delayed longer than the MPDT. |
| FALSE | FALSE | The NF always tries to deliver packets within the PDT. The NF may use a normal-packet-scheduling-priority to schedule the packet transmission. In case the NF cannot deliver the packets within the PDT, the system tries to deliver the packets within the MPDT. The NF may use a normal-packet-scheduling-priority to schedule packet transmission. Alternatively, the NF may use a delayed-packet-scheduling-priority to schedule the packet transmission. The NF does not drop packets having packet delay greater than the MPDT. |

According to an embodiment of the present invention, the Drop-Delayed-Packet parameter may have three values, for example TRUE, FALSE, and UNKNOWN. If the Drop-Delayed-Packet parameter is TRUE, in an embodiment, the wireless system drops packets if the packet delay is larger than the PDT. If the Drop-Delayed-Packet parameter is FALSE, in an embodiment, the wireless system delivers packets if the packet delay is larger than the PDT. If the Drop-Delayed-Packet parameter is UNKNOWN, depending on the implementation of products, in an embodiment, the wireless system either drops or delivers packets if the packet delay is larger than the PDT.

According to an embodiment of the present invention, the Drop-Maximum-Delayed-Packet parameter may also have three values, for example TRUE, FALSE, and UNKNOWN. If the Drop-Maximum-Delayed-Packet parameter is TRUE, in an embodiment, the wireless system drops packets if the packet delay is larger than the MPDT. If the Drop-Maximum-Delayed-Packet parameter is FALSE, in an embodiment, the wireless system delivers packets if the packet delay is larger than the MPDT. If Drop-Maximum-Delayed-Packet parameter is UNKNOWN, depending on the implementation of products, in an embodiment, the wireless system either drops or delivers packets if the packet delay is larger than the MPDT.

Table 3 describes the additional possible settings of system behavior where the system uses the Drop-Delayed-Packet and the Drop-Maximum-Delayed-Packet parameters.

TABLE 3

Additional Possible settings for the Drop-Delayed-Packet and the Drop-Maximum-Delayed-Packet parameters.

| Drop-Delayed-Packet | Drop-Maximum-Delayed-Packet | NF behavior |
|---|---|---|
| TRUE | TRUE, FALSE, UNKNOWN | The NF always tries to deliver packets within the PDT. The NF drops packets having delay longer than the PDT. The NF may use a normal-packet-scheduling-priority to schedule the packet transmission. |

TABLE 3-continued

Additional Possible settings for the Drop-Delayed-Packet
and the Drop-Maximum-Delayed-Packet parameters.

| Drop-Delayed-Packet | Drop-Maximum-Delayed-Packet | NF behavior |
|---|---|---|
| FALSE | TRUE | The NF always tries to deliver packets within the PDT. The NF may use a normal-packet-scheduling-priority to schedule the packet transmission. In case the NF cannot deliver the packets within the PDT, the NF tries to deliver the packets within the MPDT. The NF does not drop packets having packet delay less than or equal to the MPDT. The NF may use a normal-packet-scheduling-priority to schedule the packet transmission. Alternatively, the NF may use a delayed-packet-scheduling-priority to schedule the packet transmission. The NF drops packets that are delayed longer than the MPDT. |
| FALSE | FALSE | The NF always tries to deliver packets within the PDT. In case the NF cannot deliver the packets within the PDT, the NF tries to deliver the packets within the MPDT. The NF may use a normal-packet-scheduling-priority to schedule the packet transmission. Alternatively, the NF may use a delayed-packet-scheduling-priority to schedule the packet transmission. The NF does not drop packets having packet delay greater than MPDT. |
| FALSE | UNKNOWN | The NF always tries to deliver packets within the PDT. The NF may use a normal-packet-scheduling-priority to schedule the packet transmission. In case the NF cannot deliver packets within the PDT, the NF tries to deliver the packets within the MPDT. The NF may use a normal-packet-scheduling-priority to schedule the packet transmission. Alternatively, the NF may use a delayed-packet-scheduling-priority to schedule the packet transmission. The NF may or may not drop packets having packet delay greater than the MPDT. |
| UNKNOWN | TRUE | The NF always tries to deliver packets within the PDT. The NF may use a normal-packet-scheduling-priority to schedule the packet transmission. In case the NF cannot deliver the packets within the PDT, the NF may or may not drop packets having packet delay greater than PDT. In case the packets having packet delay greater than the PDT are not dropped, the NF tries to deliver the packets within the MPDT. The NF may use a normal-packet-scheduling-priority to schedule the packet transmission. Alternatively, the NF may use a delayed-packet-scheduling-priority to schedule the packet transmission. The NF drop packets having packet delay greater than MPDT. |
| UNKNOWN | FALSE | The NF always tries to deliver packets within the PDT. The NF may use a normal-packet-scheduling-priority to schedule the packet transmission. In case the NF cannot deliver the packets within the PDT, the NF may or may not drop packets having packet delay greater than PDT. In case the packets having packet delay greater than the PDB are not dropped, the NF tries to deliver the packets within the MPDT. The NF may use a normal-packet-scheduling-priority to schedule the packet transmission. Alternatively, the NF may use a delayed-packet-scheduling-priority to schedule the packet transmission. The NF does not drop packets having packet delay greater than the MPDT. |
| UNKNOWN | UNKNOWN | The NF always tries to deliver packets within the PDT. The NF may use a normal-packet-scheduling-priority to schedule the packet transmission. In case the NF cannot deliver the packets within the PDT, the system may or may not drop packets having packet delay greater than the PDT. In case the packets having packet delay greater than the PDT are not dropped, the NF tries |

TABLE 3-continued

Additional Possible settings for the Drop-Delayed-Packet
and the Drop-Maximum-Delayed-Packet parameters.

| Drop-Delayed-Packet | Drop-Maximum-Delayed-Packet | NF behavior |
|---|---|---|
| | | to deliver the packets within the MPDT. The NF may use a normal-packet-scheduling-priority to schedule the packet transmission. Alternatively, the NF may use a delayed-packet-scheduling-priority to schedule the packet transmission. The NF may or may not drop packets having packet delay greater than the MPDT. |

According to an embodiment of the present invention, the PCF may send the Drop-Delayed-Packet parameter and/or the Drop-Maximum-Delayed-Packet parameter to the SMF. The presence of the Drop-Delayed-Packet parameter may indicate that the UP entities such as the UE, and/or (R)AN and/or the UPF may drop the packets when the packet delay is larger than the PDT of this network function. The omission of the Drop-Delayed-Packet parameter may indicate that the UP entities such as the UE, and/or (R)AN, and/or the UPF may not drop the packets when the packet delay is larger than the PDT of this network function. In another embodiment, the omission of the Drop-Delayed-Packet parameter may indicate that the UP entities such as the UE, and/or (R)AN, and/or the UPF may deliver or drop the packets when the packet delay is larger than the PDT of this network function. Similarly, the presence of the Drop-Maximum-Delayed-Packet parameter may indicate that the UP entities such as the UE, and/or the (R)AN, and/or the UPF may drop the packets when the packet delay is larger than the MPDT of this network function. The omission of the Drop-Maximum-Delayed-Packet parameter may indicate that the UP entities such as the (R)AN and the UPF may not drop the packets when the packet delay is larger than the MPDT of this network function. In another embodiment, the omission of the Drop-Maximum-Delayed-Packet parameter may indicate that the UP entities such as the (R)AN and the UPF may deliver or drop (discard) the packets when the packet delay is larger than the MPDT of this network function.

In one embodiment of the present invention, the PHP may include one indication, such as Drop-Delayed-Packet parameter. This parameter is to instruct the UP entity (e.g. the UE, or (R)AN node, or UPF) to drop the packet if the UP entity monitors the packet delay and finds that the packet delay is larger than the NF PDB, or S-PDB, or E2E PDB. The NF PDB, and/or S-PDB, and/or E2E PDB may be part of PHP, or may be part of QoS rule(s) for the UE, QoS profile(s) for the (R)AN, or PDR(s) for the UPF.

The PHP parameters can be provided for any types of QoS flows, such as, GBR, delay critical GBR, and non-GBR flows, as currently described in 3GPP TS 23.501, version 15.3.0, published in September 2018. The PHP parameters can be provided for any types of PDU sessions, such as IPv4, IPv6, Ethernet, unstructured data PDU Session, as currently described in 3GPP TS 23.501.

The SMF may assign the same or different PHP parameters for the UL and/or the DL direction. For example, in the UL, the Drop-Delayed-Packet parameter in the UE, and/or the (R)AN node and/or the UPF may be set to TRUE. In the DL, the Drop-Delayed-Packet parameter in the (R)AN node and/or the UPF may be set to FALSE. In the UL, the E2E PDB may be 10 ms, while in the DL, the E2E PDB may be 15 ms.

In another example, the SMF may not send the Drop-Delayed-Packet and the (R)AN PDB parameters to the UE for a QoS flow in a QoS rule, which means that the UE may not drop packets if the packet delay is larger than the (R)AN PDB. However the SMF may send the Drop-Delay-Packet parameter to the (R)AN for a downlink QoS Profile of the same QoS flow, and the presence of the Drop-Delayed-Packet parameter means that the delayed packet may be dropped (discarded). Which means that only the (R)AN needs to drop the packets in the downlink, while the UE may drop (discard) or deliver delayed packets in the uplink.

According to an embodiment of the present invention, the PHP parameters may be sent from the PCF to the SMF during the PDU Session Establishment procedure. The SMF may create PHP parameters for the QoS Profile in the (R)AN, and/or the QoS Rules in the UE, and/or the Packet Detection Rule (PDR) in UPF.

In another embodiment of the present invention, the SMF may determine the PHP parameters without the PHP parameters from the PCF. The SMF may use the information provided by the UE and AMF such as single network slice selection assistance information (S-NSSAI), data network name (DNN), Access Type, radio access technology (RAT) Type, PDU Session Type to determine the PHP parameters. For example, the SMF may add the Drop-Delayed-Packet parameter to the UL QoS Rule(s) for the UE, and/or the Drop-Delayed-Packet parameter for the DL and/or UL QoS Profile(s) for the (R)AN, and/or the Drop-Delayed-Packet parameter for the DL and/or UL QoS flows for the UPF. The presence of the Drop-Delayed-Packet parameter indicates that the packets delayed longer than the PDT may be dropped.

In another embodiment of the present invention, some PHP parameters may be provided by an AF and may be used by the PCF to create values for the PHP parameters. The PCF may consequently modify the PHP of the existing QoS flow(s) of the PDU session, or QoS flows of future PDU Sessions.

In another embodiment of the present invention, the UE may send a packet handling indication to the CN indicating that the delayed packets (or PDU) of a QoS flow should be dropped (discarded) or delivered. The UE packet handling indication may be sent from the UE to CN together with QFI and/or 5QI, and/or Packet Filter information (e.g. Packet Filter description, Packet Filter index (Packet Filter indices)). Based on the UE packet handling indication, the CN CP function(s), such as PCF and/or SMF may create and send the PHP parameters to the user plane entities, such as UE, the (R)AN and UPF.

According to TS 23.501, Clause 5.7.1.1, any QoS Flow is characterized by: a QoS profile provided by the SMF to the AN via the AMF, over the N2 reference point or preconfigured in the AN; one or more QoS rule(s), which may be provided by the SMF to the UE via the AMF, over the N1 reference point and/or derived by the UE by applying Reflective QoS control; and one or more UL and DL PDR(s) provided by the SMF to the UPF.

For a PDU session within the 5GS, a QoS Flow associated with the default QoS rule is required to be established. This QoS Flow remains established throughout the lifetime of the PDU Session. This QoS flow should be a Non-GBR QoS Flow.

According to an embodiment of the present invention, the PHP parameters may be implemented as parameters of QoS Profile for the (R)AN.

According to TS 23.501, clause 5.7.1.2, a QoS Flow may either be 'GBR' or 'Non-GBR' depending on its QoS profile. For each QoS Flow, the QoS profile may have QoS parameters including a 5G QoS Identifier (5QI) and an Allocation and Retention Priority (ARP). According to an embodiment of the present invention, one or more PHP parameters may also be provided for each QoS Flow. For each Non-GBR QoS Flow only, the QoS profile may also include the Reflective QoS Attribute (RQA) parameter. For each GBR QoS Flow only, the QoS profile may also include the following QoS parameters: Guaranteed Flow Bit Rate (GFBR) (UL and DL); and Maximum Flow Bit Rate (MFBR) (UL and DL).

According to an embodiment of the present invention, for a GBR QoS Flow only, the QoS parameters may include Notification control; Maximum Packet Loss Rate (UL and DL); and one or more PHP Parameters can be placed here. This implies that the PHP Parameters are applied to GBR QoS Flow only. According to another embodiment of the present invention, one or more PHP Parameters may be provided to delay critical GBR QoS Flow only, In TS 23.501, Release 15, the Maximum Packet Loss Rate (UL, DL) is only provided for a GBR QoS flow, belonging to voice media.

Each QoS profile has one corresponding QoS Flow identifier (QFI), which is not included in the QoS profile itself. Using a dynamically assigned 5QI for a QoS Flow requires the signaling of QoS characteristics. Details of QoS characteristics are described in TS 23.501, clause 5.7.3. When a standardized 5QI is used for a QoS Flow, some of the QoS characteristics may be signaled as described in clause 5.7.3. The signaled QoS characteristics are included in the QoS profile. According to an embodiment of the present invention, one or more PHP Parameters may be part of a standardized 5QI or dynamically signaled in the QoS profile.

TS 23.501, clause 5.7.3.1 specifies the 5G QoS characteristics associated with 5QI. The characteristics describe the packet forwarding treatment that a QoS Flow receives (edge-to-edge) between the UE and the UPF in terms of the following performance characteristics: Resource Type, including GBR, Delay critical GBR or Non-GBR; Priority level; Packet Delay Budget; Packet Error Rate; Averaging window; Maximum Data Burst Volume (only for Delay-critical GBR resource type).

According to an embodiment of the present invention the PHP Parameters may be included as one of the performance characteristics. The 5G QoS characteristics should be understood as guidelines for setting node specific parameters for each QoS Flow, for example, for 3GPP radio access link layer protocol configurations. The Standardized or pre-configured 5G QoS characteristics are indicated through the 5QI value, and are not signaled on any interface. The signaled QoS characteristics are included as part of the QoS profile.

In an enhancement to TS 23.501, Clause 5.7.1.4, the UE performs the classification and marking of the UL User plane traffic, for example, associating the UL traffic to QoS Flows based on QoS rules. These QoS rules may be explicitly provided to the UE (for example, by explicitly signaling the QoS rules using the PDU Session Establishment/Modification procedure). In an enhancement to clause 5.7.5, the QoS rules may also be pre-configured in the UE or implicitly derived by the UE via applying the Reflective QoS (see clause 5.7.5). In another enhancement, a QoS rule contains the QFI of the associated QoS Flow, a Packet Filter Set (see clause 5.7.6), the PHP parameters, and a precedence value (see clause 5.7.1.9). Additionally, for a dynamically assigned QFI, the QoS rule(s) and the QoS Flow level QoS parameters (for example, 5QI, GFBR, MFBR, Averaging Window) are signaled to the UE on a per QoS Flow basis.

According to an embodiment of the present invention, the PHP parameters, as a part of QoS rule, may be dynamically signaled to the UE on a per QoS Flow basis. An explicitly signaled QoS rule contains a QoS rule identifier that is unique within the PDU Session and is generated by the SMF. The UE may have functionality for handling the PHP parameters. For example, the UE may be capable of monitoring the uplink packet delay in order to discarded the packets if the packet delay is larger than a certain value. The UE capability for handling the PHP parameters may be indicated in a UE-specific database, for example the UE Subscription data stored in the UDM or UDR. The UE capability for handling the PHP parameters could be part of the 5G session management (5GSM) Core Network Capability of the UE. The 5GSM Core Network Capability of the UE may be stored in a CP function, such as the UDM, and/or UDR, and/or the SMF. The UE capability for handling the PHP parameters may be transferred from the UE to the CN, which could be part of 5GSM Core Network Capability, when the UE requests for PDU Session Establishment.

The SMF may send the PHP parameters to the UE if the SMF knows that the UE can handle the PHP parameters. The SMF may send the PHP parameters to the UE if the SMF may not know that the UE can handle the PHP parameters. The UE may send a message to the SMF indicating that the UE does not support PHP parameters. For example, if the SMF sends the PHP parameters that include the Drop_Delayed_Packet parameter, the UE may not have the capability to monitor the uplink packet delay, the UE may send a message to the SMF or another CP function indicating that the UE cannot handle the packet delay monitoring, or the UE can send a reject message to the SMF.

There can be more than one QoS rule associated with the same QoS Flow (in other words, with the same QFI). For every PDU Session establishment, a default QoS rule, associated with a QoS Flow, is required to be sent to the UE. For an IP type PDU Session or an Ethernet type PDU Session, the default QoS rule is the only QoS rule of a PDU Session whose Packet Filter Set may contain a packet filter that allows all UL packets; and in this case, the highest precedence value may be used for the QoS rule. It is noted that the filter in the Packet Filter Set of the default QoS rule that allows all UL traffic (also known as match-all filter) is described in TS 23.501. It is also noted that clause 5.7.1 describes how the UE evaluates UL packets against the Packet Filter Set in a QoS rule.

For an Unstructured type PDU Session, the default QoS rule does not contain a Packet Filter Set; and in this case, the default QoS rule defines the treatment of all packets in the PDU Session. If the default QoS rule does not contain a Packet Filter Set or contains a Packet Filter Set that allows all UL packets, Reflective QoS should not be applied for the QoS Flow (which the default QoS rule is associated with) and the RQA should not be sent for this QoS Flow.

According to TS 23.501, Clause 5.8.2.7, ARP is used for admission control, such as retention and pre-emption of the new QoS Flow. The ARP value is not required to be provided to the UPF. For every QoS Flow, the SMF may use the 5QI, and optionally, the ARP priority level, to determine the transport level packet marking and provide the transport level packet marking to the UPF. The SMF may provide the Session Aggregate Maximum Bit Rate (Session-AMBR) value of the PDU Session to the UE, and provide the Session-AMBR value of the PDU Session with a QoS Enforcement Rule correlation ID to the UPF. Subsequently, the UPF and the UE can enforce the Session-AMBR of the PDU Session across all Non-GBR QoS Flows of the PDU Session. The SMF may provide the GFBR and the MFBR value for each GBR QoS Flow of the PDU Session to the UPF.

According to an embodiment of the present invention, the SMF may also provide the PHP parameters for each QoS Flow of the PDU Session to the UPF. The present invention provides a solution by adding the PHP parameters to the QoS model of 5G system. According to an embodiment of the present invention, the SMF may provide the PHP parameters for each GBR QoS Flow of the PDU Session to the UPF. In another embodiment, the SMF may provide the PHP parameters for each delay critical GBR QoS Flow of the PDU Session to the UPF. Similarly, in another embodiment, the SMF may provide the PHP parameters for each non-GBR QoS Flow of the PDU Session to the UPF.

In some embodiments of the present invention, the SMF may instruct the UPF and/or (R)AN and/or UE, and/or CP functions (such as AMF, NEF) to perform one of the packet delay measurement methods describe earlier. The SMF may also send PHP parameters to the devices in the user plane (e.g. the UPF(s) and/or (R)AN node(s) and/or UE). The UPF and/or (R)AN, and/or UE, and/or CP functions may not discard the measurement packets and/or acknowledgement packets (for measurement packets) if the measurement packets or acknowledgment packets are delayed longer than the NF-PDB, and/or delayed longer than the segment PDB, and/or delayed longer E2E PDB. This is to make sure that the measurement packets and acknowledgment packets can be successfully sent from the UPF to the UE and/or from the UE to the UPF to complete the packet delay measurement.

In some embodiments, the SMF may include an indication, for example do-not-discard-delayed-measurement-packet parameter, in PHP to be sent to the (R)AN, and/or UE, and/or UPF, and/or CP functions so that the network entities that involve packet delay measurement may not discard the measurement packets.

In some embodiments, the SMF may include an indication, for example discard-delayed-measurement-packet parameter, in PHP to be sent to the devices in the user plane and/or CP functions, instructing the network entities that perform packet delay measurements when to discard the delayed measurement packets. In some embodiments, the delayed packets are counted as error packets. Hence the measured packet delay may measure the packet delay of successfully-delivered packets.

In some embodiments of the present invention, the PHP is separate from QoS profile, or QoS rule, or PDR. The SMF may send one or more PHPs to the (R)AN, one or more PHPs to the UE, one or more PHPs to the UPF. Each PHP has a PHP identifier (ID). The SMF may include in QoS profile and/or QoS rule and/or PDR the PHP ID. Accordingly, a PHP for the (R)AN may be associated with one or more QoS profiles, whereas a PHP for the UE may be associated with one or more QoS rules, and a PHP for the UPF may be associated with one or more PDRs.

In some embodiments of the present invention, the PHP parameters are part of the QoS profile, or QoS rule, or PDR. During a PDU Session Establishment procedure, according to an embodiment which provides an enhancement to the procedure specified in 3GPP TS 23.502 version 15.2.0 Release 15 (TS 23.502), clause 4.3.2, the PHP (including the above described parameters) may be transferred from the PCF to the SMF and to UP devices in the user plane, such as UE and/or (R)AN, and/or UPF. The modifications to this PDU Session Establishment procedure are described as follows.

Clause 4.3.2.2.1 of TS 23.502 specifies the PDU Session establishment in roaming and non-roaming with local breakout cases. This procedure is used for various reasons including: establishing a new PDU Session; handing over a PDN Connection in EPS to PDU Session in 5GS without N26 interface; Switching an existing PDU Session between non-3GPP access and 3GPP access (the specific system behavior in this case is further defined in clause 4.9.2; or requesting a PDU Session for Emergency services.

In the case of roaming, the AMF determines if a PDU Session is to be established in LBO or Home Routing. Where the PDU Session is to be established in LBO, the procedure for roaming is the same as that of non-roaming, except that the AMF, SMF, UPF and the PCF are located in the visited network. PDU Sessions for Emergency services are never established in Home Routed mode.

Figure 8:
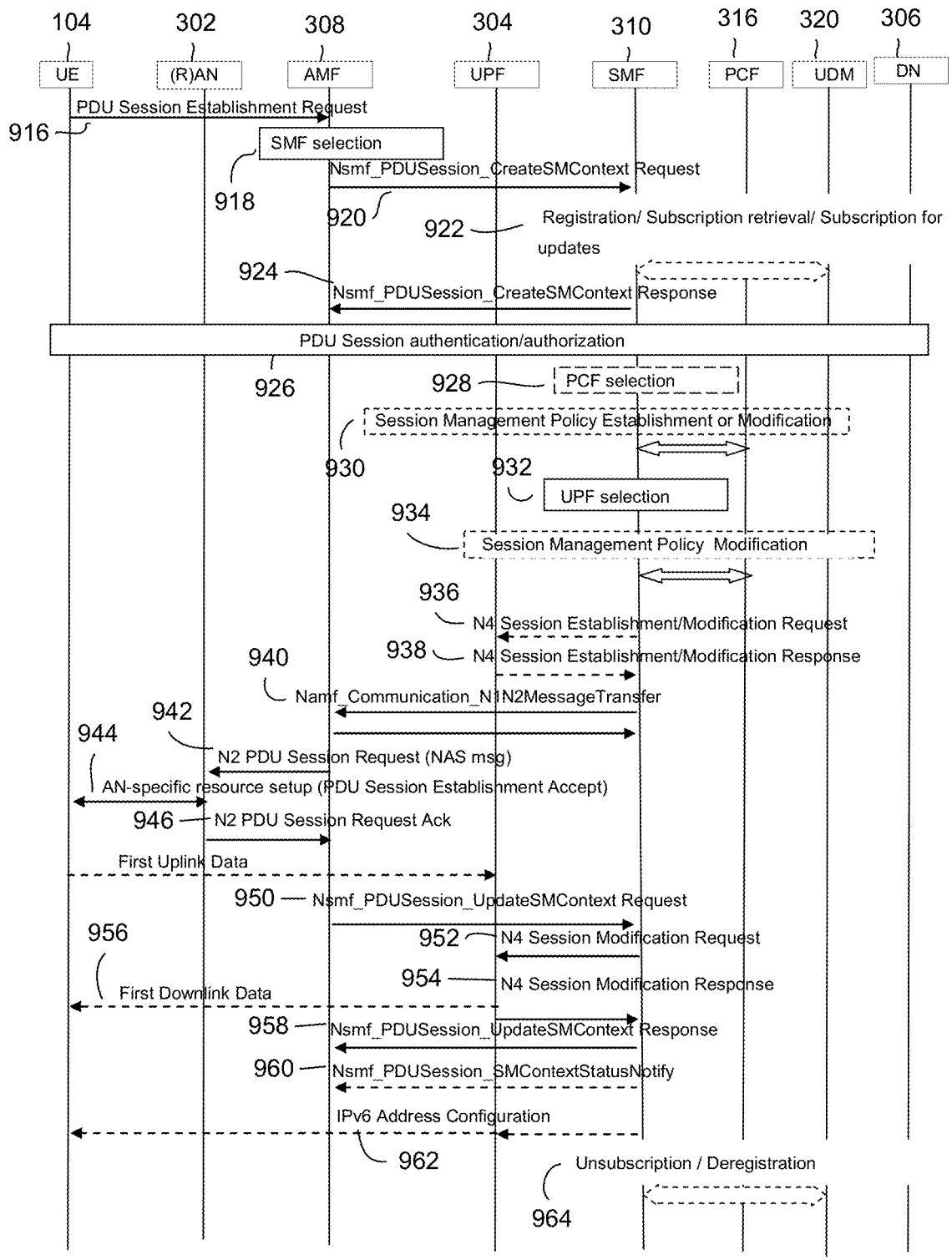
FIG. 8 shows a message flow diagram illustrating a representative process for UE-requested PDU Session Establishment for non-roaming and roaming with local breakout, which may be used in embodiments of the present invention.

FIG. 8 shows a message flow diagram illustrating a representative process for UE-requested PDU Session Establishment for non-roaming and roaming with local breakout, as depicted in FIG. 4.3.2.2.1-1 of TS 23.502, which may be used in embodiments of the present invention. The procedure assumes that the UE has already registered on the AMF; and so, unless the UE is Emergency registered, the AMF has already retrieved the user subscription data from the UDM.

Referring to FIG. 8, UE 104 sends Non-Access-Stratum (NAS) Message (S-NSSAI(s), DNN, PDU Session ID, Request type, Old PDU Session ID, N1 session management (SM) container (PDU Session Establishment Request) to AMF 308. In order to establish a new PDU Session, the UE 104 generates a new PDU Session ID. The UE 104 initiates the UE Requested PDU Session Establishment procedure by the transmission of a NAS message containing a PDU Session Establishment Request 916 within the N1 SM container. The PDU Session Establishment Request includes a PDU session ID, Requested PDU Type, a Requested SSC mode, 5GSM Capability, Protocol Configuration Options, SM PDU DN Request Container.

The Request Type indicates "Initial request" if the PDU Session Establishment is a request to establish a new PDU Session and indicates "Existing PDU Session" if the request refers to an existing PDU Session switching between 3GPP access and non-3GPP access or to a PDU Session handover from an existing PDN connection in EPC. If the request refers to an existing PDN connection in EPC, the S-NSSAI(s) are set as described in TS 23.501 clause 5.15.7.2

When an Emergency service is required and an Emergency PDU Session is not already established, the UE 104 may initiate the UE Requested PDU Session Establishment procedure 916 with a Request Type indicating "Emergency Request".

So, if the PDU Session Establishment is a request to establish a PDU Session for Emergency services, the Request Type indicates "Emergency Request". Whereas if the request refers to an existing PDU Session for Emergency services switching between 3GPP access and non-3GPP access, the Request Type indicates "Existing Emergency PDU Session"

The 5GSM Capability indicates UE's support for Reflective QoS and for Multi-homed IPv6 PDU Session (only if the Requested PDU Type was set to "IPv6" or "IPv4v6"). The 5GSM Capability may indicate UE's support for one or some or all PHP parameters. For example, the 5GSM Capability may indicate UE's support for monitoring packet delay and/or discarding delayed packets in the uplink.

The NAS message 916 sent by the UE 104 is encapsulated by the AN in an N2 message towards the AMF 308 that should include the User location information and the Access Type Information. The PDU Session Establishment Request message may contain SM PDU DN Request Container, which contains information for the PDU Session authorization by the external DN. The packet switched (PS) Data Off status is included in PCO (Protocol Configuration Options) in the PDU Session Establishment Request message. The AMF 308 receives the NAS SM message 916 together with User Location Information (for example, the Cell Id in case of the next generation (NG) RAN (NG-RAN) from the AN.

The UE 104 includes the S-NSSAI from the Allowed NSSAI of the current access type. If the Mapping of Allowed NSSAI was provided to the UE 104, the UE 104 may provide both the S-NSSAI from the Allowed NSSAI and the corresponding S-NSSAI from the Mapping of Allowed NSSAI. If the procedure is triggered for SSC mode 3 operation, the UE 104 may also include the Old PDU Session ID, which indicates that the PDU Session ID of the on-going PDU Session be released in the NAS message. The Old PDU Session ID is an optional parameter that is included only if the procedure is triggered for SSC mode 3 operation.

When the UE 104 is outside the availability area of the Local Area Data Network (LADN), the UE 104 may not trigger a PDU Session establishment for a PDU Session corresponding to an LADN. If the UE 104 is establishing a PDU session for IP Multimedia Subsystem (IMS), and the UE 104 is configured to discover the Proxy-Call Session Control Function (P-CSCF) address during the connectivity establishment, the UE 104 may include an indicator requesting P-CSCF IP address(es) within the SM container.

The AMF 308 determines that the NAS message corresponds to a request for a new PDU Session based on the Request Type indicating "initial request" and that the PDU Session ID is not used for any existing PDU Session(s) of the UE 104. If the NAS message does not contain an S-NSSAI, the AMF 308 may determine a default S-NSSAI for the requested PDU Session based on the operator policy; but if the NAS message contains only one default S-NSSAI, then the AMF 308 may determine a default S-NSSAI for the requested PDU Session according to the UE subscription.

The AMF 308 selects 918 an SMF as described in clause 4.3.2.2.3 of TS 23.502. If the Request Type indicates "Initial request" or the request is due to a handover from EPS or a non-3GPP access serving by a different AMF, the AMF 308 stores an association of the S-NSSAI(s), the DNN, the PDU Session ID and the SMF ID. If the Request Type is "initial request" and the Old PDU Session ID indicates that the existing PDU Session is also contained in the message, the AMF 308 selects 918 an SMF as described in clause 4.3.5.2 of TS 23.502 and stores an association of the new PDU Session ID, the S-NSSAI, and the selected SMF ID.

If the Request Type indicates "Existing PDU Session", the AMF 308 selects 918 an SMF based on the SMF-ID received from UDM 320. The case where the Request Type indicates an "Existing PDU Session", and either the AMF 308 does not recognize the PDU Session ID, or the subscription context that the AMF 308 received from UDM 320 during the Registration or Subscription Profile Update Notification procedure 922 does not contain an SMF ID corresponding to the PDU Session ID constitutes an error case.

If the Request Type indicates "Existing PDU Session" referring to an existing PDU Session moved between 3GPP access and non-3GPP access, and if the S-NSSAI of the PDU Session is present in the Allowed NSSAI of the target access type, the PDU Session Establishment procedure can be performed in the following circumstances: where the SMF ID corresponding to the PDU Session ID and the AMF 308 belong to the same PLMN; and where the SMF ID corresponding to the PDU Session ID belongs to the Home Public Land Mobile Network (HPLMN). Otherwise, the AMF 308 may reject the PDU Session Establishment Request 916 with an appropriate reject cause. It should be noted that the SMF ID includes the PLMN ID that the SMF 310 belongs to.

The AMF 308 may reject a request coming 916 from a UE 104 when the UE 104 is registered for Emergency services and the Request Type indicates neither "Emergency Request" nor "Existing Emergency PDU Session". When the Request Type indicates "Emergency Request", the AMF 308 is not expecting the UE 104 to provide any S-NSSAI and DNN values, instead, the AMF 308 uses values that are locally configured.

If the Request Type indicates "Emergency Request" or "Existing Emergency PDU Session", the AMF 308 selects 918 the SMF as described in TS 23.501, clause 5.16.4.

The AMF 308 may send to SMF 310 either a request for Nsmf_PDUSession_CreateSMContext Request 920 (Subscription Permanent Identifier (SUPI), DNN, S-NSSAI(s), PDU Session ID, AMF ID, Request Type, PCF ID, N1 SM container (PDU Session Establishment Request), User location information, Access Type, Permanent Equipment Identifier (PEI), Generic Public Subscription Identifier (GPSI), Subscription For PDU Session Status Notification, DNN Selection Mode) or a request for Nsmf_PDUSession_UpdateSMContext Request (SUPI, DNN, S-NSSAI(s), PDU Session ID, AMF ID, Request Type, N1 SM container (PDU Session Establishment Request 916), User location information, Access Type, RAT type, PEI). If the AMF 308 does not have an association with an SMF 310 for the PDU Session ID provided by the UE 104 (e.g. when Request Type indicates "initial request"), the AMF 308 invokes the Nsmf_PDUSession_CreateSMContext Request 920; but if the AMF 308 already has an association with an SMF 310 for the PDU Session ID provided by the UE 104 (e.g. when Request Type indicates "existing PDU Session"), the AMF 308 invokes the Nsmf_PDUSession_UpdateSMContext Request.

The AMF 308 may send the S-NSSAI from the Allowed NSSAI to the SMF 310. For roaming scenario, the AMF 308 may also send the corresponding S-NSSAI from the Mapping of Allowed NSSAI to the SMF 310.

The AMF ID is the UE's Globally Unique AMF Identifier (GUAMI) which uniquely identifies the AMF 308 serving the UE 104. The AMF 308 forwards the PDU Session ID together with the N1 SM container containing the PDU Session Establishment Request received 916 from the UE 104. If the GPSI is available at AMF 308, the GPSI may be included.

When the UE 104 has registered for Emergency services without providing an SUPI, the AMF 308 may provide the PEI instead of the SUPI. The PEI is defined in TS 23.501, clause 5.9.3. In the case that UE 104 has registered for Emergency services with an SUPI but has not been authenticated, the AMF 308 indicates that the SUPI has not been authenticated. The SMF 310 determines that the UE 104 has not been authenticated when the SMF 310 does not receive an SUPI for the UE 104, or when the AMF 308 indicates that the SUPI has not been authenticated.

If the Old PDU Session ID is included in the request 916 and the SMF 310 is not to be reallocated, the AMF 308 includes the Old PDU Session ID in the Nsmf_PDUSession_CreateSMContext Request.

The AMF 308 determines the DNN Selection Mode, which indicates whether an explicitly subscribed DNN has been provided by the UE 104 in its PDU Session Establishment Request 916. The SMF 310 may use the DNN Selection Mode when deciding whether to accept or reject the UE request 916.

In the local breakout case, where the SMF 310 (in the Visiting Public Land Mobile Network (VPLMN)) is not able to process some part of the N1 SM information that Home Routed Roaming is required, the SMF 310 may respond to the AMF 308 indicating that it is not the right SMF 310 to handle the N1 SM message. The SMF 310 responds to the AMF 308 by invoking the Nsmf_PDUSession_CreateSM Response service operation. The SMF 310 includes a proper N11 cause code triggering the AMF 308 to proceed with the home routed case. The procedure starts again at step 2 of clause 4.3.2.2.2, TS 23.502.

In the non-roaming case, the AMF 308 may include the Home PCF (H-PCF) ID in the Nsmf_PDUSession_CreateSMContext Request 920, and in the local breakout roaming case, the AMF 308 may include Visiting PCF (V-PCF) ID in the Nsmf_PDUSession_CreateSMContext Request 920.

If the Request Type 920 indicates neither "Emergency Request" nor "Existing Emergency PDU Session", and the SMF 310 has not yet registered for this PDU Session ID, then the SMF 310 registers 922 with the UDM 320 using Nudm_UECM_Registration (SUPI, DNN, PDU Session ID) for a given PDU Session. As a result, the UDM 320 stores the following information: SUPI, SMF identity, SMF address and the associated DNN and PDU Session ID. The UDM 320 may further store this information in UDR by Nudr_DM_Update (SUPI, Subscription Data, UE context in SMF data). If the Session Management Subscription data for corresponding SUPI, DNN and S-NSSAI is not available, the SMF 310 retrieves 922 the Session Management Subscription data using Nudm_SDM_Get (SUPI, Session Management Subscription data, DNN, S-NSSAI) and subscribes 922 to be notified when this subscription data is modified using Nudm_SDM_Subscribe (SUPI, Session Management Subscription data, DNN, S-NSSAI). The UDM 320 may obtain this information from the UDR by Nudr_DM_Query (SUPI, Subscription Data, Session Management Subscription data, DNN, S-NSSAI) and may subscribe 922 to notifications from UDR for the same data by Nudr_DM_subscribe. The S-NSSAI used with the UDM 320 may be the S-NSSAI having the value used for the HPLMN.

The SMF 310 may use the DNN Selection Mode when deciding whether to retrieve the Session Management Subscription data. For example, in case the (DNN, S-NSSAI) is not explicitly subscribed, the SMF 310 may use the local configuration instead of the Session Management Subscription data.

For an authenticated non-roaming UE 104, where the Request Type 920 received indicates an "Emergency Request", based on operator configuration (e.g. related with whether the operator uses a fixed SMF for Emergency calls, etc.), the SMF 310 may register 922 in the UDM 320 using Nudm_UECM_Registration (SUPI, PDU Session ID, Indication of Emergency Services) for a given PDU Session that is applicable for emergency services. As a result, the UDM 320 may store the SMF address and the applicable PDU Session for Emergency services.

For an unauthenticated UE 104 or a roaming UE 104, where the Request Type 920 received indicates an "Emergency Request", the SMF 310 may not register in the UDM 320 for a given PDU Session.

If the Request Type 920 indicates an "Existing PDU Session" or an "Existing Emergency PDU Session", the SMF 310 determines whether the request is due to a switching between 3GPP access and non-3GPP access or due to a handover from EPS. The SMF 310 identifies the existing PDU Session based on the PDU Session ID; the SMF 310 does not create a new SM context, but instead, the SMF 310 updates the existing SM context and provides the representation of the updated SM context to the AMF 308 in the response. If the Request Type is "Initial request" and the Old PDU Session ID is included in Nsmf_PDUSession_CreateSMContext Request 920, the SMF 310 identifies the existing PDU Session, to be released, based on the Old PDU Session ID.

Subscription data includes the authorized PDU type(s), authorized SSC mode(s), default 5QI and ARP, and subscribed Session-AMBR. Static IP address/prefix may be included in the subscription data if the UE 104 has subscribed to it.

The SMF 310 checks the validity of the UE request 916 by checking whether the UE request 916 is compliant with the user subscription and with local policies. If the DNN corresponds to an LADN, the SMF 310 checks the validity of the UE request 916 by checking whether the UE 104 is located within the LADN service area; SMF can check whether the UE 104 is located within the LADN service area by using the UE location reporting from the AMF 308. If the UE request 916 is considered as not valid, the SMF 310 decides not to accept the request to establish the PDU Session.

Depending on the request received, the SMF 310 may respond to the AMF 308 either by Nsmf_PDUSession_CreateSMContext Response 924 (Cause, SM Context ID or N1 SM container (PDU Session Reject (Cause))) or by Nsmf_PDUSession_UpdateSMContext Response. If the SMF 310 received the Nsmf_PDUSession_CreateSMContext Request 920, and the SMF 310 is able to process the PDU Session establishment request 916, the SMF 310 creates an SM context and responds to the AMF 308 by providing an SM Context Identifier.

When the SMF 310 decides not to accept the request to establish a PDU Session, the SMF 310 rejects the UE request 916 via an NAS SM signalling, including a relevant SM rejection cause by responding 924 to the AMF 308 with Nsmf_PDUSession_CreateSMContext Response. The SMF 310 also indicates to the AMF 308 that the PDU Session ID is to be considered as released. The SMF 310 proceeds to 964 and the PDU Session Establishment procedure is stopped.

The PDU Session authentication/authorization 926 is optional/secondary procedure. If the Request Type 920 indicates an "Existing PDU Session", the SMF 310 does not perform a secondary authorization/authentication. If the Request Type 920 received indicates an "Emergency Request" or an "Existing Emergency PDU Session", the SMF 310 may not perform a secondary authorization/authentication. If the SMF 310 needs to perform 926 a secondary authorization/authentication during the establishment of the PDU Session, the SMF 310 triggers the PDU Session establishment authentication/authorization as described in clause 4.3.2.3. The SMF 310 performs 926 the secondary authorization/authentication by a DN Authentication, Authorization and Accounting (DN-AAA) server as described in TS 23.501, clause 5.6.6.

If a dynamic PCC is deployed, the SMF 310 performs 928 PCF selection as described in TS 23.501, clause 6.3.7.1. If the Request Type 920 indicates an "Existing PDU Session" or an "Existing Emergency PDU Session", the SMF 310 may use the PCF 316 already selected for the PDU Session. If a dynamic PCC is not deployed, the SMF 310 may apply the local policy.

The SMF 310 may perform 930 a Session Management Policy Establishment procedure, as defined in clause 4.16.4, to establish a PDU Session with the PCF 316 and get the default PCC Rules for the PDU Session. According to an embodiment of the present invention, the default PCC Rules may also include the PHP or all or some of the PHP parameters. If the GPSI is available at SMF 310, then the GPSI may be included. If the Request Type 920 indicates an "Existing PDU Session", the SMF 310 may notify an event previously subscribed by the PCF 316 via a Session Management Policy Modification 934 procedure, as defined in clause 4.16.5. The PCF 316 may also provide a User Plane security policy for this PDU Session. The PCF 316 may use the PDU Session parameters provided by the SMF 310 and/or connection management parameters provided by the AMF 308, and/or the application information provided by the AF, and/or user subscription data in the UDM 320 and/or the user subscription data in the UDR (the UDR is not shown in FIG. 8), to determine how to set the PHP parameters for one or more QoS flows of the requested PDU Session. The input parameters for PCF 316 to make decision may be one or more of following parameters: SUPI, PDU Session Type, S-NSSAI, Network Slice Instance (NSI) ID, DNN, Access Type, PEI, User Location Information, Serving Network, RAT type, Charging Characteristics, default QoS information, Internal Group Identifier.

Based on the Emergency DNN, the PCF 316 sets the ARP of the PCC rules to a value that is reserved for Emergency services as described in TS 23.503.

It is noted that the purpose of 928 and 930 is to receive the PCC rules before selecting 932 the UPF. If PCC rules are not needed as input for the UPF selection 932, then 928 and 930 can be performed after 932.

If the Request Type 920 indicates an "Initial request", the SMF 310 selects an SSC mode for the PDU Session as described in TS 23.501 clause 5.6.9.3. The SMF 310 also selects one or more UPFs 932 (as may be needed) as described in TS 23.501, clause 6.3.3. In case of PDU Type IPv4, IPv6 or IPv4v6, the SMF 310 allocates an IP address/prefix for the PDU Session as described in TS 23.501, clause 5.8.1. In case of PDU Type IPv6 or IPv4v6, the SMF 310 also allocates an interface identifier to the UE 104 for allowing the UE 104 to build its link-local address. For Unstructured PDU Type, the SMF 310 may allocate an IPv6 prefix for the PDU Session and an N6 point-to-point tunnelling (based on the UDP/IPv6) as described in TS 23.501, clause 5.6.10.3. For Ethernet PDU type PDU Session, the SMF 310 does not allocate a MAC nor an IP address to the UE 104.

If the Request Type 920 is an "Existing PDU Session", the SMF 310 maintains the same IP address/prefix that has already been allocated to the UE 104 in the source network. If the Request Type 920 indicates an "Existing PDU Session" referring to an existing PDU Session moved between a 3GPP access and a non-3GPP access, the SMF 310 maintains the SSC mode of the PDU Session, the current PDU Session Anchor and the IP address. If the Request Type 920 indicates an "Emergency Request", the SMF 310 selects 932 the UPF as described in TS 23.501, clause 5.16.4, and further selects an SSC mode 1.

It is noted that the SMF 310 may decide to trigger, for example, a new intermediate UPF insertion or an allocation of a new UPF as described in clause 4.2.3.2 of TS 23.502.

The SMF 310 may perform 934 a Session Management Policy Modification procedure, as defined in clause 4.16.5 of TS 23.502, to report some event to the previously subscribed PCF 316. If the Request Type 920 is an "initial request", and a dynamic PCC is deployed, and also the PDU Type is IPv4, IPv6 or IPv4v6 protocol, the SMF 310 notifies the previously subscribed PCF 316 with the allocated UE IP address/prefix(es).

Where the PCF 316 is deployed, and the PS Data Off event trigger is provisioned, the SMF 310 may further report the PS Data Off status to PCF 316; the additional behaviour of the SMF 310 and the PCF 316 for 3GPP PS Data Off is defined in TS 23.503.

It is noted that If an IP address/prefix has been allocated before 928 and 930 (for example, subscribed static IP address/prefix in UDM/UDR) or 928 and 930 is performed after 932, the IP address/prefix can be provided to PCF 316 at 928 and 930 and the IP address/prefix notification can be skipped at 934.

The PCF 316 may provide SMF 310 with updated policies including authorized Session-AMBR, authorized 5QI and ARP.

The SMF 310 may use the PDU Session parameters provided by the UE 104 and/or connection management parameters provided by the AMF 308, and/or the application information provided by the AF (which is part of the DN306 in FIG. 8), and/or user subscription data in the UDM 320, and/or the PCC rules from the PCF 316, to determine how to set the PHP parameters for one or more QoS flows of the requested PDU Session. The input parameters for the SMF 310 to make decision may be one or more of following parameters: SUPI, PDU Session Type, S-NSSAI, NSI ID, DNN, Access Type, PEI, User Location Information, Serving Network, RAT type, Charging Characteristics, default QoS information, Internal Group Identifier, PHP parameters from PCF 316 if the PCF 316 is deployed in the mobile network and the PCF 316 provides some or all PHP parameters to the SMF 310. The SMF 310 may send the PHP parameters to the UE 104 for the UL QoS flows, the PHP parameters to the (R)AN 302 for UL and DL QoS flows, the PHP parameters to the UPF 304 for UL and/or DL QoS flows.

If multiple UPFs are selected for the PDU session and/or QoS flows, the SMF 310 may provide the PHP parameters for the DL QoS flows to the UPF that connects to the (R)AN 302 via the N3 interface only. In this embodiment, only the UPF that connects with (R)AN 302 monitors the packet delay in the CN and may drop the DL packets if instructed by the PHP parameters.

If multiple UPFs are selected for the PDU session and/or QoS flows, the SMF 310 may provide PHP parameters for the UL QoS flows to the UPF that connects to the DN 306 via the N6 interface. In this embodiment, only the UPF that connects to the DN 306 may monitor the uplink packet delay within the CN, or the uplink end-to-end packet delay between the UE 104 and UPF 304, or the uplink packet delay between the (R)A 302 and UPF 304

If Request Type indicates an "initial request", the SMF 310 initiates 936 an N4 Session Establishment procedure with the selected UPF 304. Otherwise, the SMF 310 initiates 936 an N4 Session Modification procedure with the selected UPF 304. The SMF 310 sends 936 an N4 Session Establishment/Modification Request to UPF 304; in its request, the SMF 310 provides the Packet detection, the enforcement and reporting rules to be installed on the UPF 304 for this PDU Session. According to an embodiment of the present invention, SMF 310 may also provide the PHP or the PHP parameters in its request to UPF 304. If the CN Tunnel Info is allocated by the SMF 310, the CN Tunnel Info is also provided to the UPF 304 at 936. If the selective User Plane deactivation is required for this PDU Session, the SMF 310 determines the Inactivity Timer and provides it to the UPF 304. The UPF 304 acknowledges the request 936 by sending 938 an N4 Session Establishment/Modification Response. If the CN Tunnel Info is allocated by the UPF 304, the CN Tunnel Info is also provided to SMF 310 at 938.

If multiple UPFs 304 are selected for the PDU Session, the SMF 310 initiates 936 an N4 Session Establishment/Modification procedure with each UPF 304 of the PDU Session. If the Request Type indicates an "Existing PDU Session", and the SMF 310 creates a CN Tunnel Info, then 936 and 938 are skipped; otherwise 936 and 938 is performed to obtain the CN Tunnel Info from the UPF 304 using the N4 Session Modification Procedure.

The SMF 310 sends 940 to AMF 308 the Namf_Communication_N1N2MessageTransfer (PDU Session ID, Access Type, N2 SM information (PDU Session ID, QFI(s), QoS Profile(s), CN Tunnel Info, S-NSSAI from the Allowed NSSAI, Session-AMBR, PDU Session Type, User Plane Policy Enforcement), N1 SM container (PDU Session Establishment Accept (QoS Rule(s), selected SSC mode, S-NSSAI(s), DNN, allocated IPv4 address, interface identifier, Session-AMBR, selected PDU Session Type, Reflective QoS Timer (if available), P-CSCF address(es)))). If multiple UPFs 304 are used for the PDU Session, the CN Tunnel Info contains tunnel information related to the UPF that terminates N3.

The N2 SM information carries information that the AMF 308 may forward to the (R)AN 302. The information forwarded to (R)AN 302 may include: the CN Tunnel Info corresponding to the Core Network address of the N3 tunnel, which corresponds to the PDU Session; one or more QoS profiles and the corresponding QFIs (further described in TS 23.501, clause 5.7), in which according to an embodiment of the present invention, each QoS profile may include the PHP or the PHP parameters; the PDU Session ID, which may be used by the AN to signal with and indicate to the UE 104 the association between (R)AN 302 resources and a PDU Session for the UE 104; a PDU Session associated to an S-NSSAI and a DNN, where the S-NSSAI provided to the (R)AN 302 is the S-NSSAI with the value used for serving the PLMN; and the User Plane Policy Enforcement information, which is determined by the SMF 310 as described in clause 5.10.3 of TS 23.501. It is noted that in some embodiments a PDU Session may have multiple QoS flows, with each QoS flow having a QoS profile. Accordingly there can be one or more QoS profiles for a PDU session.

The N1 SM container contains the PDU Session Establishment Accept, in which, the AMF 308 may provide to the UE 104. If the UE 104 requested a P-CSCF discovery, then the message may also include the P-CSCF IP address(es) as determined by the SMF 310. The PDU Session Establishment Accept includes the S-NSSAI from the Allowed NSSAI. In the case of roaming, the PDU Session Establishment Accept also includes the corresponding S-NSSAI from the Mapping Of Allowed NSSAI, which was received by the SMF 310. Multiple QoS Rules and QoS Profiles may also be included in the PDU Session Establishment Accept within the N1 SM and the N2 SM information. According to an embodiment of the present invention, each of the QoS Rules may include the PHP or the PHP parameters. The Namf_Communication_N1N2MessageTransfer further contains the PDU Session ID and information to let the AMF 308 know which UE access to use. It is noted that the access information deals with cases where a UE 104 is simultaneously connected over the 3GPP and the Non 3GPP access.

The AMF 308 sends 942 (R)AN 302 an N2 PDU Session Request (N2 SM information, NAS message (PDU Session ID, N1 SM container (PDU Session Establishment Accept))). The AMF 308 sends the NAS message containing the PDU Session ID, the PDU Session Establishment Accept targeted to the UE 104, and the N2 SM information received from the SMF 310 within the N2 PDU Session Request 942, to the (R)AN 302.

The (R)AN 302 may issue 944 an AN-specific signalling exchange with the UE 104 that is related to the information received from SMF 310. For example, in the case of an NG-RAN, an Radio Resource Control (RRC) Connection Reconfiguration may take place with the UE 104 establishing the necessary NG-RAN resources; the necessary NG-RAN resources are related to the QoS Rules of the PDU Session request received at 942. The (R)AN 302 may also allocate a (R)AN N3 Tunnel Info for the PDU Session. In the case of Dual Connectivity, the Master RAN node may assign some (zero or more) QFIs to be setup to a Master RAN node and assign others to the Secondary RAN node. The AN Tunnel Info includes a tunnel endpoint for each involved (R)AN node and the QFIs assigned to each tunnel endpoint. A QFI can be assigned to either the Master RAN node or the Secondary RAN node and not to both.

To clarify, as discussed above, the PCF 316 establishes the PHP which is sent the to the SMF 310 as part of step 930 or step 934. The SMF 310 then sends the PHP to the AMF 308 in additional to or as part of the QoS profile for the (R)AN 302, and PHP in additional to or part of QoS rule(s) for the UE 104, sent from the SMF 310 as part of message 940. The AMF then sends the QoS profile(s) with PHP for the (R)AN, and QoS rule(s) with PHP for the UE, to (R)AN 302 as part of message 942.

The (R)AN 302 forwards the NAS message (PDU Session ID, N1 SM container (PDU Session Establishment Accept)) received 942 to the UE 104. The (R)AN 302 may only provide the NAS message to the UE 104 if the necessary (R)AN resources are established and the allocation of (R)AN Tunnel Info are successful.

The (R)AN 302 sends 946 AMF 308 an N2 PDU Session Response (PDU Session ID, Cause, N2 SM information (PDU Session ID, AN Tunnel Info, List of accepted/rejected QFI(s), User Plane Enforcement Policy Notification)). The AN Tunnel Info corresponds to the Access Network address of the N3 tunnel corresponding to the PDU Session. If the (R)AN 302 rejects the QFI(s), the SMF 310 is responsible for updating the QoS rules in the UE 104 accordingly.

When the NG-RAN cannot fulfil the User Plane Security Enforcement information with a value of Required, the NG-RAN rejects the establishment of UP resources for the PDU session. In this case, the SMF 310 releases the PDU session. And if the NG-RAN cannot fulfil a User Plane Security Enforcement with a value of Preferred, the NG-RAN notifies the SMF 310.

The AMF 308 sends 950 SMF 310 a request for Nsmf_PDUSession_UpdateSMContext Request (N2 SM information, Request Type). The AMF 308 forwards 950 the N2 SM information received 946 from (R)AN 302 to SMF 310. If the list of rejected QFI(s) is included in the N2 SM information, the SMF 310 may release the rejected QFI(s) associated with QoS profiles.

If the User Plane Enforcement Policy Notification in the N2 SM information indicates that no user plane resources could be established, and the User Plane Enforcement Policy indicates "required" as described in clause 5.10.3 of TS 23.501, the SMF 310 may release the PDU session.

The SMF 310 initiates 952 an N4 Session Modification procedure with the UPF 304. The SMF 310 provides an AN Tunnel Info and the corresponding forwarded rules to UPF 304. It is noted that if the PDU Session Establishment Request was due to mobility from EPC or mobility between a 3GPP and a non-3GPP access, the downlink data path is switched towards the target access.

The UPF 304 responds 954 with an N4 Session Modification Response to the SMF 310. If multiple UPFs (304) are used in the PDU Session, the UPF 304 at 952 and 954 refers to the UPF terminating N3. After this step, the UPF 304 delivers 956 any down-link packets that may have been buffered for this PDU Session to the UE 104.

The SMF 310 responds 958 to AMF 308 with an Nsmf_PDUSession_UpdateSMContext Response (Cause). After responding, the SMF 310 may subscribe to UE mobility event notification via the AMF 308 (for example, location reporting, UE 104 moving into or out of Area Of Interest) by invoking the Namf_EventExposure_Subscribe service operation, as specified in clause 5.2.2.3.2. In the case of LADN, the SMF 310 subscribes to UE event notification for moving into or out of the LADN service area by providing the LADN DNN as an indicator for the Area Of Interest (see clause 5.6.5 and 5.6.11 of TS 23.501). After this step, the AMF 308 forwards the relevant events subscribed by the SMF 310.

The SMF 310 may conditionally send 960 an Nsmf_PDUSession_SMContextStatusNotify (Release) to AMF 308. If during the procedure, any time after 924, the PDU Session establishment is not successful, the SMF 310 will inform 960 the AMF 308 by invoking the Nsmf_PDUSession_SMContextStatusNotify (Release). The SMF 310 will also release any N4 session(s) created, any PDU Session address if allocated (for example, IP address), and the association with PCF 316, if any.

In the case of PDU Type IPv6 or IPv4v6, the SMF 310 generates an IPv6 Router Advertisement and sends 962 it to the UE 104 via the N4 and the UPF 304.

If the PDU Session establishment failed after 922, the SMF 310 may perform the following. If the SMF 310 is no longer handling a PDU Session of the UE 104 for this (DNN, S-NSSAI), the SMF 310 will unsubscribe 964 to the modifications of Session Management Subscription data for the corresponding to (SUPI, DNN, S-NSSAI), using Nudm_SDM_Unsubscribe (SUPI, Session Management Subscription data, DNN, S-NSSAI). The UDM 320 may unsubscribe 964 to the modification notification from UDR by Nudr_DM_Unsubscribe (SUPI, Subscription Data, Session Management Subscription data, S-NSSAI, DNN). The SMF 310 will deregister 964 for the given PDU Session using Nudm_UECM_Deregistration (SUPI, DNN, PDU Session ID). The UDM 320 may update the corresponding UE context by Nudr_DM Update (SUPI, Subscription Data, UE context in SMF data).

According to an embodiment of the present invention, the PHP parameters may be updated by the PCF and sent to the SMF using the PDU Session Modification procedure. The AF may request the PCF, either directly or indirectly, via the NEF, to indicate the PHP parameters.

TS 23.502, Clause 4.3.3 describes the procedure for when one or several of the QoS parameters exchanged between the UE and the network are modified. It is noted that the conditions for when to use this procedure for QoS change and the QoS parameters exchanged between the UE and the network are defined in TS 23.501, clause 5.7.

Figure 9:
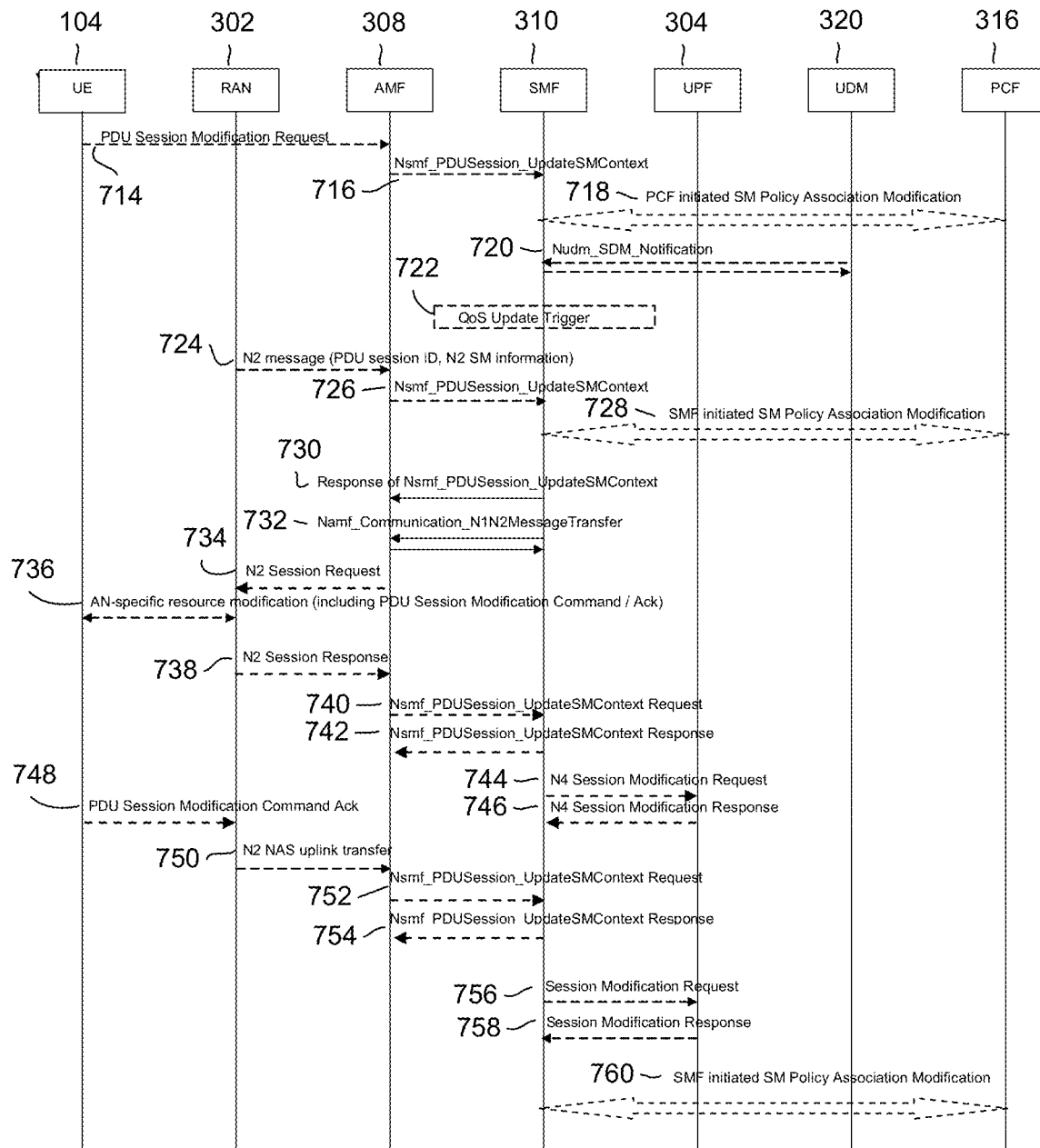
FIG. 9 shows a message flow diagram illustrating a representative process for UE or network requested PDU Session Modification procedure (non-roaming and roaming with local breakout), which may be used in embodiments of the present invention.

FIG. 9 shows a message flow diagram illustrating a representative process for UE or network requested PDU Session Modification procedure (non-roaming and roaming with local breakout) according to an embodiment. Such an embodiment represents an enhancement to FIG. 4.3.3.2-1 of TS 23.502. The solutions in this embodiment can be applied to other scenarios, such as when the UE is served by a visiting PLMN, or roaming scenarios as described in clause 4.3.3.3 of TS 23.502.

Referring to FIG. 9, The UE 104 initiates 714 the PDU Session Modification procedure by the transmission of an NAS message (N1 SM container (PDU Session Modification Request (PDU session ID, Packet Filters, Operation, Requested QoS, Segregation, 5GSM Core Network Capability)), PDU Session ID). Depending on the Access Type, if the UE 104 was in CM-IDLE state, this SM-NAS message is preceded by the Service Request procedure. The NAS message 714 is forwarded by the (R)AN 302 to the AMF 308 with an indication of User location Information. The AMF invokes 716 Nsmf_PDUSession_UpdateSMContext (PDU Session ID, N1 SM container (PDU Session Modification Request)).

When the UE 104 requests specific QoS handling for selected SDF(s), the PDU Session Modification Request 714 includes Packet Filters describing the SDF(s), the requested Packet Filter Operation (add, modify, delete) on the indicated Packet Filters, the Requested QoS and optionally a Segregation indication. The Segregation indication is included when the UE 104 recommends the network to bind the applicable SDF(s) on a distinct and dedicated QoS Flow, for example, if an existing QoS Flow can support the requested QoS. The network should abide by the UE request 714, but may proceed instead with binding the selected SDF(s) on an existing QoS Flow. It is noted that only one QoS Flow is used for traffic segregation. If UE 104 makes subsequent requests for segregation of additional SDF(s), the additional SDF(s) are multiplexed on the existing QoS Flow that is used for segregation.

In the N1 SM PDU Session Modification Request, the UE 104 may indicate that the delayed packets of QoS flow(s) that is/are associated with the Packet Filters shall be dropped (discarded) or be delivered. The SMF 310 may use the information from the UE to establish the downlink and uplink PHP parameters in the UE, RAN and UPF accordingly.

The UE 104 may not trigger a PDU Session Modification procedure for a PDU Session corresponding to a LADN when the UE 104 is outside the area of availability of the LADN. The PS Data Off status, if changed, may be included in the PCO in the PDU Session Modification Request message 714.

When PCF 316 is deployed, the SMF 310 may further report the PS Data Off status to PCF 316 if the PS Data Off event trigger is provisioned; the additional behaviour of SMF 310 and PCF 316 for 3GPP PS Data Off is defined in TS 23.503.

The 5GSM Core Network Capability is provided by the UE 104 and handled by SMF 310 as defined in TS 23.501, clause 5.4.4b.

The PCF 316 performs 718 a PCF initiated SM Policy Association Modification procedure as defined in clause 4.16.5.2 to notify SMF 310 about the modification of policies. This may, for example, have been triggered by a policy decision or upon AF requests, for example, Application Function influence on traffic routing as described in step 5 in clause 4.3.6.2 of TS 23.502. According to an embodiment of the present invention, the OAM or the AF may request to update PHP parameters.

The UDM 320 updates 720 the subscription data of SMF 310 by Nudm_SDM_Notification (SUPI, Session Management Subscription Data). The SMF 310 updates the Session Management Subscription Data and acknowledges 720 the UDM 320 by returning an acknowledge (Ack) with (SUPI).

The SMF 310 may decide to modify PDU Session. This procedure also may be triggered based on locally configured policy or triggered from the (R)AN (as described in clause 4.2.6 of TS 23.502). If the SMF 310 receives one of the triggers in 718, 720, or 722, the SMF 310 starts SMF requested PDU Session Modification procedure. The SMF 310 may receive a report from the UPF 304 (this report message is not shown in FIG. 9) to report that the UPF 304 detects uplink or downlink PDUs that could be subject to being dropped (or discarded) or delivered if these packets are delayed longer than a certain value.

(R)AN 302 may indicate to the SMF 310 when the AN resources onto which a QoS Flow is mapped are released irrespective of whether notification control is configured. (R)AN 302 sends 724 the N2 message (PDU Session ID, N2 SM information) to the AMF 308. The N2 SM information includes the QFI, User location Information and an indication that the QoS Flow is released. The AMF 308 invokes 726 Nsmf PDUSession UpdateSMContext (N2 SM information).

In case notification control is configured for a GBR Flow, (R)AN 302 sends a N2 message (PDU Session ID, N2 SM information) to SMF 310 when the (R)AN 302 decides the QoS targets of the QoS Flow cannot be fulfilled or can be fulfilled again, respectively. The N2 SM information includes the QFI and an indication that the QoS targets for that QoS Flow cannot be fulfilled or can be fulfilled again, respectively. The AMF 308 invokes 726 Nsmf PDUSession UpdateSMContext (N2 SM information). If the PCF 316 has subscribed to the event, SMF 310 reports this event to the PCF 316 for each PCC Rule for which notification control is set. Alternatively, if dynamic PCC does not apply for this DNN, and dependent on locally configured policy, the SMF 310 may start SMF requested PDU Session Modification procedure.

The SMF 310 may need to report some subscribed event to the PCF 316 by performing 728 an SMF initiated SM Policy Association Modification procedure as defined in clause 4.16.5.1. This step may be skipped if PDU Session Modification procedure is triggered by 718 or 722. If dynamic PCC is not deployed, the SMF 316 may apply local policy to decide whether to change the QoS profile. Steps 730 to 760 are not invoked when the PDU Session Modification requires only action at a UPF, for example, gating.

If the SMF 310 received a request from the UE that informs the SMF 310 to discard or deliver the delayed packets, or if the SMF 310 received a report from the UPF 304 indicating that the UPF 304 detects PDU(s) of a PDU session or QoS flows that could be discarded or delivered if these PDUs are delayed, the SMF 310 may communicate with the PCF 316 to obtain the PHP parameters if the PHP parameters are not available in the PHP. The SMF 310 may decide how to create and configure the PHP parameters for the UE 104, the (R)AN 302, and UPF 304, without communicating with the PCF 316, based on the available PDU Session context in the SMF.

For UE 104 or AN initiated modification, the SMF 310 responds 730 to the AMF 308 through Nsmf_PDUSession_UpdateSMContext (N2 SM information (PDU Session ID, QFI(s), QoS Profile(s), Session-AMBR), N1 SM container (PDU Session Modification Command (PDU Session ID, QoS rule(s), QoS rule operation, QoS Flow level QoS parameters if needed for the QoS Flow(s) associated with the QoS rule(s), Session-AMBR, PHP parameters for the uplink and/or downlink))). See TS 23.501 clause 5.7 for the QoS Profile, and QoS rule and QoS Flow level QoS parameters.

The N2 SM information carries information that the AMF 308 may provide to the (R)AN 302. It may include the QoS profiles and the corresponding QFIs to notify the (R)AN 302 that one or more QoS flows were added, or modified. It may include only QFI(s) to notify the (R)AN 302 that one or more QoS flows were removed. If the PDU Session Modification was triggered by the (R)AN Release 724, the N2 SM information carries an acknowledgement of the (R)AN Release. If the PDU Session Modification was requested by the UE 104 for a PDU Session that has no established User Plane resources, the N2 SM information provided to the (R)AN 302 includes information for establishment of User Plane resources.

The N1 SM container carries the PDU Session Modification Command that the AMF 308 may provide to the UE 104. It may include the QoS rules, QoS Flow level QoS parameters if needed for the QoS Flow(s) associated with the QoS rule(s) and corresponding QoS rule operation and QoS Flow level QoS parameters operation to notify the UE 104 that one or more QoS rules were added, removed or modified.

For SMF requested modification, the SMF 310 invokes 732 Namf_Communication_N1N2MessageTransfer (N2 SM information (PDU Session ID, QFI(s), QoS Profile(s), Session-AMBR, and/or PHP parameters for the uplink and/or downlink), N1 SM container (PDU Session Modification Command (PDU Session ID, QoS rule(s), QoS Flow level QoS parameters if needed for the QoS Flow(s) associated with the QoS rule(s), QoS rule operation and QoS Flow level QoS parameters operation, Session-AMBR, and/or PHP parameters for the uplink and/or downlink))). According to an embodiment of the present invention, the QoS Profile(s) may contain new PHP parameters. The QoS Rule(s) may contain new PHP parameters.

If the UE 104 is in CM-IDLE state and an asynchronous type communication (ATC) is activated, the AMF 308 updates and stores the UE context based on the Namf_Communication_N1N2MessageTransfer and steps 734 to 742 are skipped. When the UE 104 is reachable, for example, when the UE 104 enters CM-CONNECTED state, the AMF 308 forwards the N1 message to synchronize the UE context with the UE 104.

The AMF 308 may send 734 N2 PDU Session Request (N2 SM information received from SMF, NAS message (PDU Session ID, N1 SM container (PDU Session Modification Command))) Message to the (R)AN 302. The (R)AN 302 may issue 736 AN specific signalling exchange with the UE 104 that is related with the information received from SMF 310. For example, in case of a NG-RAN, an RRC Connection Reconfiguration may take place with the UE 104 modifying the necessary (R)AN resources related to the PDU Session.

The (R)AN 302 may acknowledge N2 PDU Session Request by sending 738 a N2 PDU Session Ack (N2 SM information (List of accepted/rejected QFI(s), AN Tunnel Info, PDU Session ID), User location Information) Message to the AMF 308. In case of Dual Connectivity, if one or more QFIs were added to the PDU Session, the Master RAN node may assign one or more of these QFIs to a NG-RAN node which was not involved in the PDU Session earlier. In this case the AN Tunnel Info includes a new N3 tunnel endpoint for QFIs assigned to the new NG-RAN node. Correspondingly, if one or more QFIs were removed from the PDU Session, a (R)AN node may no longer be involved in the PDU Session anymore, and the corresponding tunnel endpoint is removed from the AN Tunnel Info. The NG-RAN may reject QFI(s) if it cannot fulfil the User Plane Security Enforcement information for a corresponding QoS Profile, for example, due to the UE Integrity Protection Maximum Data Rate being exceeded.

The AMF 308 forwards 740 the N2 SM information and the User location Information received from the AN to the SMF 310 via Nsmf_PDUSession_UpdateSMContext service operation. The SMF 310 replies 742 with a Nsmf_PDUSession_UpdateSMContext Response. If the (R)AN 302 rejects QFI(s), the SMF 310 is responsible of updating the QoS rules and QoS Flow level QoS parameters if needed for the QoS Flow(s) associated with the QoS rule(s) in the UE 104 accordingly.

The SMF 310 may update N4 session of the UPF(s) 304 that are involved by the PDU Session Modification by sending 744 N4 Session Modification Request message to the UPF 304. According to an embodiment of the present invention, the N4 Session Modification Request 744 message may include PHP parameters.

The UE 104 acknowledges the PDU Session Modification Command by sending 748 a NAS message (PDU Session ID, N1 SM container (PDU Session Modification Command Ack)) to (R)AN 302. The (R)AN 302 forwards 750 the NAS message to the AMF 308. The AMF 308 forwards 752 the N1 SM container (PDU Session Modification Command Ack) and User Location Information received from the AN to the SMF 310 via Nsmf_PDUSession_UpdateSMContext service operation. The SMF 310 replies 754 with a Nsmf_PDUSession_UpdateSMContext Response.

The SMF 310 may update N4 session of the UPF(s) that are involved by the PDU Session Modification by sending 756 N4 Session Modification Request (N4 Session ID) message to the UPF 304. For a PDU Session of Ethernet PDU Session Type, the SMF 310 may notify the UPF 304 to add or remove Ethernet Packet Filter Set(s) and forwarding rule(s). The UPF 304 may respond to SMF 310 by sending 758 Session Modification Response. It is noted that, the UPFs 304 that are impacted in the PDU Session Modification procedure depends on the modified QoS parameters and on the deployment. For example in case of the session AMBR of a PDU Session with an UL CL changes, only the UL CL is involved. This note also applies to the step 744 and 746.

If the SMF 310 interacted with the PCF 316 in step 718 or 728, the SMF 310 notifies the PCF 316 whether the PCC decision could be enforced or not by performing 760 an SMF initiated SM Policy Association Modification procedure as defined in clause 4.16.5.1. SMF 310 notifies any entity that has subscribed to User Location Information related with PDU Session change. If step 718 is triggered to perform Application Function influence on traffic routing by step 5 in clause 4.3.6.2 of TS 23.502, the SMF 310 may reconfigure the User Plane of the PDU Session as described in step 6 in clause 4.3.6.2.

Accordingly, the present invention provides a method to provide, update or modify the PHP parameters to the UE, and/or (R)AN, and/or UPF.

According to an embodiment of the present invention, the AF could provide or modify the PHP parameters by sending the Npcf Policy Authorization Create/Update request message directly to the PCF or via NEF, which is based on local configuration.

Npcf_PolicyAuthorization_Create service operation is described in clause 5.2.5.3.2, TS 23.502. This service operation authorizes the request from the application and optionally communicates with Npcf_SMPolicyControl service to determine and install the policy according to the information provided by the NF Consumer. This service operation also creates an application context in the PCF. The required inputs are the IP address of the UE, identification of the application session context. The optional inputs are: UE identity if available, DNN if available, S-NSSAI if available, Media type, Media format, bandwidth requirements, sponsored data connectivity if applicable, flow description, Application identifier or traffic filtering information, AF Communication Service Identifier, AF Record Identifier, Flow status, Priority indicator, emergency indicator, Application service provider, resource allocation outcome, a list of DNAI(s) and corresponding routing profile ID(s) or N6 traffic routing information, AF Transaction Id, Early and/or late notifications about UP path management events, temporal validity condition and spatial validity condition as described in clause 5.6.7 in 23.501, Background Data Transfer Reference ID. According to an embodiment of the present invention, the PHP parameters may be an optional input. The required outputs are Success or Failure. The optional outs the service information that can be accepted by the PCF.

Npcf_PolicyAuthorization service operation is described in TS clause 5.2.5.3 of 23.502. This service operation allows an AF to provide, update, delete application level information to the PCF; and another consumer, such as SMF, communicates with the PCF by using Npcf_SMPolicyControl service to obtain and install the new policy, and policy updates according to the information provided by the AF. This Npcf_PolicyAuthorization_Update service operation also updates an application context in the PCF. The required inputs are identification of the application session context. The optional inputs are: Media type, Media format, bandwidth requirements, sponsored data connectivity if applicable, flow description, Application identifier or traffic filtering information, AF Communication Service Identifier, AF Record Identifier, Flow status, Priority indicator, Application service provider, resource allocation outcome, a list of DNAI(s) and corresponding routing profile ID(s) or N6 traffic routing information, AF Transaction Id, Early and/or late notifications about UP path management events, temporal validity condition and spatial validity condition as described in clause 5.6.7 in 23.501, Background Data Transfer Reference ID. According to an embodiment of the present invention, the PHP parameters may be an optional input. The required outputs are Success or Failure. The optional outputs are the service information that can be accepted by the PCF.

In embodiments of the present invention, if the AF sends PHP parameters to the PCF via the NEF, one existing service of the NEF may be modified to carry these parameters. Additionally, a new service of NEF may be designed as follows, and discussed below with reference to FIG. 14.

Nnef_PacketHandling_Create operation may be defined and included as an enhancement to TS 23.502. This service operation authorizes the request and forwards the request for packet handling. The known NF Service Consumer is AF. The required inputs is AF Transaction Id; the AF Transaction Id refers to the request. The optional inputs are: the address (IP or Ethernet) of the UE if available, GPSI if available, DNN if available, S-NSSAI if available, External Group Identifier if available, application identifier or traffic filtering information, AF-Service-Identifier. According to an embodiment of the present invention, the PHP parameters may be an optional input. The required output is the operation execution result indication. There no optional outputs.

Nnef_PacketHandling_Update may be defined and included as an enhancement to TS 23.502. This service operation authorizes the request and forwards the request for packet handling. The known NF Service Consumers is AF. The required input is AF Transaction Id; the AF Transaction Id refers to the previous Nnef_PacketHandling_Create request. The optional inputs are the same optional inputs as those of Nnef_PacketHandling_Create. According to an embodiment of the present invention, the PHP parameters may be an optional input. The require output is the operation execution result indication. There are no optional outputs.

The AF may request for creating or updating PHP parameters for any UEs of a group of UEs by providing any combination of following input parameters: one or more of address(es) (IP or Ethernet) of the UE if available, one or more of GPSI(s) if available, DNN if available, S-NSSAI if available, External Group Identifier if available, application identifier or traffic filtering information, AF-Service-Identifier.

Figure 14:
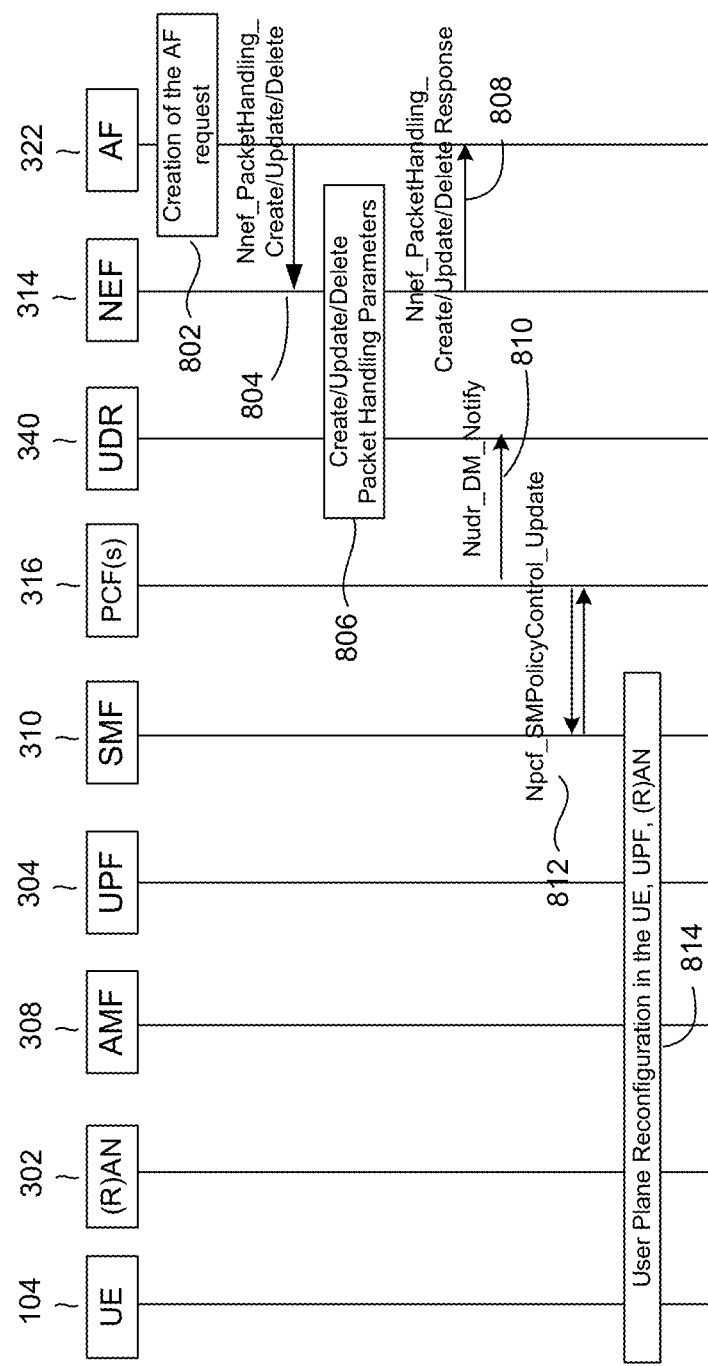
FIG. 14 is a message flow diagram illustrating an application function providing packet handling parameters to devices in a mobile wireless network.

FIG. 14 is a message flow diagram illustrating an AF 322 providing packet handling parameters to devices in a mobile wireless network. Referring to FIG. 14, the AF 322 may create 802 packet handling parameters. If the packet handling parameters are new, the AF 322 may send 804 packet handling parameters to the network by using a service of the NEF 314, for example Nnef_PacketHandling_Create operation. This service operation of NEF 314 authorizes the request and forwards 806 the request to the UDR 340 to store the parameter as part of application data. The Nnef_PacketHandling_Create message may include AF Transaction Id; the AF Transaction Id refers to the request. The message may include one or more inputs: the address (IP or Ethernet) of the UE if available, GPSI if available, DNN if available, S-NSSAI if available, External Group Identifier if available, application identifier or traffic filtering information, AF-Service-Identifier, packet flow description (PFD), and packet handling parameters.

If the AF 322 wants to update or modify existing packet handling parameters, the AF 322 may send updated packet handling parameters to the network by using a service of the NEF 314, for example Nnef_PacketHandling_Update operation. The Nnef_PacketHandling_Update service message may include AF Transaction Id, which refers to the previous Nnef_PacketHandling_Create request. The Nnef_PacketHandling_Update service message may include one or more packet handling parameters, which are the same as the parameters described for the Nnef_PacketHandling_Create message. The require output is the operation execution result indication. There are no optional outputs.

If the AF 322 wants to delete existing packet handling parameters, the AF 322 may use a service of the NEF 314, for example Nnef_PacketHandling_Delete operation. The Nnef_PacketHandling_Delete service message may include AF Transaction Id, which is the previous AF Transaction Id provided in the Nnef_PacketHandling_Create request. The Nnef_PacketHandling_Delete may allow deletion of all the parameters that have been provided in the Nnef_PacketHandling_Create message associated with the AF Transaction Id.

The AF 322 may request 804 for creating, updating, or deleting packet handling parameters for any UEs, or any UEs of a group of UEs by providing any combination of following input parameters: one or more of address(es) (IP or Ethernet) of the UE if available, one or more of GPSI(s) if available, DNN if available, S-NSSAI if available, External Group Identifier if available, application identifier or traffic filtering information, AF-Service-Identifier.

The NEF 314 may translate some AF-provided parameters into parameters of the mobile network. For example, if the AF provides GPSI, the NEF may replace the GPSI by SUPI; if the AF provides External Group Identifier, the NEF may replace External Group by Internal Group ID. The NEF 314 stores 806 the AF provided parameters and/or some replaced parameters in the UDR 340. The NEF 314 may use Data Management services of the UDR 340 to provides 806 packet handling parameters to the UDR 340.

The NEF 314 may send a response 808 for the message from the AF 322, Nnef_PacketHandling_Create/Update/Delete received. The response 808 may be to confirm the execution of the AF request 802, may indicate rejection if the AF 322 is not allowed to use the NEF service or error. The error may indicate the AF request is invalid, such as the value of provided parameter is out of allowed range. For example, the E2E PDB is too small and cannot be supported by the mobile network. Another error is that the AF provides parameters that do not follow the service level agreement (SLA) between the application service provider and the mobile network operator.

The UDR 340 may notify the PCF(s) 316 about new packet handling parameters, which could be associated with an application ID, and/or DNN, and/or S-NSSAI, and/or AF-Service_ID, and/or a set of packet filters, or a set of packet flow descriptions.

The PCF 316 may create PHP parameters and send 812 to the SMF 310, which has subscribed to receive SM policy control update service of the PCF 316.

The SMF 310 may provide 814 packet handling parameters to UPF 304, (R)AN 302, and UE 104 by using PDU Session Modification procedure as described in the present document.

The existing Nudr_DataManagement (DM) service of the UDR 340 as described in an enhancement to 3GPP TS 23.502, clause 5.2.12, which may be modified to allow the NEF 314 providing packet handling parameters to the UDR 340 as follows.

The operations defined for Nudr_DM service may use the following set of parameters. A Data Set Identifier, which uniquely identifies the requested set of data within the UDR (as specified in 3GPP TS 23.502, clause 4.2.5). A Data Subset Identifier, which uniquely identifies the data subset within each Data Set Identifier. A Data Keys as defined in TS 23.502, Table 5.2.12.2.1-1 and provided in the present document, including packet handling parameters.

The table of data keys is as follows:

| Data Set | Data Subset | Data Key | Data Sub Key |
|---|---|---|---|
| Subscription Data (as described in 3GPP TS 23.502, clause 5.2.3.3.1) | Access and Mobility Subscription data | SUPI | — |
| | SMF Selection Subscription data | SUPI | — |
| | UE context in SMF data | SUPI | PDU Session ID or DNN |
| | SMS Management Subscription data | SUPI | — |
| | SMS Subscription data | SUPI | — |
| | Session Management Subscription data | SUPI | S-NSSAI DNN |
| | Slice Selection Subscription data | SUPI | — |
| Application data | Packet Flow Descriptions (PFDs) Packet Handling parameters | Application ID Application ID, and/or AF Transaction internal ID, and/or DNN, and/or S-NSSAI, and/or Internal Group Identifier, or SUPI | — |
| | AF traffic influence request information (described in clause 5.6.7 and clause 6.3.7.2 in 3GPP TS 23.501). | AF transaction internal ID S-NSSAI and DNN and/or Internal Group Identifier or SUPI | |
| Policy Data | UE context policy control data (described in clause 6.2.1.3 in 3GPPTS 23.503) | SUPI | |
| | PDU Session policy control data (described in clause 6.2.1.3 in 3GPPTS 23.503) | SUPI | S-NSSAI DNN |
| | Policy Set Entry data (described in clause 6.2.1.3 in 3GPP TS 23.503) | SUPI (for the UDR in HPLMN) PLMN ID (for the UDR in VPLMN) | |
| | Remaining allowed Usage data (described in clause 6.2.1.3 in 3GPPTS 23.503) | SUPI | S-NSSAI DNN |
| | Sponsored data connectivity profiles (described in clause 6.2.1.6 in 3GPP TS 23.503) | Sponsor Identity | |
| | Background Data Transfer data (described in clause 6.2.1.6 in 3GPP TS 23.503) | Background Data Transfer Reference ID. (NOTE 2) None. (NOTE 1) | |
| Exposure Data (described in 3GPP TS 23.502, clause 5.2.12.1) | Access and Mobility Information Session Management information | SUPI or GPSI SUPI or GPSI | PDU Session ID or UE IP address or DNN |

(NOTE 1):
Retrieval of the stored Background Data Transfer References for all Application Service Provider (ASP) identifiers in the UDR requires Data Subset but no Data Key or Data Subkey(s).
(NOTE 2):
Update of a Background Data Transfer Reference in the UDR requires a Data key to refer to a Background Data Transfer Reference as input data.

The Nudr_DM_Query service may be used by a NF service consumer, such as a PCF 316 or an SMF 310, to requests a set of data from the UDR 340, for example the packet handling parameters.

The Nudr_DM_Create service may be used by a NF service consumer, such as an NEF 314, to insert a new data record into the UDR 340. For example, the NEF 314 may receive 804 a Nnef_PacketHandling_Create request from the AF 322 to provide an application data record, which contains packet handling parameters. The NEF 314 may use Nudr_DM_Create service to insert 806 a new application data record, including packet handling parameters, into the UDR 340.

The Nudr_DM_Delete service may be used by a NF service consumer to delete user data stored in the UDR 340. For example, the NEF 314 may receive 804 a Nnef_PacketHandling_Delete request from the AF 322 that intends to delete an application data record, which contain packet handling parameters.

The Nudr_DM_Update service may be used by a NF service consumer to update stored data in the UDR 340. For example, the NEF 314 may receive 804 a Nnef_PacketHandling_Update request from the AF 322 to update an application data record, which contains packet handling parameters. The NEF 314 may use Nudr_DM_Update service to update 806 the existing application data record, including packet handling parameters, in the UDR 340.

The Nudr_DM_Subscribe service may be used by a NF service consumer to perform the subscription to notification to data modified in the UDR 340. The events can be changes on existing data and/or addition of data. For example, the PCF 316 may subscribe UDR 340 to receive notification related to application data and/or packet handling parameters.

The Nudr_DM_Unsubscribe service may be used by a NF service consumer to perform the un-subscription to notification to data modified in the UDR 340. The events can be changes on existing data and/or addition of data. For example, the PCF 316 may unsubscribe UDR 340 to stop receiving notification related to application data, and/or packet handling parameters.

The Nudr_DM_Notify service may be used by the UDR 340 to notify NF service consumer(s) about modification of data, for example, when data in the UDR 340, including packet handling parameters, is added, modified or deleted, and an NF needs to be informed about this, due to a previous subscription to notifications procedure or due to a local configuration policy in the UDR 340.

The NEF 304 (Packet Flow Description Function (PFDF)) may provide Packet Flow Descriptions (PFD(s)) to the SMF 310 on the request of SMF 310 (pull mode) or on the request of PFD management from NEF 340 (push mode), as described in TS 23.503. The SMF 310 may provide the PFD(s) to the UPF 304, which have active Packet Detection Rule(s) (PDR) with the Application identifier corresponding to the PFD(s).

The PFD is provided by the AF 322. The PFD may include one or more of parameters on how to handle packets of the packet flow. The parameters to handle packets may include one or more of following parameters:

- a requested end-to-end packet delay budget requirement (E2E PDB) parameter;
- a first indication, e.g. called drop-delayed-packet parameter, to indicate whether the packet that experiences packet delay longer than the E2E PDB can be dropped or delivered. For example, the drop-delayed-packet may have two values, YES or NO, which respectively correspond to indications to drop or deliver packets if the packet delay is longer than the E2E PDB;
- an end-to-end maximum packet delay budget (E2E MPDB) parameter. The AF-requested E2E MPDB may be called differently, for example application survivor time, which means that the application layer may tolerate a packet delay of E2E MPDB;
- a second indication, e.g. called a drop-maximum-delayed-packet parameter, to indicate whether the packet that experiences packet delay longer than the E2E MPDB can be dropped or delivered. For example, the drop-maximum-delayed-packet parameter may have two values, YES or NO, which respectively correspond to indications to drop or deliver packets if the packet delay is longer than the E2E MPDB;
- a first packet priority parameter, which may be called normal-packet-scheduling-priority;
- a second packet priority parameter, which may be called delayed-packet-scheduling-priority;
- a bit rate measurement window: the window in which the bit rate of a packet flow is measured.

The SMF 310, or PCF 316 may use the AF provided packet handling parameters to establish PHP parameters. The AF-requested E2E PDB parameter may be mapped to the E2E PDB used in the mobile network. The AF-requested drop-delayed-packet parameter may be mapped to drop-delayed-packet parameter in the mobile network The AF-requested E2E MPDB parameter may be mapped to E2E MPDB parameter in the mobile network. The AF-requested drop-maximum-delayed-packet parameter may be mapped to the drop-maximum-delayed-packet parameter of the mobile network.

The AF-requested first packet priority parameter may be used to establish ARP parameter of the mobile network. The AF may have knowledge of ARP parameter in the mobile network. The AF-requested first packet priority parameter may be the same as the ARP parameter. The AF-requested first packet priority parameter may be used to establish Priority Level parameter of the mobile network. The AF may have knowledge of Priority Level parameter in the mobile network. The AF-requested first packet priority parameter may be the same as the Priority Level parameter. The SMF 310 or PCF 316 may use the value of the AF-requested first packet priority to set the same value for the ARP and/or Priority Level parameter.

The AF-requested second packet priority parameter may be used to establish ARP parameter of the mobile network. The AF may have knowledge of ARP parameter in the mobile network. The AF-requested second packet priority parameter may be the same as the ARP parameter. The AF-requested second packet priority parameter may be used to establish Priority Level parameter of the mobile network. The AF may have knowledge of Priority Level parameter in the mobile network. The AF-requested second packet priority parameter may be the same as the Priority Level parameter. The SMF 310 or PCF 316 may use the value of the AF-requested second packet priority to set the same value for the ARP and/or Priority Level parameter.

The AF-provided bit rate measurement window may be mapped to the Averaging Window parameter of mobile network. The Averaging Window parameter may be described, for example as an enhancement to 3GPP TS 23.501, clause 5.7.

In some implementation, the values of AF-requested first packet priority parameter and AF-requested second packet priority parameter may be the same or different, depending on the application layer requirements. For example, the value of AF-requested first packet priority parameter may be larger than that of the AF-requested second packet priority parameter so that the network should transfer packets with higher priority if the packet delay is larger than the end-to-end packet delay requirement. The SMF 310 supports the procedures, e.g. as described in clause 4.4.3.5 of TS 23.502, for management of PFDs. PFD(s) is cached in the SMF 310, and the SMF 310 maintains a caching timer associated to the PFD(s). When the caching timer expires and there is no active PCC rule that refers to the corresponding Application identifier, the SMF 310 informs the UPF 304 to remove the PFD(s) identified by the Application identifier using the PFD management message.

When a PDR is provided for an Application identifier corresponding to the PFD(s) that are not already provided to the UPF 304, the SMF 310 shall provide the PFD(s) to the UPF 304. If there are no PFD(s) cached, the SMF 310 retrieves them from the NEF 314 (PFDF) as specified in 3GPP TS 23.503, clauses 4.2.4 and 5.3.9). When any update of the PFD(s) is received from NEF 314 (PFDF) by SMF 310 (using "push" or "pull" mode), and there are still active PDRs in UPF 304 for the Application ID, the SMF 310 shall provision the updated PFD set corresponding to the Application identifier to the UPF 304 using the PFD management message.

The SMF 310 may send 814 one or more of PHP parameters to the (R)AN 302, UPF 304, and UE 104 to handle the packets according to the AF-requested packet handling parameters.

The SMF 310 may send packet Forwarding Action Rules (FAR) to the UPF. The FAR may contain information on whether forwarding, dropping or buffering is to be applied to a traffic identified by PDR(s). For each FAR, the SMF 310 may include one or more of PHP parameters. When the UPF 304 detects a packet flow that matches the PFD parameters, the UPF 304 may handle the packets of this packet flow according to the PHP parameters.

The SMF 310 may send PDR to the UPF 304. The SMF 310 sets the parameters in the PDR according to the PFD. The SMF 310 may also send packet forwarding rule (FAR) to the UPF 304 for each PDR. The PDR is used to map a packet flow into a QoS flow. The packet FAR is used to specify how the packet of a QoS flow will be forwarded to other network entities. The FAR may include the PHP parameters so that when the UPF 304 detects a packet based on the PDR, the UPF will handle the packet based on associated FAR and PHP parameters.

The SMF 310 may send QoS Enforcement Rules (QER) to the UPF 304. The QER may contain information related to QoS enforcement of traffic identified by PDR(s). The QER may include one or more PHP parameters.

The SMF 310 may send Usage Reporting Rules (URR) to the UPF 304. The URR contains information that defines how traffic identified by PDR(s) shall be accounted as well as how a certain measurement shall be reported. The URR may include one or more of PHP parameters. For example, when a packet is dropped due to longer delay than the packet delay threshold, the UPF 304 may report this event to the SMF 310 or to another network function. When the UPF 304 receives the updated PFD(s) from either the same or different SMF 310 for the same Application identifier, the latest received PFD(s) shall overwrite any existing PFD(s) stored in the UPF 304.

When a PFD is removed/modified and this PFD was used to detect application traffic related to an application identifier in a PDR of an N4 session, and the UPF 304 has reported the application start to the SMF 310 as defined in clause 4.4.2.2 of TS 23.502 for the application instance corresponding to this PFD, the UPF 304 shall report the application stop to the SMF 310 for the corresponding application instance identifier if the removed/modified PFD in UPF 304 results in that the stop of the application instance is not being able to be detected.

A PFD may be modified when the AF 322 provides modifications to the parameters that handle packets.

If the PFDs are managed by local operation and maintenance (O&M) procedures, PFD retrieval is not used. Otherwise, the PFDs retrieved from NEF (PFDF) override any PFDs pre-configured in the SMF 310. When all the PFDs retrieved from the NEF (PFDF) for an application identifier are removed, the pre-configured PFDs are used. The SMF 310 shall provide either the PFDs retrieved from NEF (PFDF) or the pre-configured PFDs for an application identifier to the UPF.

Table 5.8.2.11.3-1 of TS 23.501 provides Attributes within Packet Detection Rule. This table may be enhanced in several ways to include PHP parameters as follows:

| Attribute | | Description | Comment |
|---|---|---|---|
| N4 Session ID | | Identifies the N4 session associated to this PDR | |
| Rule ID | | Unique identifier to identify this rule | |
| Precedence | | Determines the order, in which the detection information of all rules is applied | |
| Packet detection information | Source interface | Contains the values "access side", "core side", "SMF", "N6-LAN", "5G LAN internal", "5G LAN N19" | Combination of UE IP address (together with Network instance, if necessary), CN tunnel info, packet filter set, application ID, Ethernet PDU Session Information and QFI are used for traffic detection. Source interface identifies the interface for incoming packets where the PDR applies, e.g. from access side (i.e. up-link), from core side (i.e. down-link), from SMF, from N6-LAN (i.e. the DN or the local DN), from "5G LAN internal" (i.e. local switch), or from "5G LAN N19" (i.e. N19 interface). Details like all the combination possibilities on N3, N9 interfaces are left for stage 3 decision. |
| | UE IP address | One IPv4 address and/or one IPv6 prefix with prefix length (NOTE 3) | |
| | Network instance (NOTE 1) | Identifies the Network instance associated with the incoming packet | |
| | CN tunnel info | CN tunnel info on N3, N9 interfaces, i.e. F-TEID | |
| | Packet Filter Set | Details see clause 5.7.6, TS 23.501. | |
| | Application ID | The application ID may associate with one or more PFD(s). | |
| | QoS Flow ID | Contains the value of 5QI or non-standardized QFI | |
| | Ethernet PDU Session Information | Refers to all the (DL) Ethernet packets matching an Ethernet PDU session, as further described in clause 5.6.10.2 and in TS 29.244. | |
| | Framed Route Information | Refers to Framed Routes defined in clause 5.6.14 | |
| | PHP parameters | Each Packet Filter Set or Application ID may associate with one or more of PHP parameters. | |
| Outer header removal | | Instructs the UP function to remove one or more outer header(s) (e.g. IP + UDP + GTP, IP + possibly UDP, VLAN tag), from the incoming packet. | Any extension header shall be stored for this packet. |
| Forwarding Action Rule ID (NOTE 2) | | The Forwarding Action Rule ID identifies a forwarding action that has to be applied. Each Forwarding Action Rule may include one of more of PHP parameters. | |

| Attribute | Description | Comment |
| --- | --- | --- |
| Multi-Access Rule ID (NOTE 2) | The Multi-Access Rule ID identifies an action to be applied for handling forwarding for a MA PDU Session. Each Usage Reporting Rule may include one of more of PHP parameters. | |
| List of Usage Reporting Rule ID(s) | Every Usage Reporting Rule ID identifies a measurement action that has to be applied. Each Usage Reporting Rule may include one of more of PHP parameters. | |
| List of QoS Enforcement Rule ID(s) | Every QoS Enforcement Rule ID identifies a QoS enforcement action that has to be applied. Each QoS Enforcement Rule may include one of more of PHP parameters. | |
| PHP parameters | Each Packet Filter Set or Application ID may associate with one or more of PHP parameters. | |

(NOTE 1):
Needed e.g. in case:
UPF supports multiple DNN with overlapping IP addresses;
UPF is connected to other UPF or AN node in different IP domains.
UPF "local switch" and N19 forwarding is used for different 5G LAN groups.
(NOTE 2):
Either a FAR ID or a MAR ID is included, not both.
(NOTE 3):
The SMF may provide an indication asking the UPF to allocate one IPv4 address and/or IPv6 prefix. When asking to provide an IPv6 Prefix the SMF provides also an IPv6 prefix length.

Table 5.8.2.11.6-1 of TS 23.501 provides Attributes within Forwarding Action Rule. This table may be enhanced in several ways to include PHP parameters as follows:

| Attribute | Description | Comment |
| --- | --- | --- |
| N4 Session ID | Identifies the N4 session associated to this FAR. | |
| Rule ID | Unique identifier to identify this information. | |
| Action | Identifies the action to apply to the packet. The Action may include one or more of PHP parameters that handle the packets. | Indicates whether the packet is to be forwarded, duplicated, dropped or buffered. When action indicates forwarding or duplicating, a number of additional attributes are included in the FAR. For buffering action, a Buffer Action Rule is also included. |
| Network instance (NOTE 2) | Identifies the Network instance associated with the outgoing packet (NOTE 1). | |
| Destination interface (NOTE 3) (NOTE 7) | Contains the values "access side", "core side", "SMF", "N6-LAN", "5G LAN internal" or "5G LAN N19". | Identifies the interface for outgoing packets towards the access side (i.e. down-link), the core side (i.e. up-link), the SMF, the N6-LAN (i.e. the DN or the local DN), to 5G LAN internal (i.e. local switch), or to 5G LAN N19 (i.e. N19 interface). |
| Outer header creation (NOTE 3) | Instructs the UP function to add an outer header (e.g. IP + UDP + GTP + QFI, VLAN tag), IP + possibly UDP to the outgoing packet. | Contains the CN tunnel info, N6 tunnel info or AN tunnel info of peer entity (e.g. NG-RAN, another UPF, SMF, local access to a DN represented by a DNAI). Any extension header stored for this packet shall be added. |
| Send end marker packet(s) (NOTE 2) | Instructs the UPF to construct end marker packet(s) and send them out as described in clause 5.8.1. | This parameter should be sent together with the "outer header creation" parameter of the new CN tunnel info. |
| Transport level marking (NOTE 3) | Transport level packet marking in the uplink and downlink, e.g. setting the DiffServ Code Point. | |
| Forwarding policy (NOTE 3) | Reference to a preconfigured traffic steering policy or http redirection (NOTE 4). | Contains one of the following policies identified by a TSP ID: an N6-LAN steering policy to steer the subscriber's traffic to the appropriate N6 service functions deployed by the operator, or a local N6 steering policy to enable traffic steering in the |

| Attribute | Description | Comment |
|---|---|---|
| | | local access to the DN according to the routing information provided by an AF as described in clause 5.6.7. or a Redirect Destination and values for the forwarding behaviour (always, after measurement report (for termination action "redirect")). |
| Request for Proxying in UPF | Indicates that the UPF shall perform ARP proxying and/or IPv6 Neighbour Solicitation Proxying as specified in clause 5.6.10.2. | Applies to the Ethernet PDU Session type. |
| Container for header enrichment (NOTE 2) | Contains information to be used by the UPF for header enrichment. | Only relevant for the uplink direction. |
| Buffering Action Rule (NOTE 5) | Reference to a Buffering Action Rule ID defining the buffering instructions to be applied by the UPF (NOTE 6) | |
| PHP Parameters | A set of PHP parameters that handle the Dackets. | |

(NOTE 1):
Needed e.g. in case:
UPF supports multiple DNN with overlapping IP addresses;
UPF is connected to other UPF or NG-RAN node in different IP domains;
UPF "local switch" and N19 forwarding is used for different 5G LAN groups.
(NOTE 2):
These attributes are required for FAR action set to forwarding.
(NOTE 3):
These attributes are required for FAR action set to forwarding or duplicating.
(NOTE 4):
The TSP ID is preconfigured in the SMF, and included in the FAR according to the description in clauses 5.6.7 and 6.1.3.14 of 23.503 for local N6 steering and 6.1.3.14 of 23.503 for N6-LAN steering. The TSP ID action is enforced before the Outer header creation actions.
(NOTE 5):
This attribute is present for FAR action set to buffering.
(NOTE 6):
The buffering action rule is created by the SMF and associated with the FAR in order to apply a specific buffering behaviour for DL packets requested to be buffered, as described in clause 5.8.3 and clause 5.2.4 in TS 29.244.
(NOTE 7):
The use of "5G LAN Internal" instructs the UPF to send the packet back for another round of ingress processing using the active PDRs pertaining to another N4 session of the same 5G LAN. To avoid that the packet matches again the same PDR, it is assumed that the packet has been modified in some way (e.g. tunnel header has been removed, the packets being received from the source interface 5G LAN Internal of the same 5G LAN).

Table 5.8.2.11.7-1 of TS 23.501 provides Attributes within Usage Report Rule. This table may be enhanced in several ways to include PHP parameters as follows:

| Attribute | Description | Comment |
|---|---|---|
| N4 Session ID | Uniquely identifies a session. | Identifies the N4 session associated to this Usage Report |
| Rule ID | Uniquely identifies the Packet Detection Rule or Usage Reporting Rule within a session which triggered the report. | Packet Detection Rule is only indicated when Reporting trigger is Detection of 1st DL packet for a QoS Flow or Start/stop of traffic detection. Usage Reporting Rule is indicated for all other Reporting triggers. |
| Reporting trigger | Identifies the trigger for the usage report. | Applicable values are: Detection of 1st DL packet for a QoS Flow; Start/stop of traffic detection with/without application instance identifier and deduced SDF filter reporting; Deletion of last PDR for a URR; Periodic measurement threshold reached; Volume/Time/Event measurement threshold reached; Immediate report requested; Measurement of incoming UL traffic; Measurement of discarded DL traffic; MAC address reporting in the UL traffic; reporting of unknown |

-continued

| Attribute | Description | Comment |
|---|---|---|
| | | destination MAC/IP address; Detection of packet delayed above packet delay threshold; Detection of packet discarded. |
| Start time | Provides the timestamp, in terms of absolute time, when the collection of the information provided within Usage-Information is started. | Not sent when Reporting trigger is Start/stop of traffic detection. |
| End time | Provides the timestamp, in terms of absolute time, when the information provided within Usage-Information is generated. | Not sent when Reporting trigger is Start/stop of traffic detection. |
| Measurement information | Defines the measured volume/time/events for this URR. | Details refer to TS 29.244. |

Table 5.8.2.11.8-1 of TS 23.501 provides Multi-Access Rule (MAR) that includes the association to the two FARs for both 3GPP access and non-3GPP (N3GPP) access in the case of supporting Access Traffic Steering, Switching and Splitting (ATSSS). This table may be enhanced in several ways to include PHP parameters as follows:

| Attribute | | Description | Comment |
|---|---|---|---|
| N4 Session ID | | Identifies the N4 session associated to this PDR. | |
| Rule ID | | Unique identifier to identify this rule. | |
| Steering functionality | | Indicates the applicable traffic steering functionality: Values "MPTCP functionality", "ATSSS-LL functionality", etc. | |
| Steering mode | | Values "Active-Standby", "Smallest Delay", "Load Balancing" or "Priority-based". | |
| Per-Access Forwarding Action information (NOTE 1) | Forwarding Action Rule ID | The Forwarding Action Rule ID identifies a forwarding action that has to be applied. | |
| | Weight | Identifies the weight for the FAR in case steering mode is "Load Balancing" | The weights for all FARs need to sum up to 100 |
| | Priority | Values "Active or Standby" or "High or Low" for the FAR | "Active or Standby" for "Active-Standby" steering mode and "High or Low" for "Priority-based" steering mode |
| | List of Usage Reporting Rule ID(s) | Every Usage Reporting Rule ID identifies a measurement action that has to be applied. | This enables the SMF to request separate usage reports for different FARs (i.e. different accesses) |
| | PHP parameters | A set of one or more PHP parameters to handle packets in the UL and/or DL associated with each access network. | |

(NOTE 1):
The Per-Access Forwarding Action information is provided per access type (i.e. 3GPP access or Non-3GPP access).

The Management of Packet Flow Descriptions enables the UPF 304 to perform accurate application detection when PFD(s) are provided by an Application Service Provider (ASP) and then to apply enforcement actions as instructed in the PCC Rule. The PFD management is described in clause 6.1.2.3 of TS 23.503. This clause and other clauses in TS 23.501, 23.502 23.503 can be enhanced to include the methods to provide, update, and delete packet handling parameters provided by the AF, where the AF represents the ASP to communicate with the mobile network functions.

The operator is able to configure pre-defined PCC Rules in the SMF 310 or dynamic PCC Rules in the PCF 316 that include at least an application identifier for service data flow or application detection, charging control information, i.e. charging key and optionally the Sponsor identifier or the ASP identifier or both. Depending on the service level agreements between the operator and the Application Server Provider, it may be possible for the ASP to provide individual PFDs or the full set of PFDs for each application identifier maintained by the ASP to the SMF via the PFD Management service in the NEF. The PFDs become part of the application detection filters in the SMF 310/UPF 304 and therefore are used as part of the logic to detect traffic generated by an application. The ASP may remove or modify some or all of the PFDs which have been provided previously for one or more application identifiers. The SMF 310 may report the application stop to the PCF 316 for an application instance identifier as defined in clause 5.8.2.8.4 of 3GPP TS 23.501, if the removed/modified PFD in SMF 310/UPF 304 results in that the stop of the application instance is not being able to be detected.

For each PFD, the ASP may include parameters to handle packets. The ASP manages (provision, update, delete) the PFDs through the NEF 314. The PFD(s) are transferred to the SMF 310 through the NEF (PFDF). The PFDF is a logical functionality in the NEF 314 which receives PFD(s) from the ASP through the NEF 314, stores the PFD(s) in the UDR 340 and provides the PFD(s) to the SMF(s) 304 either on the request from ASP PFD management through NEF 314 (push mode) or on the request from SMF 310 (pull mode). The PFDF functionality is a service provided by the NEF 314.

The ASP may provide/update/remove PFDs with an allowed delay to the NEF 314. Upon reception of the request from the ASP, the NEF 314 shall check if the ASP is authorized to provide/update/remove those PFD(s) and request the allowed delay. The NEF 314 may be configured with a minimum allowed delay based on SLA to authorize the allowed delay provided by the ASP. When ASP and requested allowed delay are successfully authorized, the NEF 314 shall translate each external Application Identifier to the corresponding Application Identifier known in the core network. The NEF(PFDF) stores the PDF(s) into the UDR 340. The ASP may provide updated PFD to update the parameters to handle packets that are associated with the PFD. The Allowed Delay is an optional parameter. If the Allowed Delay is included, it indicates that the requested PFD(s) should be deployed within the time interval indicated by the Allowed Delay.

The PFDs may be retrieved by SMF 310 from NEF (PFDF) in "pull" mode or may be provisioned from NEF (PFDF) to the SMF 310 in "push" mode.

When the "push" mode is used, the NEF (PFDF) retrieves from the UDR 340 the PFDs for each application identifier and distributes them to those SMFs 310 that enable access to those applications. The NEF (PFDF) may be configured with the list of SMFs 310 where PFD(s) should be distributed. There are three methods to provision PFD(s) from the NEF (PFDF) to the SMF.

The first method is the push of whole PFD(s) that can be accessed by the NEF (PFDF) according to operator configuration in NEF (PFDF) (e.g., provision per day according to operator configuration).

The second method is the selective push of an ASP change in the PFD set (i.e. ASP changes the PFD set while operator configuration defines when to push).

The third method is the selective push of an ASP change in the PFD set according to ASP request (i.e. ASP indicates to push changes in a PFD set within the time interval indicated by the Allowed Delay).

When the "pull" mode is used, at the time a PCC Rule with an application identifier for which PFDs are not available is activated or provisioned, the SMF 310 requests all PFDs for that application identifier from the NEF (PFDF), and NEF (PFDF) retrieves them from the UDR 340. The PFD(s) retrieved for an application identifier from the NEF (PFDF) are cached in the SMF 310, and the SMF 310 maintains a caching timer associated to the PFD(s) to control how long the PFD(s) are valid.

When the caching timer expires, if there are still active PCC rules that refer to the corresponding application identifier, the SMF reloads the PFD(s) from the NEF (PFDF) and provides it to the UPF over N4. When the caching timer expires, if there's no active PCC rule that refers to the corresponding application identifier or the SMF 310 removes the last PCC rule that refers to the corresponding application identifier, the SMF 310 removes the PFD(s) identified by the application identifier and informs the UPF 304 to remove the PFD(s) identified by the application identifier over N4.

It is assumed that all SMF(s) 304 and PFD (s) in an operator network are configured with the same default caching time value to be applied for all application identifiers.

When the "pull" mode is used, the NEF (PFDF) may provide to the SMF 310 a caching time value per application identifier. The SMF 310 receives the caching time value together with the PFD(s) from the NEF (PFDF) over N29 and applies this value for the application identifier instead of the configured default caching time value. In case no caching time value is received from NEF (PFDF), the SMF 310 uses the configured default caching time value.

The configuration of a caching time value per application identifier in NEF (PFDF) is based on the SLA between the operator and the ASP.

When only "pull" mode is supported in one PLMN, if the Allowed Delay is shorter than the caching time value stored for this application identifier, or shorter than the default caching time if no application-specific caching time is stored, the NEF (PFDF) may still store the PFD(s) to the UDR 340. The NEF 314 shall provide an indication that the PFD(s) were stored and the caching time value to the ASP when informing that the Allowed Delay could not be met.

When either "pull" mode or "push" mode is used, if there's any update of the PFD(s) received and there are still active application detection rules in the UPF 304 for the Application ID, the SMF 310 shall provision the updated PFD set corresponding to the Application ID to the UPF 304.

The SMF 310 should assure not to overload N4 signalling while managing PFD(s) to the UPF 304, e.g. forwarding the PFD(s) to the right UPF 304 where the PFD(s) is enforced.

When the UPF 304 receives the updated PFD(s) from either the same or different SMF 310 for the same application identifier, the latest received PFD(s) shall overwrite any existing PFD(s) stored in the UPF 304.

If the PFDs are managed by local O&M procedures, PFD retrieval is not used. Otherwise, the PFDs retrieved from NEF (PFDF) overrides any PFDs pre-configured in the SMF 310. The SMF 310 shall manage the pre-configured PFDs and PFDs provided by the NEF(PFDF) at the UPF 304 as defined in clause 5.8.2.8.4 of TS 23.501. The SMF 310 may differentiate the need for PFD retrieval based on operator configuration in the SMF 310.

The AF requests including an application identifier may trigger the activation or provisioning of a PCC Rule in the SMF 310 by the PCF 316 based on operator policies.

Packet Flow Description (PFD) is a set of information enabling the detection of application traffic. Each PFD may be identified by a PFD id. A PFD id is unique in the scope of a particular application identifier. Conditions for when PFD id is included in the PFD is described in TS 29.551. There may be different PFD types associated to an application identifier.

A PFD include a PFD id and one or more of the following: a 3-tuple including protocol, server side IP address and port number; the significant parts of the URL to be matched, e.g. host name; a Domain name matching criteria and information about applicable protocol(s); and one or more parameters to handle packets.

Based on the agreement between AF and mobile operator, the PFD can be designed to convey proprietary extension for proprietary application traffic detection mechanisms.

Figure 15:
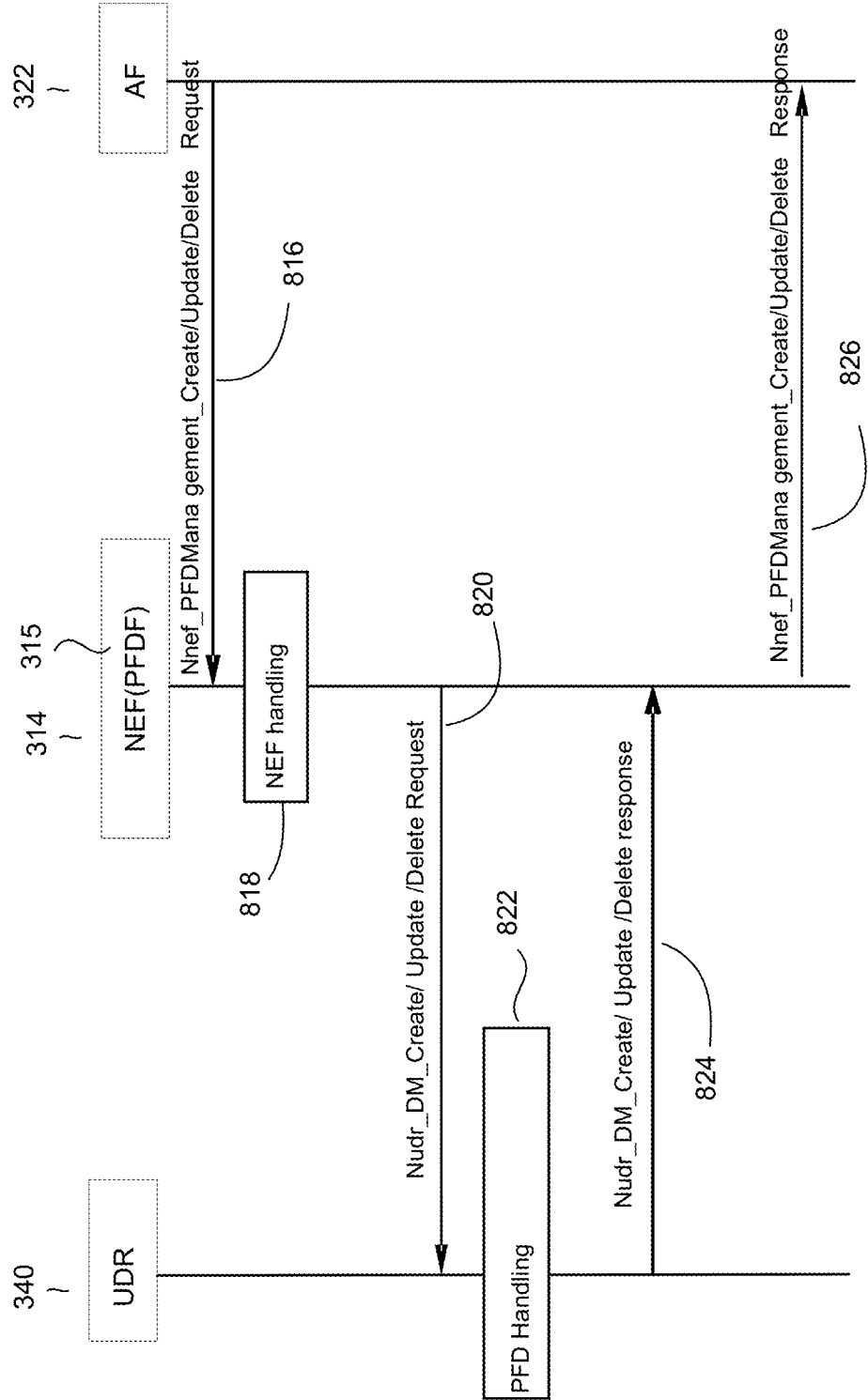
FIG. 15 is a message flow diagram illustrating the use of packet flow description function PFDF service in providing application function requested packet handling parameters.

FIG. 15 is a message flow diagram specified in FIG. 4.18.2-1 of TS 23.502. The content of some of messages are enhanced to illustrate how the AF can provide packet handling parameters to the mobile network according to some present disclosures. Referring to FIG. 15, the PFDF service 315 may be a functionality within the NEF 314. The AF may perform PFD management via PFDF 315 of the NEF 314 as follows.

The AF 322 invokes 816 the Nnef PFDManagement Create/Update/Delete service. The Allowed Delay is an optional parameter. If the Allowed Delay is included, it indicates that the list of PFDs in this request should be deployed within the time interval indicated by the Allowed Delay. Each PFD may include one or more of packet handling parameters.

The NEF 314 checks whether the Application is authorized to perform this request based on the operator policies. The NEF 314 (PFDF 315) invokes 820 the Nudr_DM_Create/Update/Delete (comprising Application Identifier, one or more sets of PFDs, and Allowed Delay) to the UDR 340. The UDR 340 updates 822 the list of PFDs for the Application Identifier. The UDR 340 sends 824 a Nudr_DM_Create/Update/Delete Response to the NEF 314 (PFDF 315). The NEF 314 sends 826 Nnef_PFDManagement_Create/Update/Delete Response to the AF 322.

The UDR 340 may notify subscribed NF, such as PCF 316 and SMF 310 about the new PFDs, and/or packet handling parameters, for example by using Nudr_DM_Notify service. The PCF 316, and/or SMF 310 may receive one or more of following parameters from the UDR to create PHP parameters: Application ID, one or more sets of PFDs, DNN(s), S-NSSAI(s), and packet handling parameters. The SMF 340 may provide PHP parameters to the UE 104, (R)AN 302, UPF 304 during PDU Session Establishment procedure or by using PDU Session Modification procedure.

After receiving the packet handling parameters associated with one Application ID, and/or a set of PFDs, and/or DNN, and/or S-NSSAI, the PCF 316 may create PHP parameters and send PHP parameters to the SMF 310 by using, for example, Npcf_SMPolicyControl_Update service of the PCF 316.

The Nnef_PFDManagement_Create may be used by a NF consumer, such as AF 322, to request PFD management to create PFDs. The AF 322 may include one or more of parameters: AF ID; AF Service ID; External Application Identifier; Application Identifier; one or more sets of PFDs; for each set of PFDs, the AF may include one or more of packet handling parameters, and Allowed Delay. The NEF 314 may send a Transaction Reference ID to the NF consumer.

The Nnef_PFDManagement_Update service may be used by a NF consumer to request PFD management to update PFDs. The NF consumer may provide one or more of following parameters: Transaction Reference ID, one or more sets of PFDs, and Allowed Delay. For each set of PFDs, the NF may include one or more of packet handling parameters. The new packet handling parameters will replace the previous packet handling parameters.

The Nnef_PFDManagement_Delete service may be used by the NF consumer to request PFD management to delete the PFDs and/or to delete packet handling parameters. The NF consumer may provide Transaction Reference ID.

This procedure enables the SMF 310 to retrieve PFDs for an Application Identifier from the NEF 314 (PFDF 315) when a PCC rule with this Application Identifier is provided/activated and PFDs provided by the NEF 314 (PFDF 315) are not available at the SMF 310. In addition, this procedure enables the SMF 310 to retrieve PFDs from the NEF 314 (PFDF 315) when the caching timer for an Application Identifier elapses and a PCC Rule for this Application Identifier is still active.

The NEF 314 (PFDF 315) retrieves the PFDs from UDR 340 unless already available in NEF 314 (PFDF 315).

Figure 16:
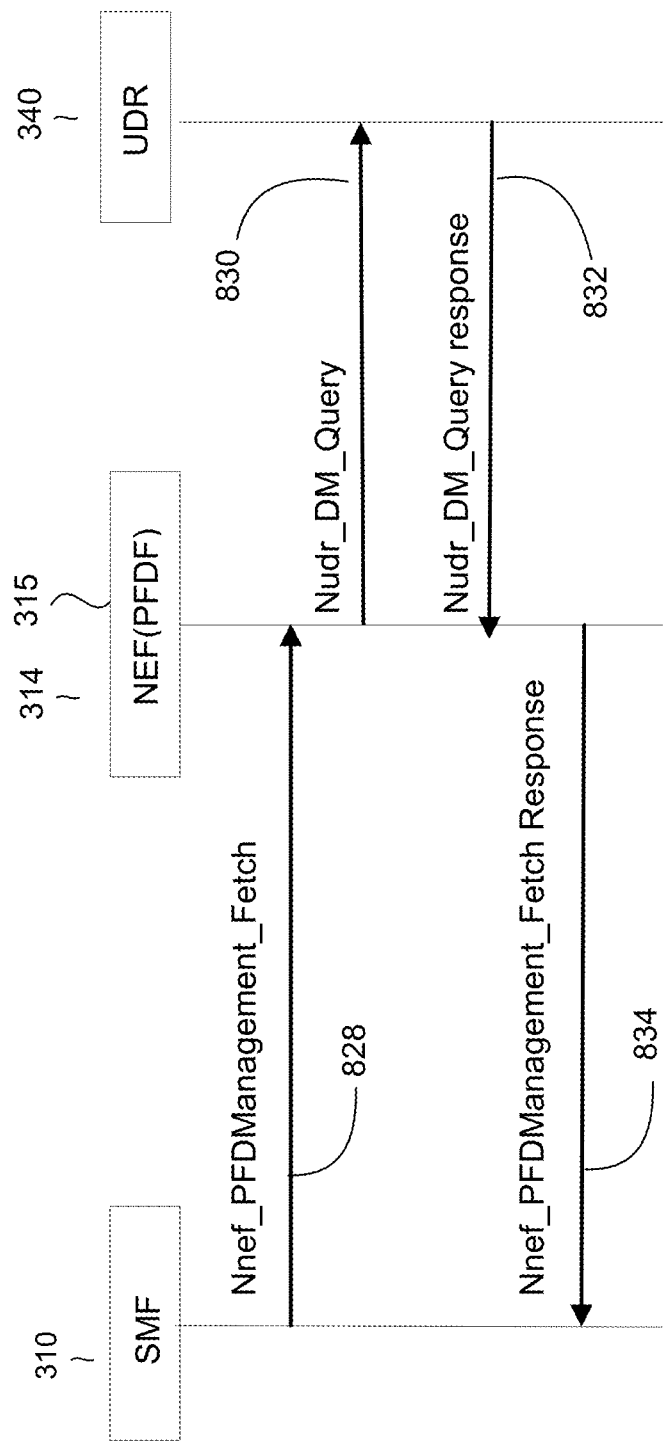
FIG. 16 is a message flow diagram illustrating the retrieval of packet flow descriptions by a session management function according to an embodiment of the present disclosure.

FIG. 16 is a message flow diagram illustrating the PFD retrieval by the SMF 310 as described in clause 4.18.3.1 of TS 23.502. The content of some messages are enhanced according to the present disclosure.

Referring to FIG. 16, the SMF 310 may retrieve PFDs for one or more Application Identifiers in the same Request. All PFDs related to an Application Identifier are provided in the response 832 from the UDR 340 to NEF 314 (PFDF 315).

The SMF 310 invokes 828 the Nnef_PFDManagement_Fetch (Application Identifier (s)) to the NEF 314 (PFDF 315). The NEF 314 (PFDF 315) checks if the PFDs for the Application Identifier (s) are available in the NEF 314 (PFDF 315), if available, the NEF 314 (PFDF 315) replies to the SMF 310 with Nnef_PFDManagement_Fetch Response (Application Identifier(s), PFD(s)). If the PFD includes AF-provided packet handling parameters, the SMF may map the AF-provided packet handling parameters to the packet handling policy (PHP) parameters of mobile network.

If the PFDs for the Application Identifier(s) are not available in the NEF 314 (PFDF 315), the NEF 314 (PFDF 315) invokes 830 Nudr_DM_Query (Application Identifier (s)) to retrieve the PFD(s) from UDR 340. The UDR 340 provides 832 a Nudr_DM_Query response (Application Identifier(s), PFD(s)) to the NEF 314 (PFDF 315). The NEF 314 (PFDF 315) replies to the SMF 310 with Nnef_PFDManagement_Fetch Response (Application Identifier(s), PFD(s)). If the PFD includes AF-provided packet handling parameters, the SMF 310 may map the AF-provided packet handling parameters to the packet handling policy (PHP) parameters of mobile network.

This procedure enables the provisioning, modification or removal of PFDs associated with an application identifier in the SMF 310. Through this procedure the complete list of all PFDs and/or PHP parameters of all application identifiers, the complete list of all PFDs and/or PHP parameters of one or more application identifiers or a subset of PFDs for individual application identifiers may be managed.

Each PFD and/or PHP parameters of an application identifier is associated with a PFD ID in case a subset of the PFD(s) associated with an application identifier can be provisioned, updated or removed. In case always the full set of PFD(s) for an application identifier is managed in each transaction, PFD IDs do not need to be provided.

Figure 17:
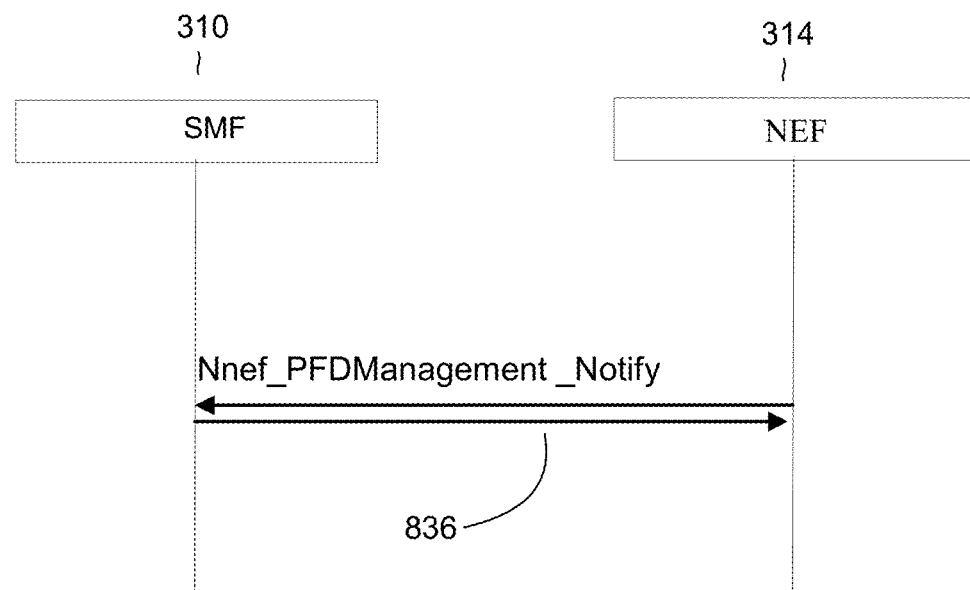
FIG. 17 is a message flow diagram illustrating the management of packet flow descriptions in a session management function according to an embodiment of the present disclosure.

FIG. 17 is a message flow diagram illustrating the management of PFDs in the SMF 310 as described in clause 4.18.3.2 of TS 23.502. The content of some messages are enhanced according to the present disclosures.

Referring to FIG. 17, the NEF 314 (PFDF 315) invokes 836 Nnef_PFD_Management_Notify (Application Identifier, PFDs, PFDs operation, and/or PHP parameters, PHP operation) to the SMF(s) 304 to which the PFD(s) shall be provided. The NEF 314 (PFDF 315) may decide to delay the distribution of PFDs to the SMF(s) 304 for some time to optimize the signalling load. If the NEF 314 (PFDF 315) received an Allowed Delay for a PFD, the NEF 314 (PFDF 315) shall distribute this PFD within the indicated time interval. PHP operation may be included to indicate an addition, removal, or update of PHP parameters of one or more PFDs.

The Nnef_PFDManagement_Notify is used by the NEF 314 to provide updated PFDs for Application Identifier to the NF Consumer, such as SMF 310 or PCF 316. The NEF 314 may provide one or more of following parameters to the NF consumer: Application Identifier(s), PFDs, packet handling parameters. If the PFD includes AF-provided packet handling parameters, the SMF 310 may map the AF-provided packet handling parameters to the packet handling policy (PHP) parameters of mobile network. After receiving new or updated, or deleting PFD from another NF, such as NEF 314 or PCF 316, or UDR 340, the SMF 310 may use an N4 procedure to provision or remove all PFD(s) and/or PHP parameters belonging to an Application ID in the UPF 304. PFD sets belonging to different Application IDs can be managed with the same PFD management request message.

Figure 18:
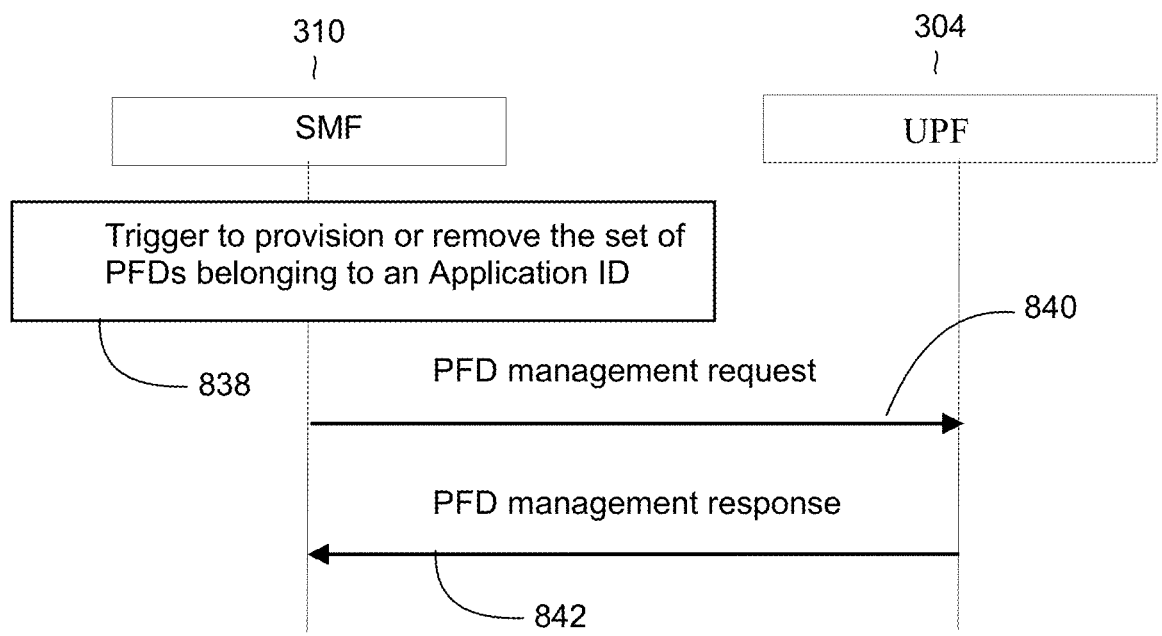
FIG. 18 is a message flow diagram illustrating the management of packet flow descriptions in a user plane function according to an embodiment of the present disclosure.

FIG. 18 is a message flow diagram illustrating the PFD management in the UPF 304 as described in clause 4.4.3.5 of TS 23.502. The content of some messages are modified according to an embodiment of the present disclosure. The N4 PFD management procedure is a node level procedure, i.e. independent of any PDU Session.

Referring to FIG. 18, the SMF 310 is triggered to provision or remove the PFD set and/or PHP parameters belonging to an Application ID in the following cases: when the caching timer expires and there is no active PCC rule that refers to the corresponding application identifier, the SMF 310 informs the UPF 304 to remove the PFD(s) identified by the Application ID; when a PCC rule is provided for an Application ID corresponding to the PFD(s) that are not already provided to the UPF 304, the SMF 310 shall provide the PFD(s) to the UPF 304 (if there are no PFD(s) cached, the SMF 310 retrieves them from the NEF 314 (PFDF 315), as described in TS 23.503); when any update of the PFD(s) is received from NEF 314 (PFDF 314), and there are still active PCC rules in UPF 304 for the Application ID.

The SMF 310 sends a PFD management request to the UPF 304 to provision/remove the PFD(s) and/or PHP parameters corresponding to the Application ID(s). The UPF 304 updates the PFD(s) according to the request and acknowledges by responding with a PFD management response message.

In the RAN 302, after receiving PHP parameters associated with a QoS profile of a QoS flow, the (R)AN 302 may set its operational parameter accordingly. For example, if the (R)AN 302 receive an indication drop-delayed-packet and the S-MPDB parameter is 20 ms, the (R)AN 302 (e.g. the Radio Resource Control (RRC) unit) may set the MPDT=20 ms in the Packet Data Convergence Protocol (PDCP) layer of the QoS flow. In the PDCP layer, the discard Timer may be set the same as MPDT parameter. When a service data unit (SDU) in the PDCP layer is sent to the Radio Link Control (RLC) layer, the PDCP layer may start a timer. The discardTimer is a timer in the PDCP layer to instruct the PDCP layer to discard (or drop) if the discardTimer is expired.

In another example, the SMF 310 may provide an end-to-end packet delay budget of 40 ms to the (R)AN 302, and the drop-delayed-packet=FALSE, to the (R)AN 302, the (R)AN 302 may set discardTimer=infinity. It means that the (R)AN 304 shall not discard the packets.

The mobile network or application server may send packets of URLLC applications over two separate UP paths to increase the reliability. In this scenario, the packets may be sent from/to the UE by two (R)AN nodes. There may be one or two SMF instances that serve the UE. The present invention provide solutions below that allow coordination among two (R)AN nodes, or two SMF, or two UPF to handle packets.

Figure 10:
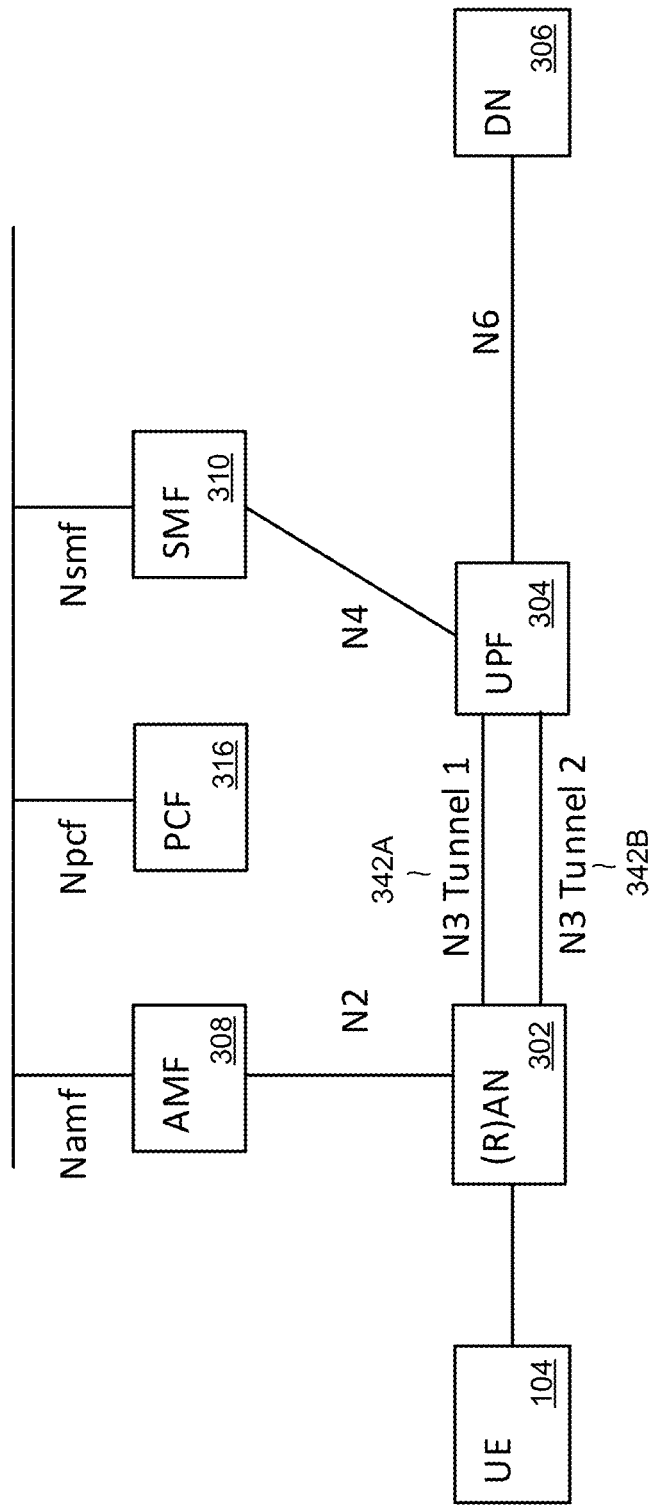
FIG. 10 is block diagram illustrating the first option for the network architecture to support the packet duplication transmission consisting of one UPF, one (R)AN node, and two separate N3 tunnels to deliver packets between the UPF and (R)AN node, according to an embodiment of the present invention.

FIG. 10 is block diagram illustrating the first option for the network architecture to support the packet duplication transmission consisting of one UPF, one (R)AN node, and two separate N3 tunnels to deliver packets between the UPF and (R)AN node, according to an embodiment of the present invention.

Referring to FIG. 10, the SMF 310 establishes a PDU Session having two N3 tunnels, 342A and 342B, connecting (R)AN 302 and UPF 304. There could be one or several intermediate UPFs between the (R)AN 302 and the UPF 304. The N9 interface is used to connect UPFs. Each NF may be assigned by the SMF 310 the same PHP. Alternatively, the SMF 310 may assign a separate PHP for each N3 Tunnel, 342A and 342B. If the two N3 tunnels, 342A and 342B, have separate PHP, the PHP parameters of the two PHP may be different. For example, in the Drop-Delayed-Packet parameter of one N3 Tunnel 1 342A is set to be TRUE, while the Drop-Delayed-Packet parameter of the other N3 Tunnel 2 342B is set to be FALSE. It means that only one N3 Tunnel, 342A or 342B will forward the delayed packets. The Drop-Delayed-Packet parameters of the two N3 Tunnel 342A and 342B may be set to be TRUE for both UL and DL.

Figure 11:
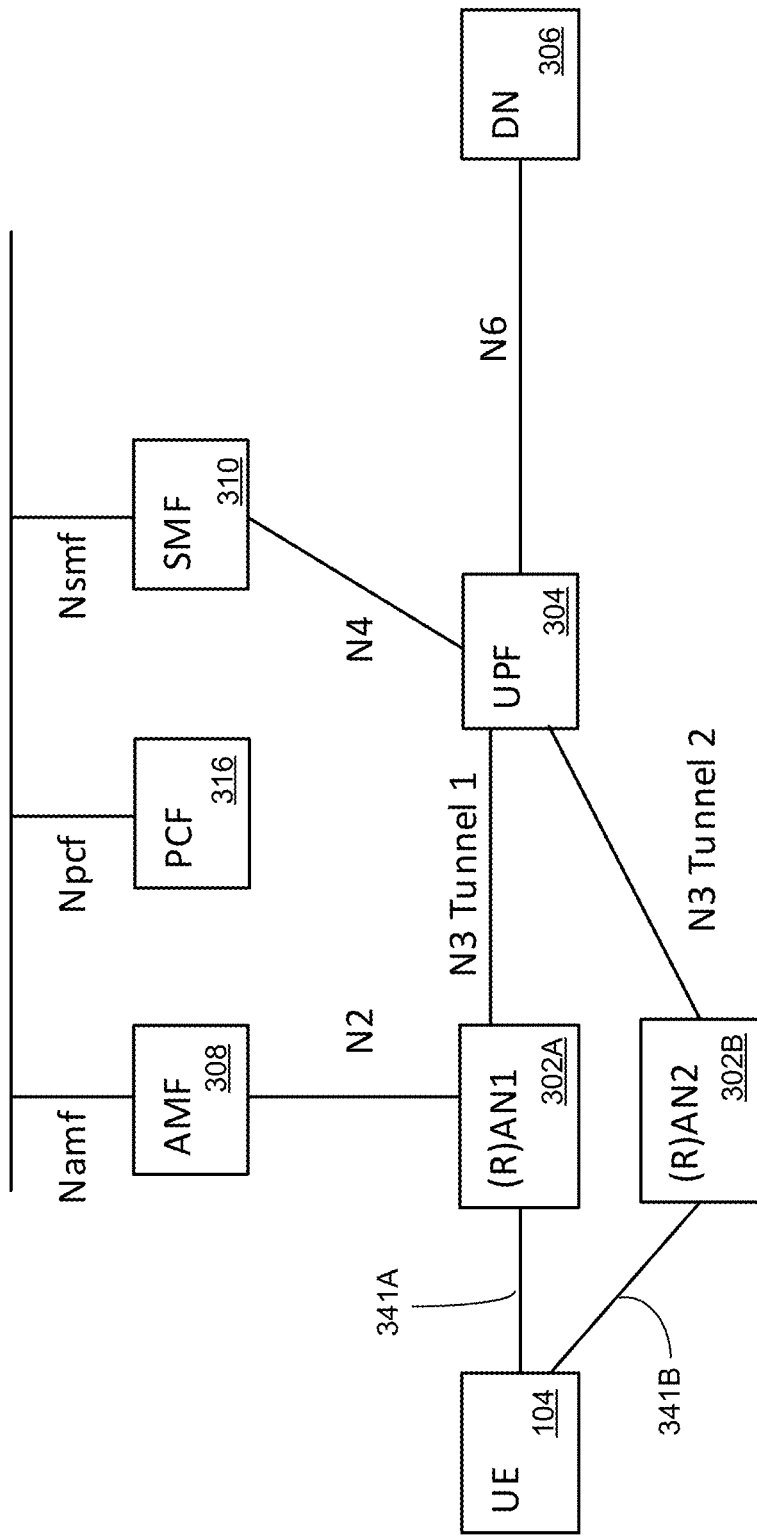
FIG. 11 is a block diagram illustrating the second option for the network architecture to support the packet duplication transmission consisting of One PDU Session, one UPF, and two UP paths, according to an embodiment of the present invention.

FIG. 11 is a block diagram illustrating the second option for the network architecture to support the packet duplication transmission consisting of one PDU Session, one UPF, and two UP paths, according to an embodiment of the present invention.

Referring to FIG. 11, there are two separate UP paths between the UPF 304 and the UE 104. There are two radio links, 341A and 341B, between the UE 104 and two (R)AN nodes 302A and 302B. But it is possible that there is only one (R)AN node and are two different carrier frequencies to deliver packets between the (R)AN and the UE 104. One (R)AN node, for example 302B, may be called Master (R)AN (M-(R)AN) node, and the other, for example 302A, is called Secondary (R)AN (S-(R)AN) node. The M-(R)AN node, for example 302B, may have certain control over the radio parameters of the S-(R)AN node, for example 302A.

The SMF 310 may assign the same UL or DL PHP to the two (R)AN nodes, 302A and 302B, so that the two UL (and/or DL) radio channel may treat the packets in the same way.

Alternatively, the SMF 310 may assign different PHP for each (R)AN node, 302A and 302B, to handle UL and/or DL packets differently. For example, the Drop-Delayed-Packet parameter of DL PHP for (R)AN1 node 302A may be TRUE, while the Drop-Delayed-Packet parameter of DL PHP for (R)AN2 node 302B may be FALSE. It means that only one of (R)AN node, 302A or 302B, may forward the late packets to the UE 104. In another example, the SMF 310 may set Drop-Delayed-Packet parameter in the UL to be TRUE in (R)AN1 node 302A, while Drop-Delayed-Packet parameter in the UL to be FALSE in (R)AN2 node 302B may be FALSE. It means that the UE 104 may send late packets to only one of the (R)AN nodes, 302A or 302B.

Alternatively, the SMF 310 may assign only 1 PHP to one of the (R)AN node, for example (R)AN1 302A, or the M-(R)AN node. The (R)AN1 node 302A may derive PHP for the other (R)AN2 node 302B. For example, the Drop-Delayed-Packet parameter in the PHP for the DL may be TRUE. The (R)AN1 node 302A may set Drop-Delayed-Packet parameter in the PHP for the DL of the (R)AN2 node to be FALSE. In this example, only one of the (R)AN node, 302A or 302B, forwards the late DL packets to the UE 104.

Figure 12:
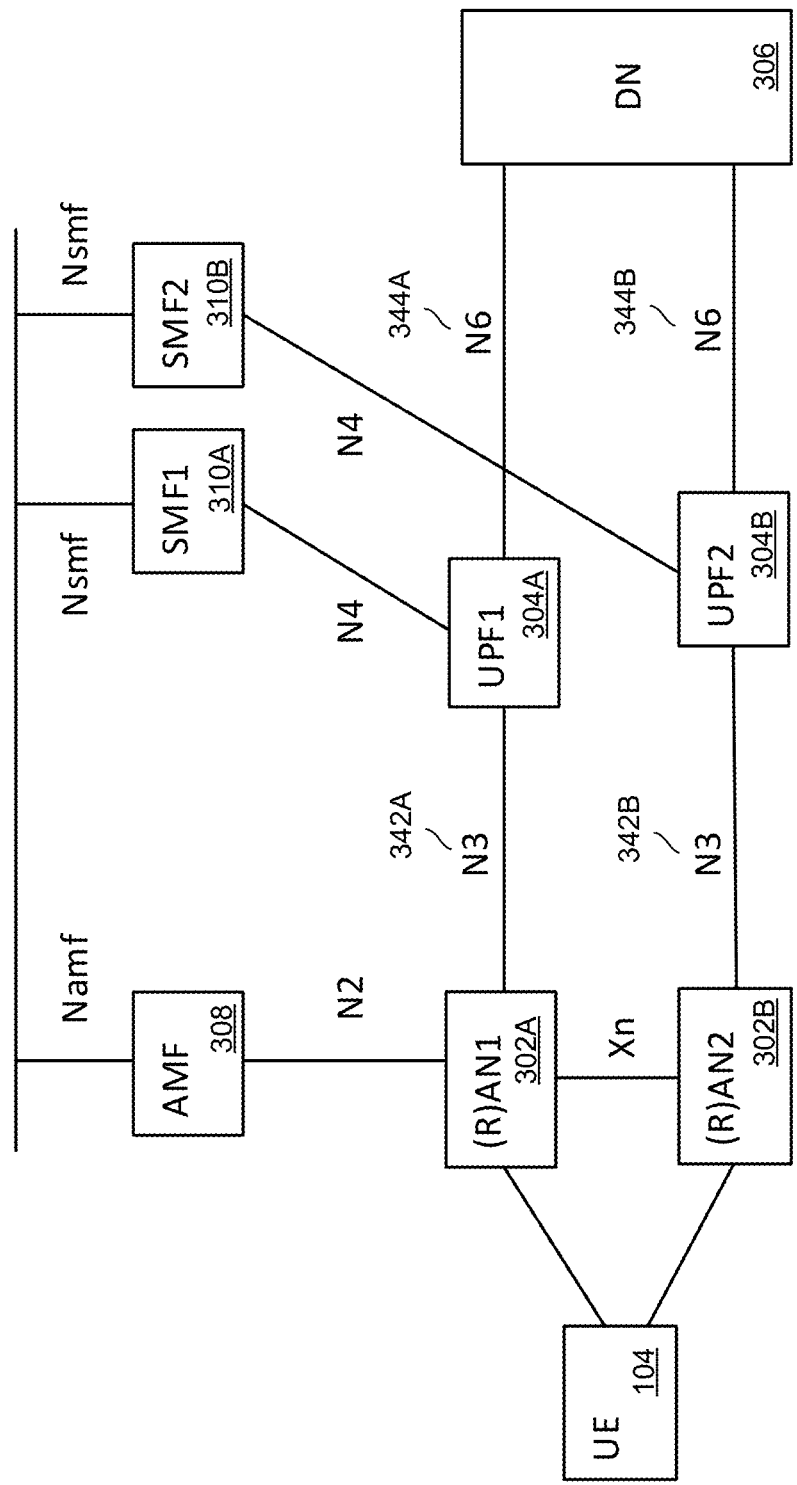
FIG. 12 is a block diagram illustrating the third option for the network architecture to support the packet duplication transmission, in which there are two separate PDU sessions, according to an embodiment of the present invention.

FIG. 12 is a block diagram illustrating the third option for the network architecture to support the packet duplication transmission, in which there are two separate PDU sessions, according to an embodiment of the present invention.

Referring to FIG. 12, a single UE 104 requests 2 PDU Sessions. A first PDU session is established by SMF1 310A and spans (R)AN1 302A and UPF1 304A between the UE 104 and the DN 306. A second PDU session is established by SMF2 310B and spans (R)AN2 302B and UPF2 304B between the UE 104 and the DN 306. The UP connections of the two PDU Sessions are separated from each other. While two SMFs (SMF1 310A and SMF2 310B) are shown for possible redundancy, as an alternative a single SMF can be used. Further, while two (R)AN1 302A and (R)AN2

302B nodes are shown, as an alternative, the SMF, for example one of SMF1 310A or SMF2 310B, can select a single (R)AN node, 302A or 302B to support both PDU sessions. Or as a further alternative, the two SMFs, SMF1 310A and SMF2 310B, may coordinate to select the single (R)AN node. In either case, the (R)AN node, 302A or 302B could establish two radio channels (e.g. two DRBs), one for each PDU session. The two radio channels can use the same carrier frequency or two different carrier frequencies. While two UPF1 304A and UPF2 304B are shown, in some embodiments the SMF (for example one SMF, 310A or 310B, or two SMFs, 310A and 310B) could select the same UPF, 304A or 304B and establish two separate N3 tunnels, 342A and 342B, from the same UPF, 304A or 304B. Further, two separate N6 interfaces, 344A and 344B, may be established to connect the UPF, 304A or 304B, (or UPF1 304A and UPF2 304B) with the DN 306. The AMF 308 may select one SMF, 310A or 310B, or two SMFs (SMF1 310A and SMF2 310B) to establish the two PDU Sessions.

If one SMF, 310A or 310B, is selected to establish the two PDU Sessions, the SMF, for example 310A, may assign the same PHP to the NFs of the two UP paths. Alternatively, the SMF, for example 310A, may assign different PHP to the NFs of the UP paths. For example, the SMF, for example 310A, may set Drop-Delayed-Packet parameter of the DL PHP in (R)AN1 node 302A to be TRUE, while Drop-Delayed-Packet parameter of the DL PHP in (R)AN2 node 302B to be FALSE. It means that only one of the two (R)AN nodes, 302A or 302B, may deliver late packets to the UE 104. For example, only a master (R)AN node may deliver the late packets, while the secondary (R)AN node may discard the late packets.

If two SMFs, 310A and 310B are selected, the two SMFs, 310A and 310B may set the same PHP for UP under control of the SMFs. Alternatively, the SMF1 310A and SMF2 310B may coordinate with each other, explicitly or implicitly, to set different PHP for each PDU Session. For example, the UE 104 may have a parameter in the PDU Session Establishment request to indicate the first and the second PDU Session for redundant packet transmission. The SMF1 310A that serves the first PDU Session may set Drop-Delayed-Packet parameter in the DL PHP in the (R)AN1 node 302A to be TRUE. The SMF2 310B that serves the second PDU Session may set Drop-Delayed-Packet parameter in the DL PHP of the (R)AN2 node 302B to be FALSE. It means that the delayed packets are sent to the UE 104 from only one of the two PDU Sessions.

Figure 13:
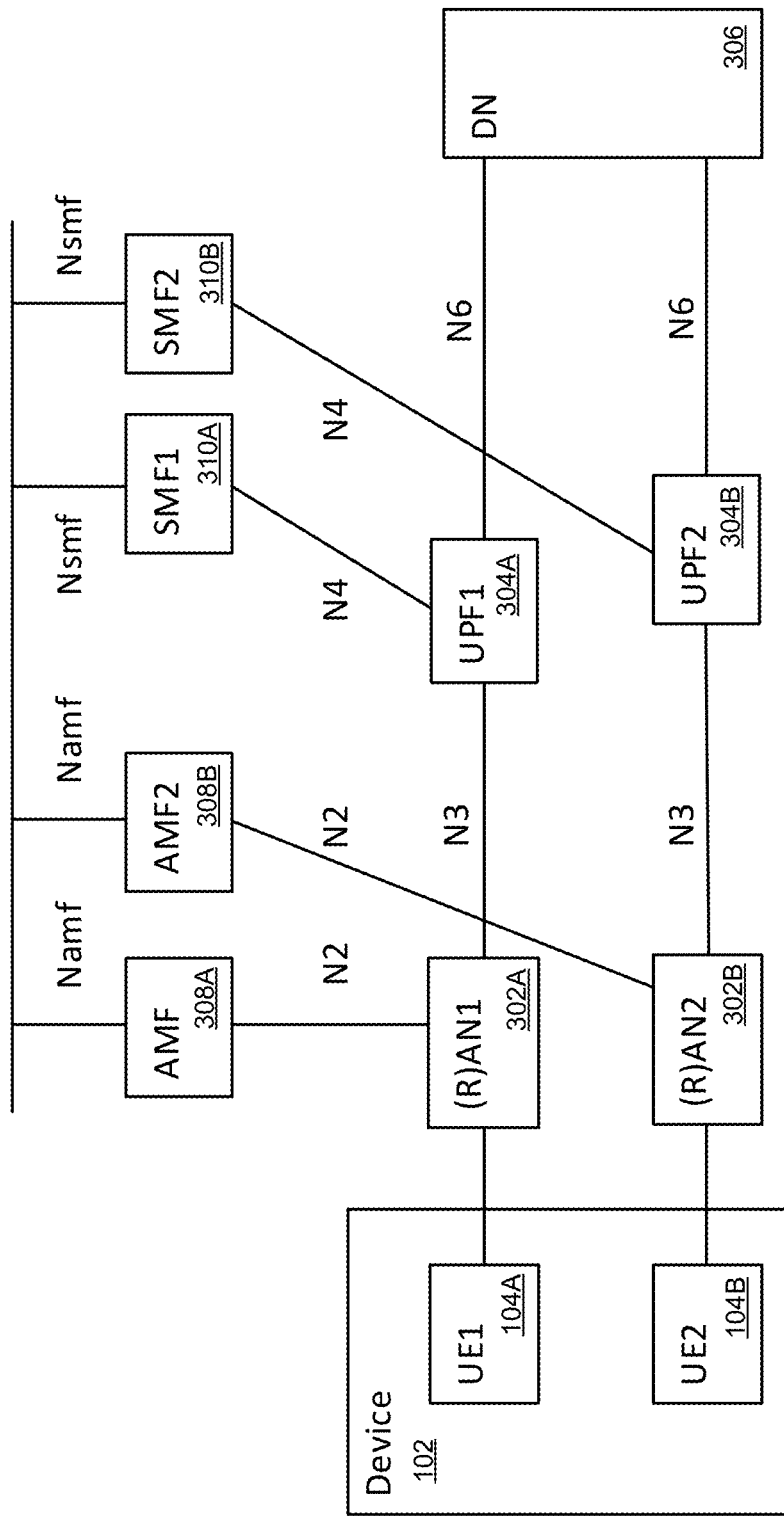
FIG. 13 is an illustration of the forth option for the network architecture to support the packet duplication transmission consisting of two separate UEs (in a device) and two separate PDU Sessions, according to an embodiment of the present invention.

FIG. 13 is an illustration of the forth option for the network architecture to support the packet duplication transmission consisting of two separate UEs (in a device) and two separate PDU Sessions, according to an embodiment of the present invention.

Referring to FIG. 13, the device 102 has two UE, 104A and 104B, in which each UE, 104A and 104B, may request one PDU Session for packet redundant transmission. Each UE, 104A and 104B, may include an indication in the PDU Session Establishment request for redundant PDU Session, or the first and second PDU Session so that the selected AMF, 308A or 308B, or 308A and 308B, and/or SMF, 310A or 310B, or 310A and 310B, will select different UP paths for each PDU Session. The UE 104A and UE 104B may have different 5GSM Capability for handling packets. For example, one UE 104A may have the capability to monitor uplink packet delay, while the other UE 104B may not have the capability to monitor uplink packet delay. The SMF 310A and SMF 310B may establish PHP parameters according to the UE's capability to handle packets.

The SMF1 310A and SMF2 310B may set the same UL and/or DL PHP for the UP functions, for example, the (R)AN1 302A/(R)AN2 302B nodes and the UPF1 304A/UPF2 304B.

Alternatively, the SMF1 310A and SMF2 310B may set different parameters in the PHP for UL and/or DL of UP functions. For example, the SMF1 310A may set Drop-Delayed-Packet parameter in the DL PHP of (R)AN1 node 302A to be TRUE, while the SMF2 310B may set Drop-Delayed-Packet parameter in the DL PHP of (R)AN2 302B node to be FALSE. It means that only one of the two PDU Sessions needs to forward the late DL packets to the UE 104A or 104B, or 104A and 104B.

An aspect of the disclosure provides a method for handling packets in a mobile wireless network. Such a method includes receiving a packet handling policy (PHP), sent from a first control plane function, by a second control plane function. Such a method further includes sending the PHP, by the second control plane function, to other network functions for instructing devices in the user plane of the mobile wireless network how to handle packets for a QoS flow of a PDU session. In some embodiments, the devices in the user plane include user plane functions, radio access network nodes, and mobile devices. Accordingly devices in a user plane path include user plane functions, radio access network nodes, and mobile devices. In some embodiments, the PHP comprises of at least one of following: an end-to-end packet delay budget (E2E PDB) parameter; a segment packet delay budget (S-PDB) parameter; a network function packet delay budget (NF-PDB) parameter; a first indication called drop-delayed-packet parameter; an end-to-end maximum packet delay budget (E2E MPDB) parameter; a segment maximum packet delay budget (S-MPDB) parameter; a network function maximum packet delay budget (NF MPDB); a second indication called a drop-maximum-delayed-packet parameter; a first packet priority parameter, which may be called normal-packet-scheduling-priority; a second packet priority parameter, which may be called delayed-packet-scheduling-priority. In some embodiments the first control plane function is a PCF and the second control plane function is an SMF. In some embodiments the other network functions comprises of at least one of (R)AN, UPF, AMF, and NEF. In some embodiments the network function is a UPF and the PHP instructs the UPF to add a timestamp to at least one of a packet header and a tunnel header of a received packet. In some embodiments the network function that receives the PHP creates a packet delay threshold (PDT) based on the PHP. In some embodiments the network function that receives the PHP creates a maximum packet delay threshold (PDT) based on the PHP. In some embodiments, the PHP includes at least one of the following: QoS Profile; QoS Rules; Packet Detection Rule (PDR); and Standardized 5G QoS identifier. Alternatively, in some embodiments the PHP parameters can be part of QoS profile, QoS rule, and/or PDR. In some embodiments, the PHP includes a QoS profile for a (R)AN node. In some embodiments the PHP includes QoS rules for a UE. In some embodiments, the PHP includes a Packet Detection Rule for a UPF. In some embodiments, the PHP is dynamically signaled in a QoS profile. In some embodiments the PHP is part of the QoS profile for each QoS flow of a PDU session. In some embodiments the PHP is part of the QoS profile for GBR QoS Flow of a PDU session. In some embodiments, the PHP is part of the QoS profile for delay critical GBR QoS Flow QoS flow of a PDU session. In some embodiments the PHP is part of the QoS profile for each non-GBR QoS flow of a PDU session. In some embodiments the PHP parameters include a drop-delayed-packet parameter comprising at least of two values. In some embodiments the PHP parameters include a drop-maximum-delayed-packet parameter comprising at least of two values. In some embodiments the PHP parameters includes a parameter to instruct at least one of a UE, RAN node, and UPF to drop a packet when the packet delay is longer than a packet delay budget. In some embodiments the PHP parameters includes a parameter to instruct at least one of UE, RAN node, and UPF to drop packet when the packet delay is longer than a maximum packet delay budget. In some embodiments the PHP parameters includes parameters to handle packets when duplicated transmission is activated in RAN; and further comprising establishing duplicated transmission in the RAN. In some embodiments the PHP parameters includes parameters to handle packets when duplicated transmission is activated in a UE; and further comprising establishing duplicated transmission in the UE. In some embodiments the PHP parameters includes parameters to handle packets when duplicated transmission is activated in the user plane of the core network; and further comprising establishing duplicated transmission in the user plane of the core network. In some embodiments the PHP parameters includes parameters to handle packets when duplicated transmission is activated in the DN, CN, RAN, and UE; and further comprising establishing duplicated transmission in the DN, CN, RAN, and UE.

A further aspect of the disclosure provides a method for providing and updating a PHP comprising a network function (AF) sending a request message to a first Control plane function to provide and update the PHP; and the request message containing the PHP parameters. In some embodiments a network function sending a request message includes a request to create packet handling policy in the PCF by configuring PCF. In some embodiments the PHP parameters comprises at least one of the following parameters: an end-to-end packet delay budget (E2E PDB) parameter; a segment packet delay budget (S-PDB) parameter; a network function packet delay budget (NF-PDB) parameter; a first indication called drop-delayed-packet parameter; an end-to-end maximum packet delay budget (E2E MPDB) parameter; a segment maximum packet delay budget (S-MPDB) parameter; A network function maximum packet delay budget (NF MPDB); a second indication called a drop-maximum-delayed-packet parameter; a first packet priority parameter, which may be called normal-packet-scheduling-priority; and a second packet priority parameter, which may be called delayed-packet-scheduling-priority. In some embodiments the network function is a PCF and the AF sends the request message by one of the following request messages: Npcf_PolicyAuthorization_Create or Npcf_policyAuthorizationn_Update. In some embodiments the network function is a PCF and the AF sends the request message via an NEF by one of the following request messages: Nnef_PacketHandling_Create or Nnef_PacketHandling_Update.

A further aspect of the disclosure provides a method for handling packets in a mobile wireless network performed by a PCF. The method comprising of receiving information pertaining to packet handling policy (PHP) parameters for a PDU session; and sending the PHP to other network functions for instructing devices in the user plane of the mobile wireless network how to handle packets. In some embodiments, the devices in the user plane path include user plane functions, radio access network nodes, and mobile devices. In some embodiments the receiving information includes receiving PHP parameters from at least one of a mobile device and an application function. In some embodiments the PHP parameters includes a parameter to instruct at least one of UE, RAN, UPF to drop packets when the packet delay is longer than a packet delay budget. In some embodiments the PHP parameters includes a parameter to instruct at least one of UE, RAN, UPF to drop packets when the packet delay is longer than a maximum packet delay budget. In some embodiments the packet delay budget is one of packet delay budget of a network function, packet delay budget of a network segment and packet delay budget of the end-to-end PDU system. In some embodiments the maximum packet delay budget is one of maximum packet delay budget of a network function, maximum packet delay budget of a network segment, maximum packet delay budget of the end-to-end PDU system. In some embodiments the PHP parameters includes a parameter indicating packet handling priority when the packet delay in the buffer of a device in the user plane of the mobile wireless network is less than packet delay budget. In some embodiments the PHP parameters includes a parameter indicating packet handling priority when the packet delay in the buffer of a device in the user plane of the mobile wireless network is larger than the packet delay budget and smaller than or equal maximum packet delay budget.

An aspect of the disclosure provides a method for handling packets in a mobile wireless network. Such a method includes: receiving a packet handling policy (PHP), from a first control plane function, by a second control plane function, the PHP indicating how to handle packets. The method also includes: responsive to receiving the PHP, sending, by the second control plane function, packet handling instructions according to the PHP to at least one device in at least one user plane path of the mobile wireless network for a QoS flow of a PDU session. In some embodiments, the packet handling instructions includes at least one of: a drop-delayed-packet parameter indicating to drop or deliver a packet when a packet delay of the packet exceeds a packet delay threshold (PDT); and a drop-maximum-delayed packet parameter indicating to drop or deliver a packet when a packet delay of the packet exceeds a maximum threshold larger than the PDT. In some embodiments, the packet handling instructions further includes at least one of: a first packet priority parameter indicating a scheduling priority of a packet for a packet scheduler to schedule a transmission of the packet when a packet delay of the packet is less than or equal to the packet delay threshold (PDT); and a second packet priority parameter indicating a scheduling priority of a packet for a packet scheduler to schedule the transmission of the packet when the packet delay is greater than the PDT and less than or equal to a maximum packet delay threshold (MPDT). In some embodiments, the packet handling instructions instruct the at least one device to add packet delay information into each packet of the PDU session. In some embodiments, the packet handling instructions are to configure the device to obtain at least one of a packet delay threshold (PDT) and a maximum packet delay threshold (MPDT) based on the received PHP; where MPDT is larger than PDT. In some embodiments, the packet handling instructions instruct the device to drop a packet having one of: a packet delay longer than the PDT, where the device has a drop-delayed-packet parameter set to a first value; and a packet delay longer than the MPDT, where the device has a drop-maximum-delay packet parameter set to a first value. In some embodiments, the packet handling instructions instruct the device to deliver a packet having one of: a packet delay longer than the PDT, where the device has a drop-delayed-packet parameter is set to a second value; a packet delay longer than the PDT and less than MPDT, where the device has a drop-delayed-packet parameter set to a second value and a drop-maximum-delay packet parameter set to a first value; and a packet delay longer than the MPDT, where the device has a drop-maximum-delay packet parameter is set to a second value. In some embodiments, the first control plane function is a policy control function (PCF) and the second control plane function is a session management function (SMF). In some embodiments, the at least one device includes at least one user plane function (UPF) and the step of sending the packet handing instructions includes sending a packet detection rule (PDR). In some embodiments, the packet handling instructions are sent to the at least one device via an access and mobility management function (AMF). In some embodiments, the at least one device is a radio access network (R)AN(s) node, and the step of sending the packet handling instructions includes sending a QoS profile. In some embodiments, the at least one device is a user equipment (UE), and the step of sending the packet handling instructions includes sending a QoS rule.

Another aspect of the disclosure provides a method of handling packets in a mobile wireless network, by at least one device in at least one user plane path. Such a method includes receiving packet handling instructions for a QoS flow of a protocol data unit (PDU) session from a session management function (SMF). Such a method further includes obtaining at least one of a packet delay threshold (PDT) and a maximum packet delay threshold (MPDT) based on the received packet handling instructions; wherein MPDT is larger than PDT. Such a method further includes performing one of delivering and dropping a packet according to the received packet handling instructions. In some embodiments, the at least one device is a radio access network ((R)AN) node and the (R)AN node receives the packet handling instructions via an access and mobility management function (AMF). In some embodiments, the step of receiving the packing handling instructions includes receiving a QoS profile including a parameter associated with a packet handling policy (PHP). In some embodiments, obtaining the PDT and the MPDT includes one of: creating, by the at least one device, a new PDT and a new MPDT according to the received packet handling instructions; setting, by the at least one device, existing parameters according to the received packet handling instructions; and sending, by the at least one device to a function with the PDT and the MPDT according to the received packet handling instructions.

Another aspect of the disclosure provides a control plane function for handling packets in a mobile wireless network. Such a control plane function includes a processor; and non-transient machine readable memory storing machine readable instructions to configure the control plane function for carrying out the methods disclosed herein. For example the instructions configure the control plane function for receiving a packet handling policy (PHP), from a first control plane function, the PHP indicating how to handle packets; and responsive to receiving the PHP, sending packet handling instructions according to the PHP to at least one device in at least one user plane path of the mobile wireless network for a QoS flow of a PDU session. In some embodiments, the packet handling instructions includes at least one of: a drop-delayed-packet parameter indicating to drop or deliver a packet when a packet delay of the packet exceeds a packet delay threshold (PDT); and a drop-maximum-delayed packet parameter indicating to drop or deliver a packet when a packet delay of the packet exceeds a maximum threshold larger than the PDT. In some embodiments, the packet handling instructions further includes at least one of: a first packet priority parameter indicating a scheduling priority of a packet for a packet scheduler to schedule a transmission of the packet when a packet delay of the packet is less than or equal to the packet delay threshold (PDT); and a second packet priority parameter indicating a scheduling priority of a packet for a packet scheduler to schedule the transmission of the packet when the packet delay is greater than the PDT and less than or equal to a maximum packet delay threshold (MPDT).

Another aspect of the disclosure provides for a device including a processor and a non-transient machine readable memory storing machine readable instructions to configure the device for executing the methods disclosed herein. For example such a device can be a device in at least one user plane path and configured for receiving packet handling instructions for a QoS flow of a protocol data unit (PDU) session from a session management function (SMF); obtaining at least one of a packet delay threshold (PDT) and a maximum packet delay threshold (MPDT) based on the received packet handling instructions; wherein MPDT is larger than PDT; and performing one of delivering and dropping a packet according to the received packet handling instructions. In some embodiments, the device is a radio access network ((R)AN) node and the (R)AN node receives the packet handling instructions via an access and mobility management function (AMF). In some embodiments, the at least one device is a radio access network (R)AN(s) node, and the instructions for sending the packet handling instructions includes instructions for sending a QoS profile. In some embodiments, the device is a user equipment (UE), and the instructions for sending the packet handling instructions includes instructions for sending a QoS rule.

Another aspect of the disclosure provides a system for handling packets in a mobile wireless network. Such a system includes a first control plane function configured for sending a packet handling policy (PHP) to a second control plane function, the PHP indicating how to handle packets. Such a system also includes the second control plane function configured to send packet handling instructions according to the PHP to at least one device in at least one user plane path of the mobile wireless network for a QoS flow of a PDU session. In some embodiments, the packet handling instructions includes at least one of: a drop-delayed-packet parameter indicating to drop or deliver a packet when a packet delay of the packet exceeds a packet delay threshold (PDT); and a drop-maximum-delayed packet parameter indicating to drop or deliver a packet when a packet delay of the packet exceeds a maximum threshold larger than the PDT. In some embodiments, the packet handling instructions further includes at least one of: a first packet priority parameter indicating a scheduling priority of a packet for a packet scheduler to schedule a transmission of the packet when a packet delay of the packet is less than the packet delay threshold (PDT); and a second packet priority parameter indicating a scheduling priority of a packet for a packet scheduler to schedule the transmission of the packet when the packet delay is no less than the PDT and no larger than a maximum packet delay threshold (MPDT). In some embodiments, the at least one device in at least one user plane path is configured for: receiving packet handling instructions for a QoS flow of a protocol data unit (PDU) session from a session management function (SMF); obtaining at least one of a packet delay threshold (PDT) and a maximum packet delay threshold (MPDT) based on the received packet handling instructions; wherein MPDT is larger than PDT; and performing one of delivering and dropping a packet according to the received packet handling instructions.

Another aspect of the disclosure method for providing a packet handling policy (PHP), by a session management function (SMF). Such a method includes receiving information; obtaining PHP for a QoS flow of a protocol data unit (PDU) session based on the received information, the PHP indicating how to handle packets; and sending the PHP to at least one device in at least one user plane path of a mobile wireless network. In some embodiments, the information includes at least one of: PDU session parameters provided by a user equipment (UE); connection management parameters provided by an access and mobility management function (AMF); application information provided by an application function (AF); user subscription data from a unified data management function (UDM); policy and charging control (PCC) rules from a policy control function (PCF); and PHP parameters from the PCF. In some embodiments, the device is a user plane functions (UPF), and the step of sending the PHP includes sending a packet detection rule. In some embodiments, the PHP is sent to the at least one device via an access and mobility management function (AMF). In some embodiments, the device is a user equipment (UE), and the step of sending the PHP includes sending a QoS rule including a parameter associated with a packet handling policy (PHP). In some embodiments, the devices is a radio access network ((R)AN) node, and the step of sending the PHP includes sending a QoS profile including a parameter associated with a packet handling policy (PHP).

Another aspect of the disclosure provides a method for updating a packet handing policy (PHP) of a QoS flow by a session management function (SMF). Such a method includes: receiving a trigger to update the PHP; obtaining the updated PHP; and sending the updated PHP to devices in at least one user plane path of a mobile wireless network. In some embodiments, the trigger is at least one of: a request from a user equipment (UE) sent via a radio access network ((R)AN) node and an access and mobility management function (AMF) including an indication that a delayed packet of a Qos flow associated with a packet filter is to be one of dropped and delivered; an indication from the (R)AN sent via an AMF, that the access network resources onto which a QoS flow is mapped are released; a report from a user plane function (UPF) indicating that the UPF detects a protocol data unit (PDU) that is to be one of discarded and delivered if the PDU is delayed; and a notification from a policy control function (PCF) to update the PHP of a QoS flow in response to a request from one of an operation administration and maintenance (OAM) system and an application function (AF) via a network exposure function (NEF). In some embodiments, the trigger is the request from UE sent via a (R)AN node and an AMF including an indication that a delayed packet of a QoS flow associated with a packet filter is to be one of dropped and delivered. In some such embodiments the SMF obtains the updated PHP by one of: creating the updated PHP with parameters from a user equipment (UE) request; communicating with a policy control function (PCF) to obtain the updated PHP; and creating the updated PHP with parameters from protocol data unit (PDU) session context in the SMF. In some embodiments, the trigger is the report from a UPF indicating that the UPF detects a PDU that is to be one of discarded and delivered if the PDU is delayed. In some such embodiments, the SMF obtains updated PHP parameters by one of: communicating with a policy control function (PCF) to obtain the updated PHP; and creating the updated PHP with parameters from PDU session context in the SMF. In some embodiments, the device is a user plane function (UPF) and the step of sending the updated PHP includes sending packet detection rules. In some embodiments, the updated PHP are sent to devices via an access and mobility management function (AMF). In some embodiments, the device is a user equipment (UE), and the step of sending the updated PHP includes sending a QoS rule. In some embodiments, the device is a radio access network ((R)AN) node, and the step of sending the updated PHP includes sending a QoS profile.

Another aspect of the disclosure provides for a method for managing a packet handling policy (PHP) information for a QoS flow by a packet flow description function (PFDF). The method includes receiving a first request, from an application function (AF), to perform one of providing and updating PHP parameters. The method further includes storing the packet handling information in a unified data management function (UDR). The method further includes receiving a second request to provide the packet handling information to a session management function (SMF). The method further includes sending the packet handling information to the SMF. The method further includes responsive to the second request, retrieving the packet handling information from the UDR. In some embodiments, the request includes packet handling information. In some embodiments, the packet handling information is used for devices in at least one user plane path of a mobile wireless network to transmit a packet of the QoS flow. In some embodiments, the packet handling information includes at least one of: packet flow description and PHP parameters. In some embodiments, the PHP parameters include at least two of a drop-delayed-packet parameter; a drop-maximum-delayed packet parameter; a first packet priority parameter; and a second packet priority parameter. In some embodiments, the second request is from one of the SMF and the NEF.

Another aspect of the disclosure provides for a session management function (SMF). The SMF includes a processor and a non-transient machine readable memory storing machine readable instructions to configure the SMF for performing the methods described herein. For example, the SMF can be configured for receiving information; obtaining PHP for a QoS flow of a protocol data unit (PDU) session based on the received information, the PHP indicating how to handle packets; and sending the PHP to at least one device in at least one user plane path of a mobile wireless network. In some embodiments the information includes at least one of: PDU session parameters provided by a user equipment (UE); connection management parameters provided by an access and mobility management function (AMF); application information provided by an application function (AF); user subscription data from a unified data management function (UDM); policy and charging control (PCC) rules from a policy control function (PCF); and PHP parameters from the PCF. In some embodiments the device is a user plane functions (UPF), and the instructions for sending the PHP includes instructions for sending a packet detection rule. In some embodiments the PHP is sent to the at least one device via an access and mobility management function (AMF). In some embodiments the device is a user equipment (UE), and the instructions for sending the PHP includes instructions for sending a QoS rule including a parameter associated with a packet handling policy (PHP).

Another aspect of the disclosure provides for a packet flow description function (PFDF) for managing packet handling policy (PHP) information for a QoS flow. Such a PFDF includes a processor; and non-transient machine readable memory storing machine readable instructions to configure the PFDF for carrying out the methods disclosed herein. For example, the PFDF can be configured for receiving a first request, from an application function (AF), to perform one of providing and updating PHP parameters; wherein the request includes packet handling information; storing the packet handling information in a unified data management function (UDR); receiving a second request to provide the packet handling information to a session management function (SMF); responsive to the second request, retrieving the packet handling information from the UDR; and sending the packet handling information to the SMF, wherein the packet handling information is used for devices in at least one user plane path of a mobile wireless network to transmit a packet of the QoS flow. In some embodiments the packet handling information include at least one of: packet flow description; and PHP parameters including at least two of: a drop-delayed-packet parameter; a drop-maximum-delayed packet parameter; a first packet priority parameter; and a second packet priority parameter. In some embodiments, the second request is from one of the SMF and the NEF.

Another aspect of the disclosure provides for a system including a control plane function; a session management function (SMF) and at least one device in at least one user plane path. In such a system the SMF is configured for: receiving information from the control plane function; obtaining packet handling policy (PHP), for a QoS flow of a protocol data unit (PDU) session based on the received information, the PHP indicating how to handle packets; and sending the PHP to at least one device in at least one user plane path of a mobile wireless network. In such a system, the least one device in at least one user plane path configured for: receiving packet handling instructions for a QoS flow of a protocol data unit (PDU) session from a session management function (SMF); obtaining at least one of a packet delay threshold (PDT) and a maximum packet delay threshold (MPDT) based on the received packet handling instructions; wherein MPDT is larger than PDT; and performing one of delivering and dropping a packet according to the received packet handling instructions. In some embodiments, the control plane function is a packet flow description function (PFDF) for managing packet handling policy (PHP) information for a QoS flow, the PFDF configured for: receiving a first request, from an application function (AF), to perform one of providing and updating PHP parameters; wherein the request includes packet handling information; storing the packet handling information in a unified data management function (UDR); receiving a second request to provide the packet handling information to a session management function (SMF); responsive to the second request, retrieving the packet handling information from the UDR; and sending the packet handling information to the SMF, wherein the packet handling information is used for devices in at least one user plane path of a mobile wireless network to transmit a packet of the QoS flow.

Other aspects of the disclosure provides for devices for carrying out the methods described herein, including CP functions (e.g. SMF, PCFs), UEs, UPFs and the AF. For example, an aspect of the disclosure provides a PCF including a processor, and a non-transitory computer readable storage medium including software instructions configured to control the processor to implement steps of: receiving information pertaining to packet handling policy (PHP) parameters for a PDU session; and sending the PHP to other network functions for instructing devices in the user plane of the mobile wireless network how to handle packets.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for handling packets in a mobile wireless network, the method comprising:
receiving a packet handling policy (PHP), from a first control plane function, by a second control plane function, the PHP indicating how to handle the packets; and
responsive to receiving the PHP, sending, by the second control plane function, packet handling instructions according to the PHP to at least one device in at least one user plane path of the mobile wireless network for a quality of service (QoS) flow of a protocol data unit (PDU) session,
wherein the packet handling instructions comprises at least one of:
a drop-delayed-packet parameter indicating to drop or deliver a packet of the QoS flow when a packet delay of the packet exceeds a packet delay threshold (PDT) of the at least one device; and
a drop-maximum-delayed packet parameter indicating to drop or deliver the packet of the QoS flow when the packet delay of the packet exceeds a maximum packet delay threshold (MPDT) of the at least one device, wherein the MPDT and the PDT are associated with the packet of same QoS flow and the MPDT is larger than the PDT.

2. The method of claim 1, wherein
the PDT is based on one of: a segment PDT and a network function (NF) PDT; and the MPDT is based on one of: a segment MPDT and a NF MPDT.

3. The method of claim 1, wherein the packet handling instructions further comprises at least one of:
a first packet priority parameter indicating a scheduling priority of the packet for a packet scheduler to schedule a transmission of the packet when the packet delay of the packet is less than or equal to the PDT; and
a second packet priority parameter indicating a scheduling priority of the packet for the packet scheduler to schedule the transmission of the packet when the packet delay is greater than the PDT and less than or equal to the MPDT.

4. The method of claim 1, wherein the packet handling instructions instruct the at least one device to add packet delay information into each packet of the PDU session.

5. The method of claim 1, wherein the packet handling instructions are to configure the at least one device to obtain at least one of the PDT and the MPDT based on the received PHP.

6. The method of claim 5, wherein the packet handling instructions instruct the at least one device to perform one of:
drop the packet having one of:
the packet delay longer than the PDT, where the at least one device has the drop-delayed-packet parameter set to a first value; and
the packet delay longer than the MPDT, where the at least one device has the drop-maximum-delay packet parameter set to the first value;

deliver the packet having one of:
> the packet delay longer than the PDT, where the at least one device has the drop-delayed-packet parameter set to a second value;
> the packet delay longer than the PDT and less than MPDT, where the g least one device has the drop-delayed-packet parameter set to the second value and a drop-maximum-delay packet parameter set to the first value; and
> the packet delay longer than the MPDT, where the at least one device has the drop-maximum-delay packet parameter set to the second value.

7. The method of claim 1, wherein the first control plane function is a policy control function (PCF) and the second control plane function is a session management function (SMF).

8. The method of claim 1, wherein the at least one device includes at least one user plane function (UPF) and the sending the packet handing instructions comprises sending a packet detection rule (PDR).

9. The method of claim 1, wherein the packet handling instructions are sent to the at least one device via an access and mobility management function (AMF).

10. The method of claim 9, wherein the at least one device is a radio access network (R)AN(s) node, and the sending the packet handling instructions comprises sending a QoS profile.

11. The method of claim 9, wherein the at least one device is a user equipment (UE), and the sending the packet handling instructions comprises sending a QoS rule.

12. A method of handling packets in a mobile wireless network, by at least one device in at least one user plane path comprising:
> receiving packet handling instructions for a quality of service (QoS) flow of a protocol data unit (PDU) session from a session management function (SMF);
> obtaining at least one of a packet delay threshold (PDT) for the at least one device and a maximum packet delay threshold (MPDT) for the at least one device based on the received packet handling instructions; wherein the MPDT and the PDT are associated with a packet of same QoS flow and the MPDT is larger than the PDT; and
> performing one of delivering and dropping the packet of the QoS flow when a packet delay of the packet exceeds at least one of the PDT and the MPDT.

13. The method of claim of 12, wherein the at least one device is a radio access network ((R)AN) node and the (R)AN node receives the packet handling instructions via an access and mobility management function (AMF).

14. The method of claim 13, wherein the receiving the packet handling instructions comprises receiving a QoS profile including a parameter associated with a packet handling policy (PHP).

15. The method of claim 12, wherein the obtaining at least one of the PDT and the MPDT includes one of:
> creating, by the at least one device, a new PDT and a new MPDT according to the received packet handling instructions;
> setting, by the at least one device, existing parameters according to the received packet handling instructions; and
> sending, by the at least one device, a timestamp, to a function according to the received packet handling instructions.

16. A control plane function for handling packets in a mobile wireless network comprising:
> a processor;
> non-transient machine readable memory storing machine readable instructions, which when executed by the processor configure the control plane function for:
>> receiving a packet handling policy (PHP), from a first control plane function, the PHP indicating how to handle the packets; and
>> responsive to receiving the PHP, sending packet handling instructions according to the PHP to at least one device in at least one user plane path of the mobile wireless network for a Quality of service (QoS) flow of a protocol data unit (PDU) session,
> wherein the packet handling instructions comprises at least one of:
>> a drop-delayed-packet parameter indicating to drop or deliver a packet of the QoS flow when a packet delay of the packet exceeds a packet delay threshold (PDT) of the at least one device; and
>> a drop-maximum-delayed packet parameter indicating to drop or deliver a packet of the QoS flow when the packet delay of the packet exceeds a maximum threshold of the at least one device, wherein the maximum threshold and the PDT are associated with the packet of same QoS flow and the maximum threshold is larger than the PDT.

17. A device comprising:
> a processor;
> non-transient machine readable memory storing machine readable instructions, which when executed by the processor configure the device for:
>> receiving packet handling instructions for a Quality of service (QoS) flow of a protocol data unit (PDU) session from a session management function (SMF);
>> obtaining at least one of a packet delay threshold (PDT) for the device and a maximum packet delay threshold (MPDT) for the device based on the received packet handling instructions; wherein the MPDT and the PDT are associated with a packet of same QoS flow and the MPDT is larger than the PDT; and
>> performing one of delivering and dropping the packet of the QoS flow when a packet delay of the packet exceeds at least one of the PDT and the MPDT.

18. The device of claim 17 wherein the device is a radio access network ((R)AN) node and the (R)AN node receives the packet handling instructions via an access and mobility management function (AMF).

19. The device of claim 17, wherein the device is a radio access network (R)AN(s) node, and the receiving packet handling instructions comprises receiving a QoS profile.

20. The device of claim 17, wherein the device is a user equipment (UE), and the receiving packet handling instructions comprises receiving a QoS rule.

* * * * *